(12) United States Patent
Sahin et al.

(10) Patent No.: US 11,838,161 B2
(45) Date of Patent: Dec. 5, 2023

(54) METHODS, APPARATUS AND SYSTEMS FOR CHANNEL ESTIMATION AND SIMULTANEOUS BEAMFORMING TRAINING FOR MULTI-INPUT MULTI-OUTPUT (MIMO) COMMUNICATIONS

(71) Applicant: InterDigital Patent Holdings, Inc., Wilmington, DE (US)

(72) Inventors: Alphan Sahin, Westbury, NY (US); Rui Yang, Greenlawn, NY (US); Hanqing Lou, Syosset, NY (US); Oghenekome Oteri, San Diego, CA (US); Robert Olesen, Huntington, NY (US); Fengjun Xi, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/346,616

(22) Filed: Jun. 14, 2021

(65) Prior Publication Data

US 2021/0306183 A1 Sep. 30, 2021

Related U.S. Application Data

(63) Continuation of application No. 15/758,921, filed as application No. PCT/US2016/050399 on Sep. 6, 2016, now Pat. No. 11,038,720.

(Continued)

(51) Int. Cl.
*H04L 27/26* (2006.01)
*H04B 7/06* (2006.01)
(Continued)

(52) U.S. Cl.
CPC ....... *H04L 27/2613* (2013.01); *H04B 7/0413* (2013.01); *H04B 7/0452* (2013.01);
(Continued)

(58) Field of Classification Search
CPC ............... H04L 25/024; H04L 27/2613; H04L 25/0204; H04L 5/0023; H04L 5/0053;
(Continued)

(56) References Cited

U.S. PATENT DOCUMENTS 9,876,544 B2 * 1/2018 Cordeiro ............. H04W 28/065
10,211,893 B2 * 2/2019 Sanderovich ....... H04L 27/2613
(Continued)

FOREIGN PATENT DOCUMENTS

CN 102160348 A 8/2011
EP 2584750 A2 4/2013
(Continued)

OTHER PUBLICATIONS

"IEEE Standard for Information Technology—Telecommunications and Information Exchange Between Systems, Local and Metropolitan Area Networks—Specific Requirements", Part 11: Wireless LAN Medium Access Control (MAC) and Physical Layer (PHY) Specifications, Amendment 3: Enhancements for Very High Throughput in the 60 GHz Band, IEEE Computer Society, IEEE Std 802.11ad™, Dec. 28, 2012, 628 pages.
(Continued)

Primary Examiner — Jean B Corrielus
(74) Attorney, Agent, or Firm — Flaster Greenberg PC

(57) ABSTRACT

Methods, apparatuses, and systems to enable a channel estimation of more than one channel for Multi-Input Multi-Output (MIMO) communications in a wireless network is provided. The method includes determining a first set of complex numbers comprising first channel estimation signal associated with a first channel, determining a second set of (Continued)

complex numbers comprising second channel estimation signal associated with a second channel, and transmitting the first set of complex numbers and the second set of complex numbers via a physical layer (PHY) frame, wherein the second set of complex numbers are complex conjugates of the first set of complex numbers.

14 Claims, 39 Drawing Sheets

Related U.S. Application Data

(60) Provisional application No. 62/365,043, filed on Jul. 21, 2016, provisional application No. 62/216,604, filed on Sep. 10, 2015.

(51) Int. Cl.
*H04L 5/00* (2006.01)
*H04B 7/0452* (2017.01)
*H04L 25/02* (2006.01)
*H04B 7/0413* (2017.01)

(52) U.S. Cl.
CPC ......... *H04B 7/0617* (2013.01); *H04B 7/0626* (2013.01); *H04L 5/0023* (2013.01); *H04L 5/0053* (2013.01); *H04L 25/024* (2013.01); *H04L 25/0204* (2013.01)

(58) Field of Classification Search
CPC .. H04B 7/0413; H04B 7/0452; H04B 7/0626; H04B 7/0617
See application file for complete search history.

(56) References Cited

U.S. PATENT DOCUMENTS

| | | |
|---|---|---|
| 2003/0072452 A1 | 4/2003 | Mody et al. |
| 2004/0022174 A1 | 2/2004 | Li et al. |
| 2009/0097533 A1 | 4/2009 | Lakkis |
| 2009/0163143 A1 | 6/2009 | De Rore |
| 2010/0054223 A1 | 3/2010 | Zhang et al. |
| 2010/0080266 A1 | 4/2010 | Zhang et al. |
| 2010/0086076 A1 | 4/2010 | Lakkis |
| 2010/0158147 A1 | 6/2010 | Shin et al. |
| 2013/0142099 A1 | 6/2013 | Shirakata et al. |
| 2014/0376670 A1 | 12/2014 | Wu et al. |
| 2015/0289147 A1* | 10/2015 | Lou ..................... H04B 7/0452 370/329 |
| 2016/0006557 A1 | 1/2016 | Shirakawa et al. |
| 2016/0149631 A1 | 5/2016 | Sanderovich et al. |
| 2016/0241425 A1 | 8/2016 | Xin et al. |
| 2016/0308594 A1 | 10/2016 | Sanderovich |
| 2016/0309457 A1 | 10/2016 | Eitan et al. |
| 2017/0048095 A1 | 2/2017 | Sun et al. |
| 2017/0111143 A1* | 4/2017 | Seok ..................... H04L 1/0091 |
| 2017/0257250 A1* | 9/2017 | He ..................... H04B 7/0413 |

FOREIGN PATENT DOCUMENTS

| | | |
|---|---|---|
| EP | 3284199 B1 | 10/2018 |
| JP | 2011501524 A | 1/2011 |
| JP | 2012501590 A | 1/2012 |
| JP | 2018-516492 A | 6/2018 |
| KR | 20100061859 A | 6/2010 |
| WO | WO 2014132599 A1 | 9/2014 |
| WO | WO 2015198140 A1 | 12/2015 |
| WO | WO 2016167891 A1 | 10/2016 |

OTHER PUBLICATIONS

Li-Hsiang Sun; IEEE 802.11-16/0912r0; EDMG-CEF Design for Control and SC PHY in MIMO Modes, vol. 802.11ay, Jul. 25, 2016.

Abu-Surra, Shadi, TGad Common Preamble, IEEE 802.11-10/0439r1, IEEE, retrieved from the Internet <URL: https://mentor.ieee.org/802.11/dcn/10/11-10-0439-01-00ad-nt-10-preamble.ppt>, May 17, 2010, pp. 1-22.

Technicolor, MAC and PHY Proposal for 802.11af, IEEE Standard 802.11-10/0258r0, Mar. 2010, 23 pages.

Agilent Technologies, "Wireless LAN at 60 GHz—IEEE 802.11ad Explained, Application Notes" published by Agilent Technologies, May 30, 2013, 28 pages.

"IEEE 802.11 TGay Use Cases", IEEE 802.11-2015/0625r2, May 2015, 21 pages.

Eldad Perahia: Overview for CWPAN, IEEE 802.11-11/0459r1, IEEE, retrieved on the Internet <URL:https://mentor.ieee.org/802.11/dcn/11/11-11-0459-01-00ad-tgad-overview-for-cwpan.pptx>, May 19, 2011, pp. 1-37.

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).

Andre Bourdoux; Channel Estimation Sequence for TGad, IEEE 802.11-10/0264r3, IEEE, retrieved on the Internet <URL:https://mentor.ieee.org/802.11/dcn/10/11-10-0264-r3-00ad-channel-estimation-sequence-for-tgad.ppt>, Mar. 15, 2010, pp. 1-17.

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012), 2793 pages.

"Sub 1 GHz license-exempt PAR and 5C," IEEE P802.11 Wireless LANs, IEEE 802.11-10/0001r13 (Jul. 2010).

Link Level Performance Comparisons of Open Loop, Closed Loop and Antenna Selection for SU-MIMO, IEEE 802.11-16/0911r1, Jul. 25, 2016.

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Standards Association; 802.11ac-2013, Dec. 11, 2013, 425 pages.

* cited by examiner

FIG. 12

| | | | | | |
|---|---|---|---|---|---|
| STREAM 1 | LEGACY STF | LEGACY CEF | LEGACY HEADER | NEW HEADER | CEFS FOR MULTIPLE STREAMS | DATA1 | BEAMFORMING TRAINING FIELD1 |
| STREAM 2 | LEGACY STF | LEGACY CEF | LEGACY HEADER | NEW HEADER | | DATA2 | BEAMFORMING TRAINING FIELD2 |

FIG. 35

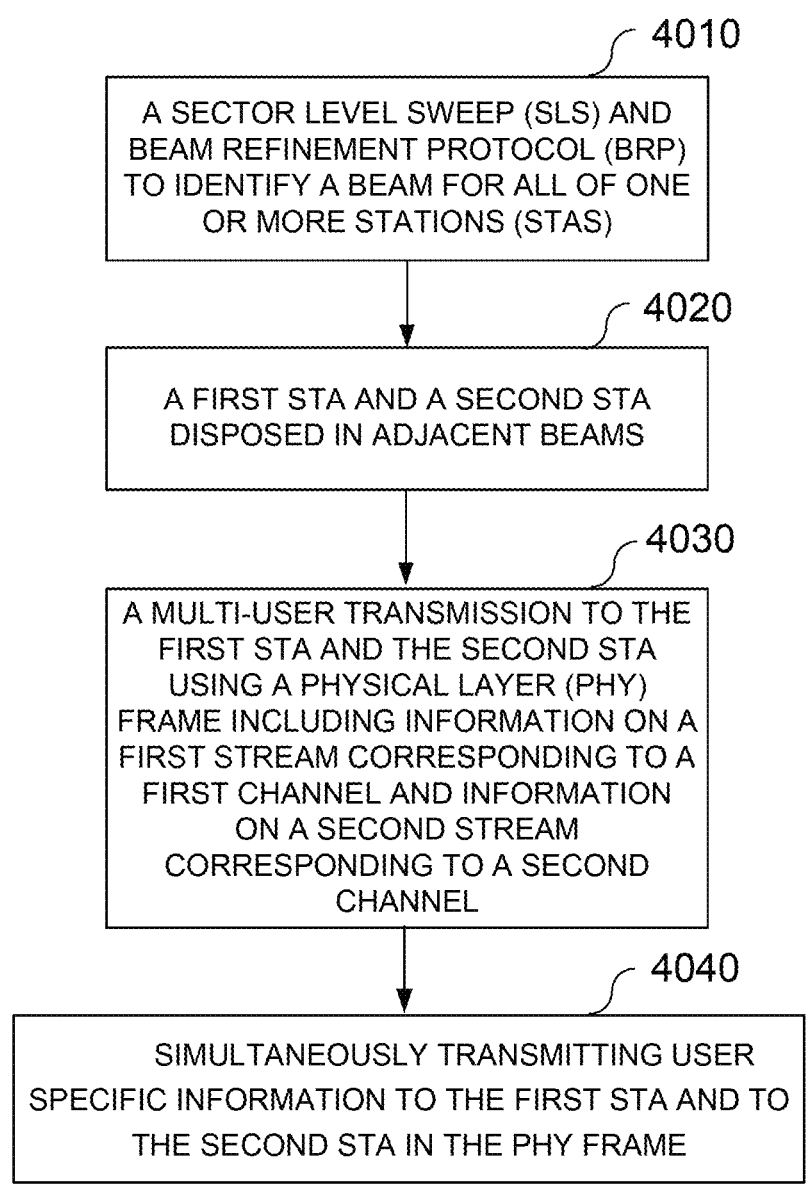

METHODS, APPARATUS AND SYSTEMS FOR CHANNEL ESTIMATION AND SIMULTANEOUS BEAMFORMING TRAINING FOR MULTI-INPUT MULTI-OUTPUT (MIMO) COMMUNICATIONS

CROSS REFERENCE TO RELATED APPLICATIONS

This application is a Continuation of U.S. patent application Ser. No. 15/758,921, filed Mar. 9, 2018, which issued as U.S. Pat. No. 11,038,720 on Jun. 15, 2021 and is the National Stage Application filed under 35 U.S.C. 371 of International Application No. PCT/US2016/050399 filed Sep. 6, 2016 and claims priority to U.S. Provisional Patent Application No. 62/216,604 filed Sep. 10, 2015 and to U.S. Provisional Patent Application No. 62/365,043, filed Jul. 21, 2016, the disclosures of which are incorporated herein by reference in their entirety.

FIELD

The present invention relates to the field of wireless communications and, more particularly, to methods, apparatus and systems for performing channel estimation and simultaneous beamforming training for MIMO communications.

BACKGROUND

A Wireless Local Area Network (WLAN) may provide wireless communication services. A WLAN may have a plurality of mode, e.g., an infrastructure and ad-hoc mode. In ad-hoc mode, one or more STAs transmit directly in peer-to-peer (P2P). In infrastructure mode, one or more stations (STAs) communicate through an Access Point (AP) that serves as a bridge to other networks (such as Internet or Local Area Network). A WLAN operating in infrastructure mode may provide MIMO communications, such as Multi-User MIMO (MU-MIMO).

WLAN systems which support multiple channels, and channel widths, such as 802.11n, 802.11ac, 802.11af, and 802.11ah, include a channel which is designated as a primary channel. To improve spectral efficiency, 802.11ac has introduced a concept for downlink MU-MIMO transmission to multiple STAs in the same symbol's time frame, e.g., during a downlink Orthogonal Frequency Division Multiplexing (OFDM) symbol. The potential for use of downlink MU-MIMO has been also considered for 802.11ah. It is important to note that downlink MU-MIMO uses the same symbol timing to multiple STAs interference of waveform transmissions to multiple STAs. All STAs involved in MU-MIMO transmission with an AP may use the same channel or band. This limits operating bandwidth to the smallest channel bandwidth that is supported by the STAs which are included in the MU-MIMO transmission with the AP. In order to solve such limitations, the present application proposes methods, apparatus, and systems for channel estimation and simultaneous beamforming training for MIMO communications.

SUMMARY

Methods, apparatuses, and systems to enable a channel estimation of more than one channel for MIMO communications. Also methods, apparatuses, and systems to perform simultaneous beamforming training in a wireless network are provided.

A representative method for an electronic device to transmit information for channel estimation for more than one channel for MIMO communications in a wireless network includes determining a first set of complex numbers comprising first channel estimation signal associated with a first channel, determining a second set of complex numbers comprising second channel estimation signal associated with a second channel, and transmitting the first set of complex numbers and the second set of complex numbers via a physical layer (PHY) frame, wherein the second set of complex numbers are complex conjugates of the first set of complex numbers.

A representative method for an electronic device to perform channel estimation of more than one channel for MIMO communications in a wireless network includes receiving a first set of complex numbers comprising a first channel estimation signal and a second set of complex numbers comprising a second channel estimation signal, and determining a first channel based on the first channel estimation signal and a second channel based on the second channel estimation signal, wherein the first set of complex numbers and the second set of complex numbers are received via a PHY frame, and wherein the second set of complex numbers are complex conjugates of the first set of complex numbers.

A representative method for an electronic device to transmit beamforming for MIMO communications in a wireless network includes performing a Sector Level Sweep (SLS) and Beam Refinement Protocol (BRP) to identify a beam for all of one or more stations (STAs), identifying a first STA and a second STA disposed in adjacent beams, transmitting a multi-user transmission to the first STA and the second STA using a PHY frame including information on a first stream corresponding to a first channel and information on a second stream corresponding to a second channel, and simultaneously transmitting user specific information to the first STA and to the second STA in the PHY frame, wherein the PHY frame includes a legacy short training field (STF), a long training field (LTF), and a signal (SIG) on both the first stream and the second stream, and wherein the PHY frame includes a common header including information on the one or more STAs and information associating the first stream with the first STA and associating the second stream with the second STA.

A representative apparatus includes an electronic device configured to transmit information for channel estimation for more than one channel for MIMO communications in a wireless network. The electronic device includes a processor configured to (1) determine a first set of complex numbers comprising first channel estimation signal associated with a first channel and (2) determine a second set of complex numbers comprising second channel estimation signal associated with a second channel, and a transmitter configured to the first set of complex numbers and the second set of complex numbers via a PHY frame, wherein the second set of complex numbers are complex conjugates of the first set of complex numbers.

A representative apparatus includes an electronic device configured to perform channel estimation of more than one channel for MIMO communications in a wireless network. The electronic device includes a receiver configured to receive a first set of complex numbers comprising a first channel estimation signal and a second set of complex numbers comprising a second channel estimation signal, and a processor configured to determine a first channel based on the first channel estimation signal and a second channel based on the second channel estimation signal, wherein the first set of complex numbers and the second set of complex numbers are received via a PHY frame, and wherein the second set of complex numbers are complex conjugates of the first set of complex numbers.

A representative apparatus includes an electronic device configured to perform transmit beamforming for MIMO communications in a wireless network. The electronic device includes a processor configured to perform a Sector Level Sweep (SLS) and Beam Refinement Protocol (BRP) to identify a beam for all of one or more stations (STAs), identify a first STA and a second STA disposed in adjacent beams, transmit a multi-user transmission to the first STA and the second STA using a PHY frame including information on a first stream corresponding to a first channel and information on a second stream corresponding to a second channel, and simultaneously transmit user specific information to the first STA and to the second STA in the PHY frame, wherein the PHY frame includes a legacy short training field (STF), a long training field (LTF), and a signal (SIG) on both the first stream and the second stream, and wherein the PHY frame includes a common header including information on the one or more STAs and information associating the first stream with the first STA and associating the second stream with the second STA.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely.
Furthermore, like reference numerals in the Figures indicate like elements, and wherein:

FIG. 12 illustrates CEFs for multiple streams according to an embodiment;

FIG. 35 illustrates a PHY header for a combination of sequential and parallel beamforming training according to an embodiment;

FIG. 40 illustrates another exemplary flowchart of performing transmit beamforming for MIMO communications in a wireless network.

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Figure 1:
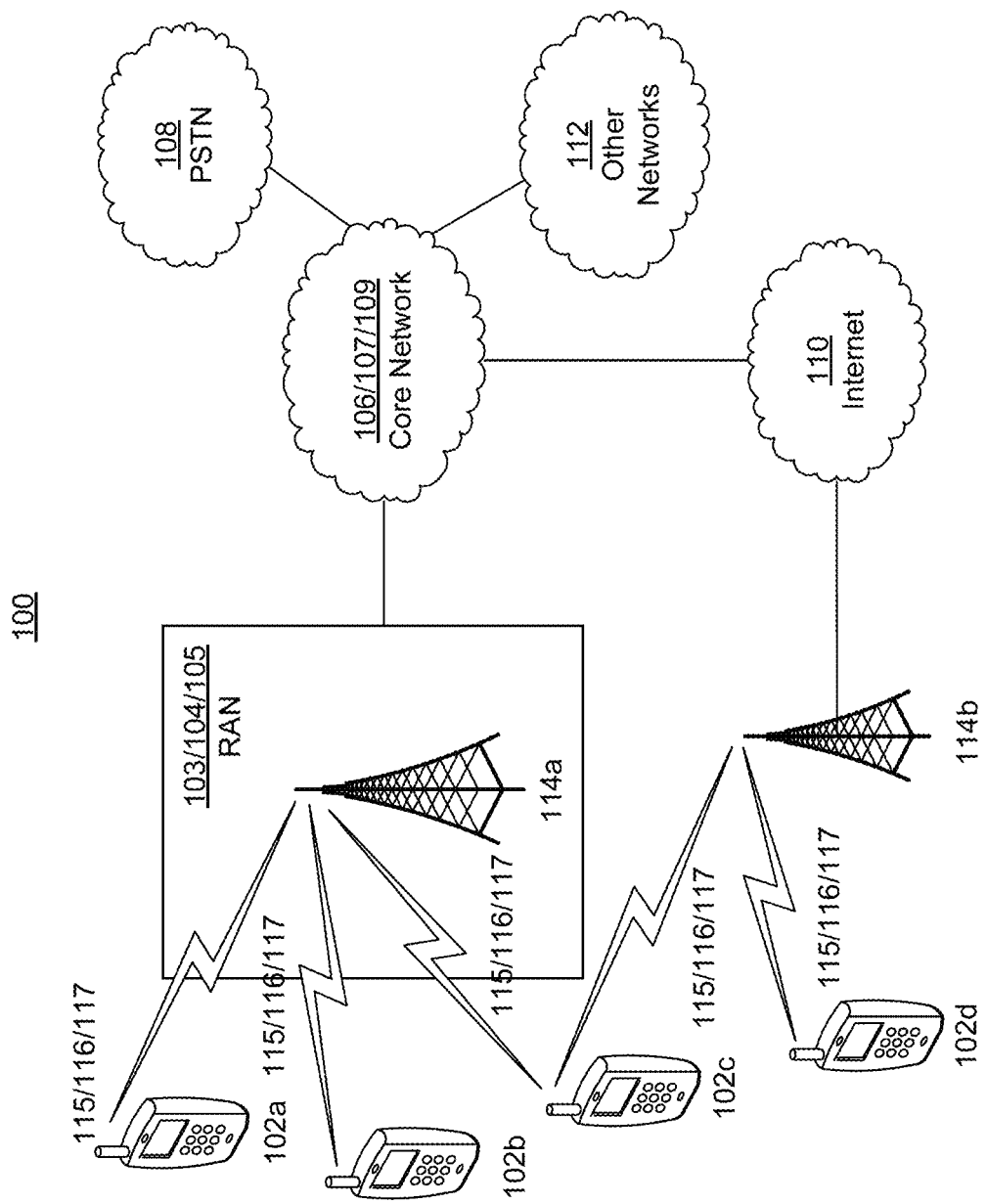
FIG. 1 is a system diagram illustrating an example communications system in which one or more disclosed embodiments may be implemented.

FIG. 1 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include electronic devices such as wireless transmit/receive units (WTRUs) 102a, 102b, 102c, 102d, a radio access network (RAN) 104, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, which may be referred to as a "station" and/or a "STA", may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The WTRU 102a, 102b, 102c and 102d is interchangeably referred to as a UE.

The communications systems 100 may also include electronic devices such as a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiments, the base station 114a may employ MIMO technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a WLAN. In another embodiments, the base station 114b and the WTRUs 102c, 102d may implement a radio technology such as IEEE 802.15 to establish a wireless personal area network (WPAN). In yet another embodiments, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 1, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology.

The core network 106/107/109 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1 may be configured to communicate with the base station 114*a*, which may employ a cellular-based radio technology, and with the base station 114*b*, which may employ an IEEE 802 radio technology.

Figure 2:
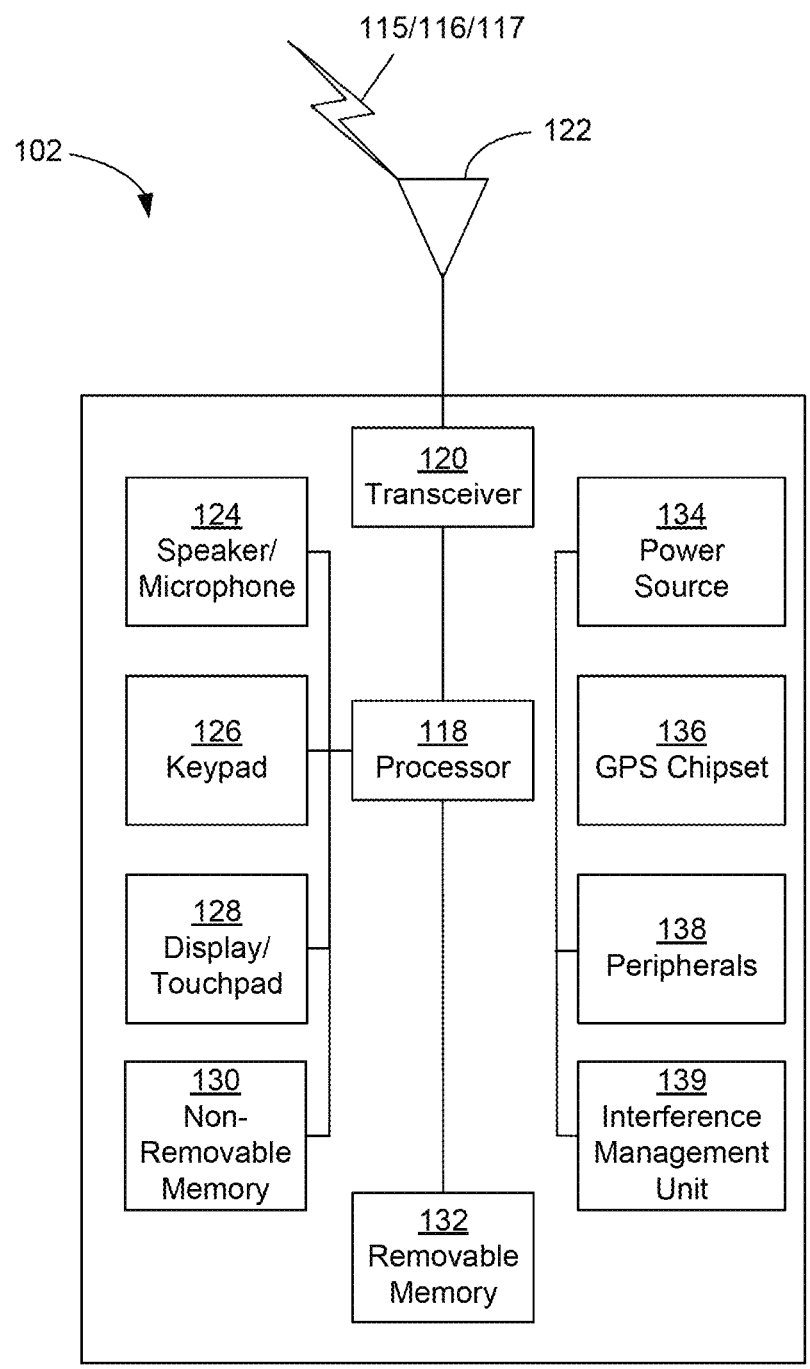
FIG. 2 is a system diagram illustrating an example wireless transmit/receive unit (WTRU) that may be used within the communications system illustrated in FIG. 1.

FIG. 2 is a system diagram illustrating an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in one embodiment, the transmit/receive element 122 may be an antenna configured to transmit and/or receive RF signals. In another embodiments, the transmit/receive element 122 may be an emitter/detector configured to transmit and/or receive IR, UV, or visible light signals, for example. In yet another embodiments, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like. In a case where the peripherals 138 includes one or more sensors, the sensors may be one or more of a gyroscope, an accelerometer; an orientation sensor, a proximity sensor, a temperature sensor, a time sensor; a geolocation sensor; an altimeter, a light sensor, a touch sensor, a magnetometer, a barometer, a gesture sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118).

Figure 3:
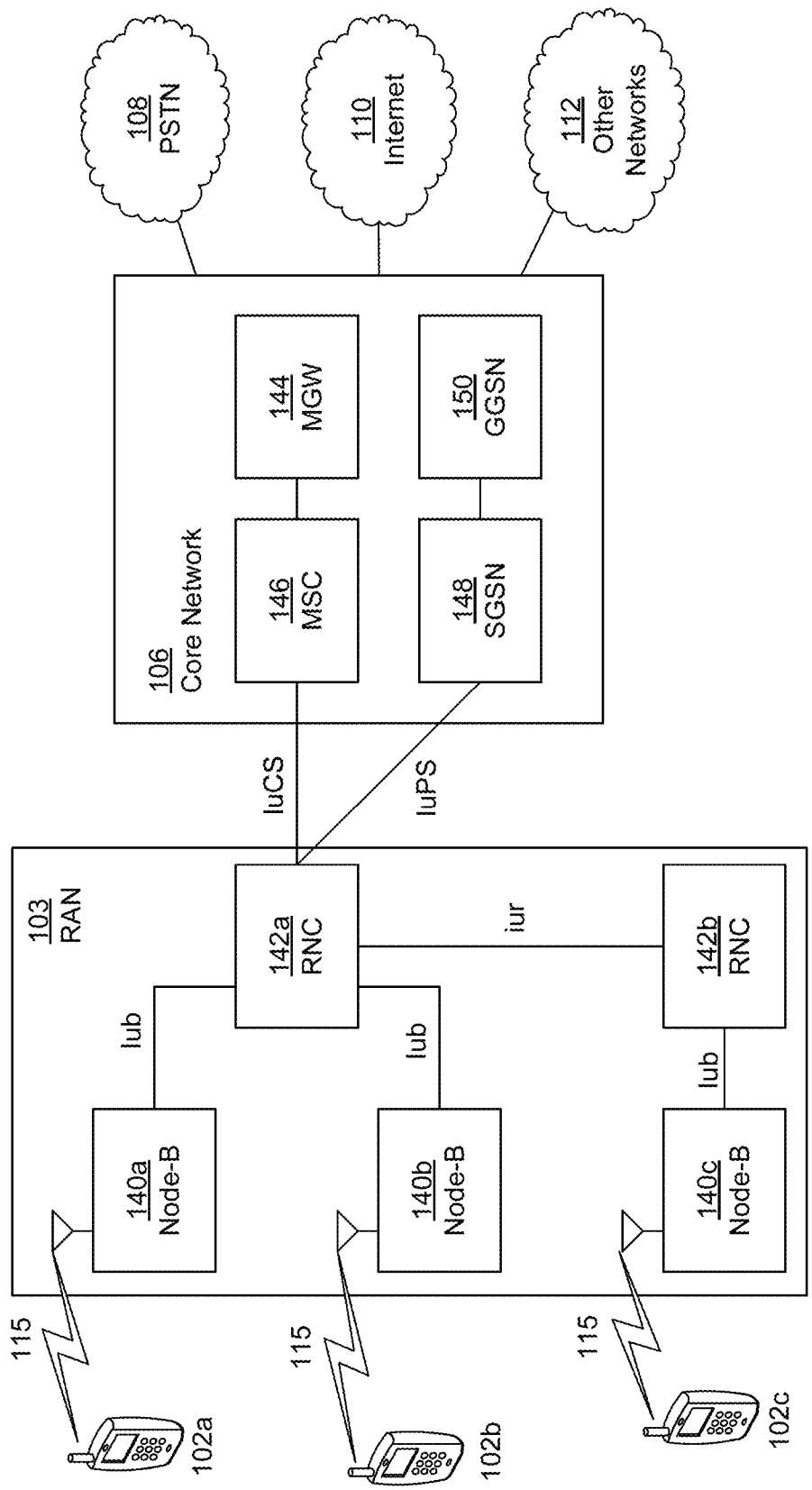
FIG. 3 is a system diagram illustrating an example radio access network and another example core network that may be used within the communications system illustrated in FIG. 1.

FIG. 3 is a system diagram illustrating the RAN 103 and the core network 106 according to another embodiments. As noted above, the RAN 103 may employ a UTRA radio technology to communicate with the WTRUs 102a, 102b, 102c over the air interface 115. The RAN 103 may also be in communication with the core network 106. As shown in FIG. 3, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the other networks 112, which may include other wired and/or wireless networks that are owned and/or operated by other service providers.

Figure 4:
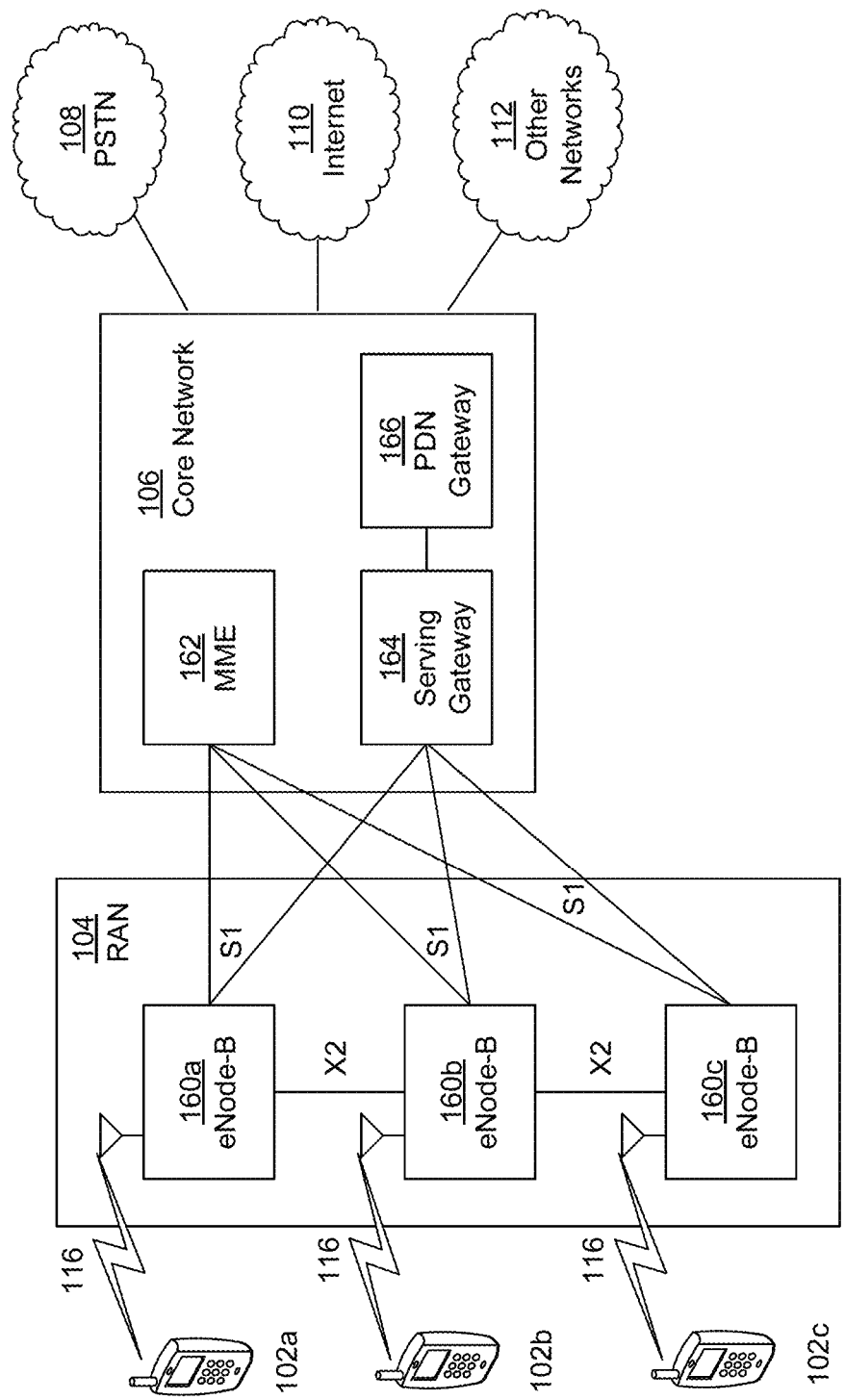
FIG. 4 is a system diagram illustrating another example radio access network and another example core network that may be used within the communications system illustrated in FIG. 1.

FIG. 4 is a system diagram illustrating the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 4, the eNode-Bs 160a, 160b, 160c may communicate with one another over an X2 interface.

The core network 107 shown in FIG. 4 may include a mobility management entity (MME) 162, a serving gateway (SGW) 164, and a packet data network (PDN) gateway (or PGW) 166. While each of the foregoing elements are depicted as part of the core network 107, it will be appreciated that any of these elements may be owned and/or operated by an entity other than the core network operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the other networks 112, which may include other wired and/or wireless networks that are owned and/or operated by other service providers.

Figure 5:
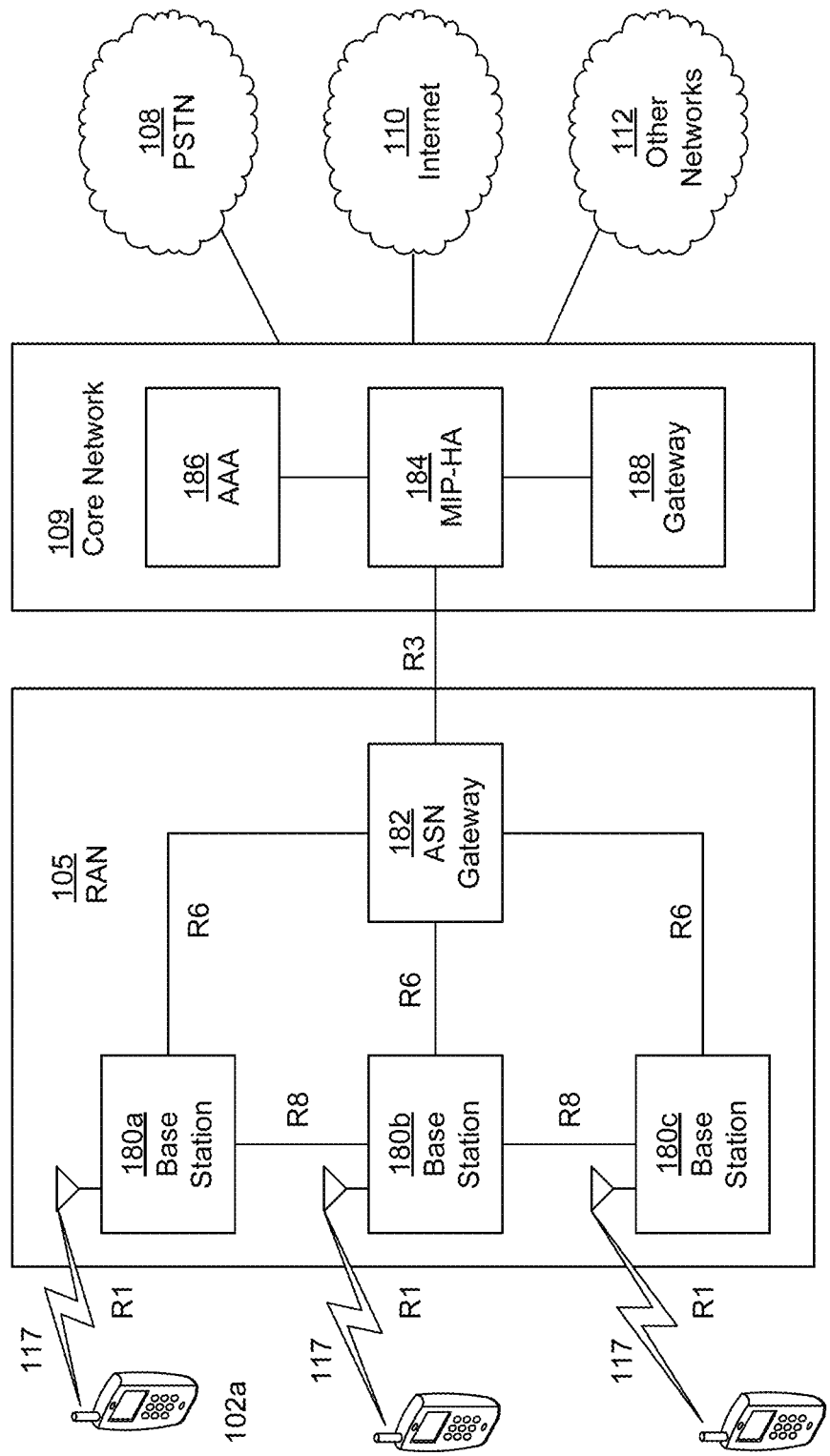
FIG. 5 is a system diagram illustrating a further example radio access network and a further example core network that may be used within the communications system illustrated in FIG. 1.

FIG. 5 is a system diagram illustrating the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 5, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. The base station 180a, for example, may use multiple antennas to transmit wireless signals to, and/or receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 100c.

As shown in FIG. 5, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 5, it will be appreciated that the RAN 105 may be connected to other ASNs, other RANS (e.g., RANs 103 and/or 104) and/or the core network 109 may be connected to other core networks (e.g., core network 106 and/or 107. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although the WTRU is described in FIGS. 1-5 as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an AP for the BSS and one or more STAs associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent 20 MHz channel to form a 40 MHz wide contiguous channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by the particular STA, from among all STAs operating in a BSS, that supports the smallest bandwidth operating mode. In the example of 802.11ah, the primary channel may be 1 MHz wide to accommodate STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available set of frequency bands may be considered busy even though a majority of the frequency bands remains idle and may be available.

In the United States, the available frequency bands that may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Spectral efficiency of a WLAN that is an 802.11ac system may be improved by performing downlink MU-MIMO transmission to more than one STA during a same symbol time, for example, during a same downlink OFDM symbol and/or during a guard interval about the same symbol time. Downlink MU-MIMO, as implemented by an 802.11ac system, may use the same symbol time to perform downlink transmissions, or in other words, simultaneously transmit symbols, to multiple STAs such that interference of a waveform of the downlink transmissions to multiple STAs is not an issue. However, all STAs involved in MU-MIMO transmission with an AP must use a same channel or band, and thus, an operating bandwidth of the MU-MIMO downlink transmissions may be limited to a smallest one of the channel bandwidths that is supported by the STAs which are included in the MU-MIMO transmission with the AP.

A WLAN may be an 802.11ad system, wherein the Media Access Control (MAC) layer and Physical (PHY) layer support VHT STAs in the 60 GHz band. An 802.11ad system may support data rates up to 7 Gbits/s and may support three different modulation modes, including a spread spectrum mode, a single carrier mode, and an OFDM mode. Furthermore, an 802.11ad system may use a 60 GHz unlicensed band, which is available globally. At 60 GHz, a wavelength is 5 mm, and an 802.11ad system may have a compact antenna and/or a compact antenna array. Such an antenna and/or antenna array may transmit and/or receive narrow RF beams, which effectively increases the coverage range and reduces interference in the 802.11ad system. Additionally, a frame structure for an 802.11ad system allows for beamforming training, including discovery and tracking operations associated with beamforming. According to one or more embodiments, four different PHY frame structures is described below, including a description of sequences, such as a Golay sequence, that may be used in multiple parts of the different PHY frame structures.

Structures of Four Different PHY Frame Types

Figure 6:
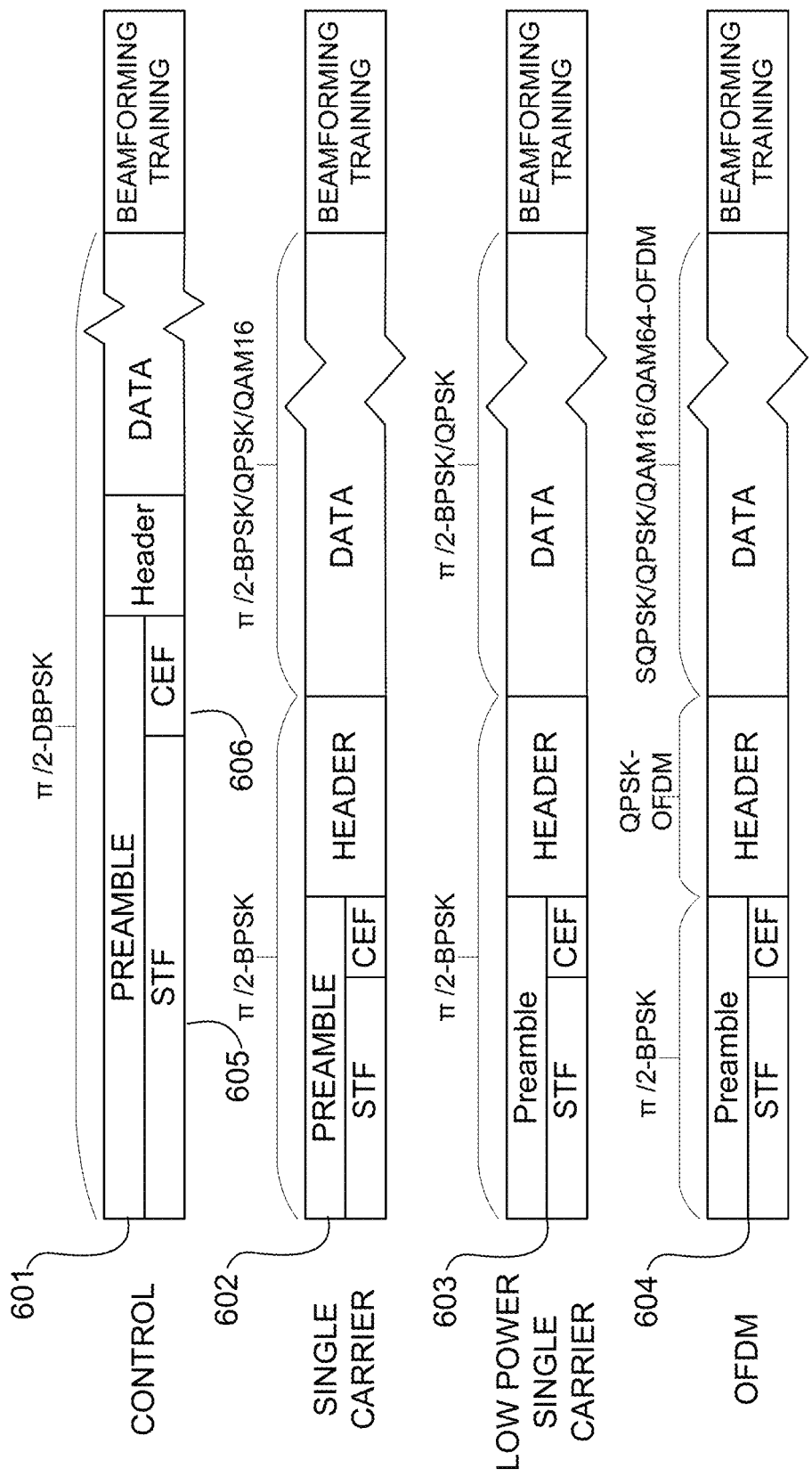
FIG. 6 illustrates different PHY frame types according to an embodiment.

FIG. 6 illustrates different PHY frame types according to an embodiment.

Referring to FIG. 6, a WLAN, such as an 802.11ad system that operates according to an Institute of Electrical and Electronics Engineers (IEEE) 802.11ad Directional Multi-Gigabit (DMG) PHY standard, may support different PHY frame structures, which may also be referred to as frame types, packets and/or packet structures. According to an embodiment, four different PHY frame types supported by a WLAN, such as an 802.11ad system, may include a Control PHY frame type 601, a Signal Carrier frame type 602, a Low Power Single Carrier PHY frame type 603, and an OFDM PHY frame type 604.

Figure 7:
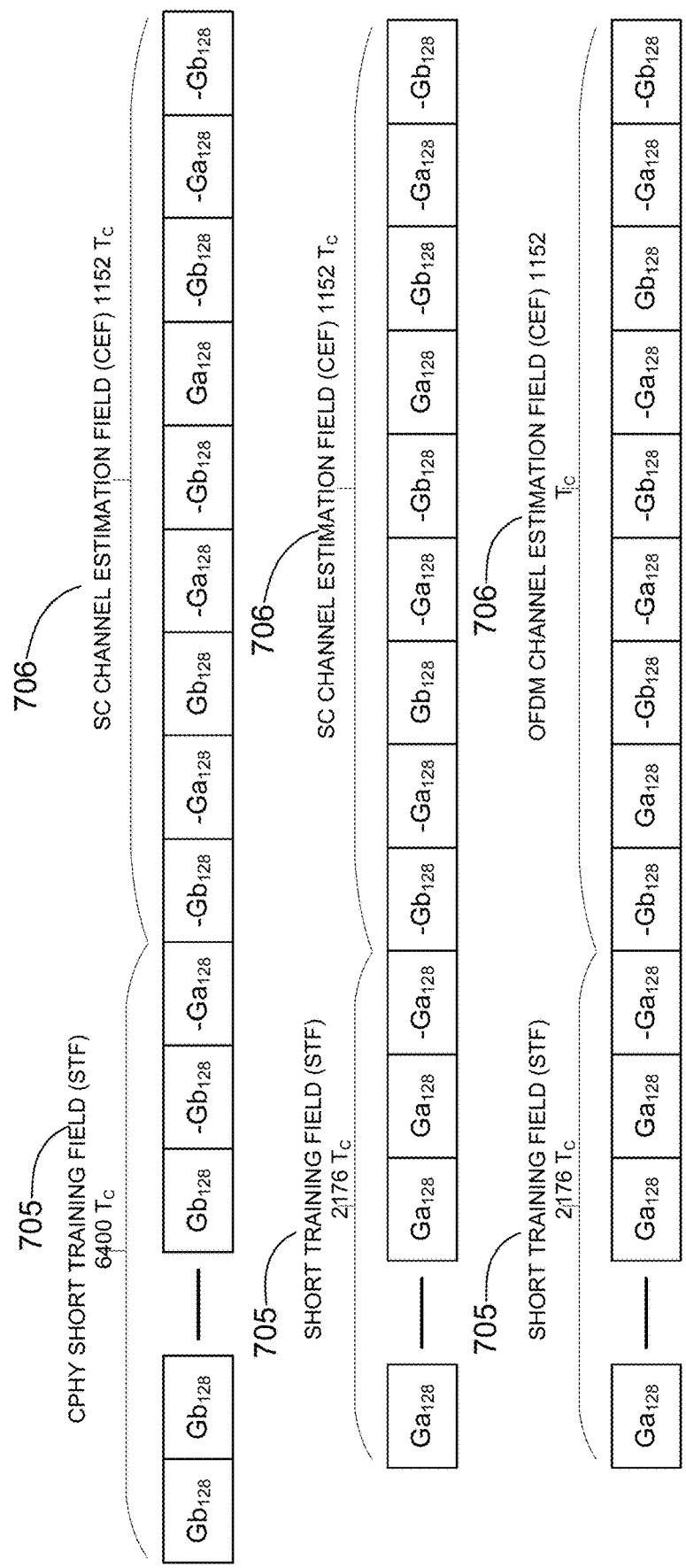
FIG. 7 illustrates a preamble structure according to an embodiment.

FIG. 7 illustrates a preamble structure according to an embodiment.

Referring to FIGS. 6 and 7, the PHY frame types 601 through 604 may have a preamble structure that includes a Short Training Field (STF) 605/705 and a Channel Estimation Field (CEF) 606/706. Both the STF and the CEF fields may be constructed from a π/2 (Differential) Binary Phase Shift Keying ((D)BPSK) modulated repeating Golay sequence, as shown in FIG. 7. According to certain embodiments, the π/2 (D)BPSK modulation of the repeating Golay sequence may be performed. However, the present disclosure is not limited thereto, and the π/2 (D)BPSK modulation may be performed according to any suitable variations.

Figure 8:
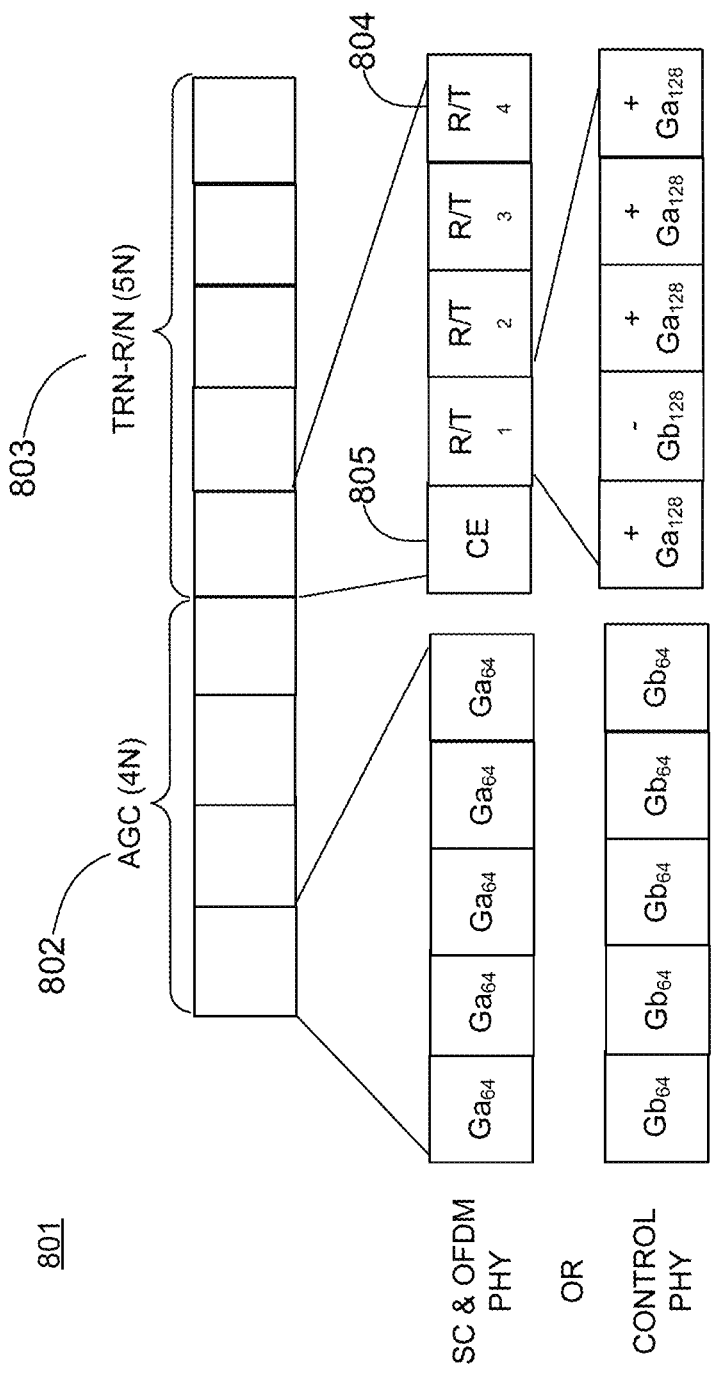
FIG. 8 illustrates a beamforming training field structure according to an embodiment.

FIG. 8 illustrates a beamforming training field structure according to an embodiment.

Referring to FIG. 8, a beamforming training field 801 may be included in a PHY frame at the end of, that is, after or behind, a data field of the PHY frame. The beamforming training field 801 may be used for beam refinement and/or beam training processes. A packet, such as any one of the PHY frame types 601 through 604, including the beamforming training field 801 may also be referred to as a Beam Refinement Protocol (BRP) packet.

Referring to FIG. 8, a training length, which may refer to a length of the beam training field 801 may be indicated by N. In some embodiments, as shown in FIG. 8, an beamforming training field 801 of a PHY frame may include 4N Automatic Gain Control (AGC) subfields 802 and a Training-Receive/Transmit (TRN-R/T) field 803 includes 5N TRN-R/T subfields 804. A Channel Estimation (CE) subfield 805 may be similar to and/or the same as a CEF 606/706 illustrated in FIG. 6 and FIG. 7. According to other embodiments, N may be the number of antenna weight vectors to be trained, wherein one AGC block may include four subfields and one TRN-R/T block may include five subfields, such as 4 R/T sequences and one CEF, and additionally, all subfields, including the AGC subfield 802 and the TRN-R/T subfield 803 may be modulated using rotated π/2-BPSK modulation prior to being transmitted.

A Golay sequence, used to construct a CEF and a STF, may be defined according to the following. According to an embodiment, $\rho_a(k)$ may be the aperiodic autocorrelation of the sequence $a=\{a_0, a_1, \ldots, a_{N-1}\}$ and $\rho_a(k)$ is explicitly given by $$\rho_a(k) = \begin{cases} \sum_{i=0}^{N-k-1} a_i a_{(i+k)}^*, & k \in [0, N-1] \\ \sum_{i=|k|}^{N-1} a_i a_{(i+k)}^*, & k \in [-N+L-1] \end{cases}$$

wherein $(\bullet)^*$ is the conjugate of its argument. Then, the pair of (a, b) may be referred to as a Golay complementary pair if $\rho_a(k)+\rho_b(k)=0$, $k \neq 0$.

According to certain embodiments, Golay complementary pairs and sequences may be used for peak-to-average power mitigation, estimation of IQ imbalance parameters, and channel estimation due to its unique features. Golay sequences may have a property, which may be beneficially used in communication systems, wherein out-of-phase periodic autocorrelation of the sequences is zero. That is, multiple delayed replicas, or in other words, repetitions, of the Golay sequences may arrive at a receiver due to a multipath in wireless communication. In some embodiments, in order to estimate a channel, a shifted version of the Golay sequence may be orthogonal to another shifted version of the same sequence. A periodic autocorrelation of a Golay sequence a may be given as $c_a(k)$ as shown below.

$$c_a(k) = \sum_{i=0}^{N-k-1} a_i a_{mod\{(i+k),N\}}^*, |k| \in [0, N-1]$$

where mod{a, N} is modulo N of a. According to some embodiments, the periodic autocorrelation of a Golay sequence a may also be expressed using the definition of an aperiodic autocorrelation of the Golay sequence a, as given below.

$$c_a(k) = \begin{cases} \rho_a(k) + \rho_a(k-N), & k \in [0, N-1] \\ \rho_a(k) + \rho_a(k+N), & k \in [-N+1, -1] \end{cases}$$

Therefore, the following expression also holds true for the Golay complementary pairs:

$$c_a(k)+c_b(k)=0, k \neq 0.$$

This property of Golay complementary pairs, wherein the sum of the periodic and aperiodic autocorrelations of the Golay sequence a is zero, may be used by the receiver to estimate each channel tap by using correlation operations.

A beam training field of length $N=2^M$ Golay complementary pairs may be constructed according to the recursive procedure show below.

$$a_k^{(m)} = w_m a_k^{(m-1)} + b_{k-d_m}^{(m-1)}$$

$$b_k^{(m)} = w_m a_k^{(m-1)} - b_{k-d_m}^{(m-1)}$$

where $a_k^{(0)} = a_k^{(1)} = \delta_k$, $\delta_k$ is the Kronecker's delta, and $w_m$ is the m th element of rotation vector $w=[w_1\ w_2\ \ldots\ w_m]$ where $|w_m|=1$, $d_m$ is the m th element of the delay vector $d=[d_1\ d_2\ \ldots\ d_m]$ and the permutation of $[1\ 2\ \ldots\ 2^M]$.

According to embodiments, in the case of a WLAN that is an 802.11ad system, the pairs of Golay complementary sequences may be generated based on the aforementioned method and three pairs are considered: $(Ga_{32}, Gb_{32})$, $(Ga_{64}, Gb_{64})$, and $(Ga_{128}, Gb_{128})$. The parameters of these pairs are listed as follows:

$Ga_{32}$=flip$\{_k^{(5)}\}$ and $Gb_{32}$=flip$\{b_k^{(5)}\}$:
w=[-1 1 -1 1 -1] and d=[1 4 8 2 16]
$Ga_{64}$=flip$\{a_k^{(6)}\}$ and $Gb_{64}$=flip$\{b_k^{(6)}\}$:
w=[1 1 -1 -1 1 -1] and d=[2 1 4 8 16 32]
$Ga_{128}$=flip$\{a_k^{(7)}\}$ and $Gb_{128}$=flip$\{a_k^{(7)}\}$:
w=[-1 -1 -1 -1 1 -1 -1] and d=[1 8 2 4 16 32 64]

Where flip$\{\cdot\}$ is a function that reverses an order of its argument. According to another embodiments, in the case of the 802.11ad system, the Golay sequences may be used in a SC PHY frame, for example, at locations indicated by $Ga_{64}$, and in a low power SC PHY, for example, at locations indicated by $Ga_{64}$ and $Gb_{128}$, as well as in a beamforming training field.

IEEE has approved Task Group ay (TGay) to develop an amendment that defines standardized modifications to both the IEEE 802.11 PHY layer and the IEEE 802.11 MAC layer that enables at least one mode of operation capable of supporting a maximum throughput of at least 20 Gb/s as measured at the MAC data service access point, while maintaining or improving the power efficiency per station. This amendment also defines operations for license-exempt bands above 45 GHz while ensuring backward compatibility and coexistence with legacy directional multi-gigabit stations, as defined by IEEE 802.11ad-2012 amendment, operating in the same band.

Although the maximum throughput of at least 20 Gb/s is a primary goal of TGay, inclusion of mobility and outdoor support has also been proposed. More than ten different use cases are proposed and analyzed in terms of throughput, latency, operation environment and applications. Since 802.11 ay may operate in the same band as legacy standards, it may be required that the new technology provide backward compatibility and coexistence with legacies in the same band.

To reach the maximum throughput requirement for the millimeter wave (mmW) band used in 802.11ad and 802.11 ay, multiple technologies have been proposed, including, Single-User-MIMO (SU-MIMO), i.e., multiple streams, channel bonding, higher order modulation and non-uniform modulation. To support more features, wider usage scenarios, e.g., outdoor and mobility use cases, and overall system capacity, other technologies may be included in 802.11ay, for example Multi-User-MIMO (MU-MIMO) and enhanced relay.

Figure 9:
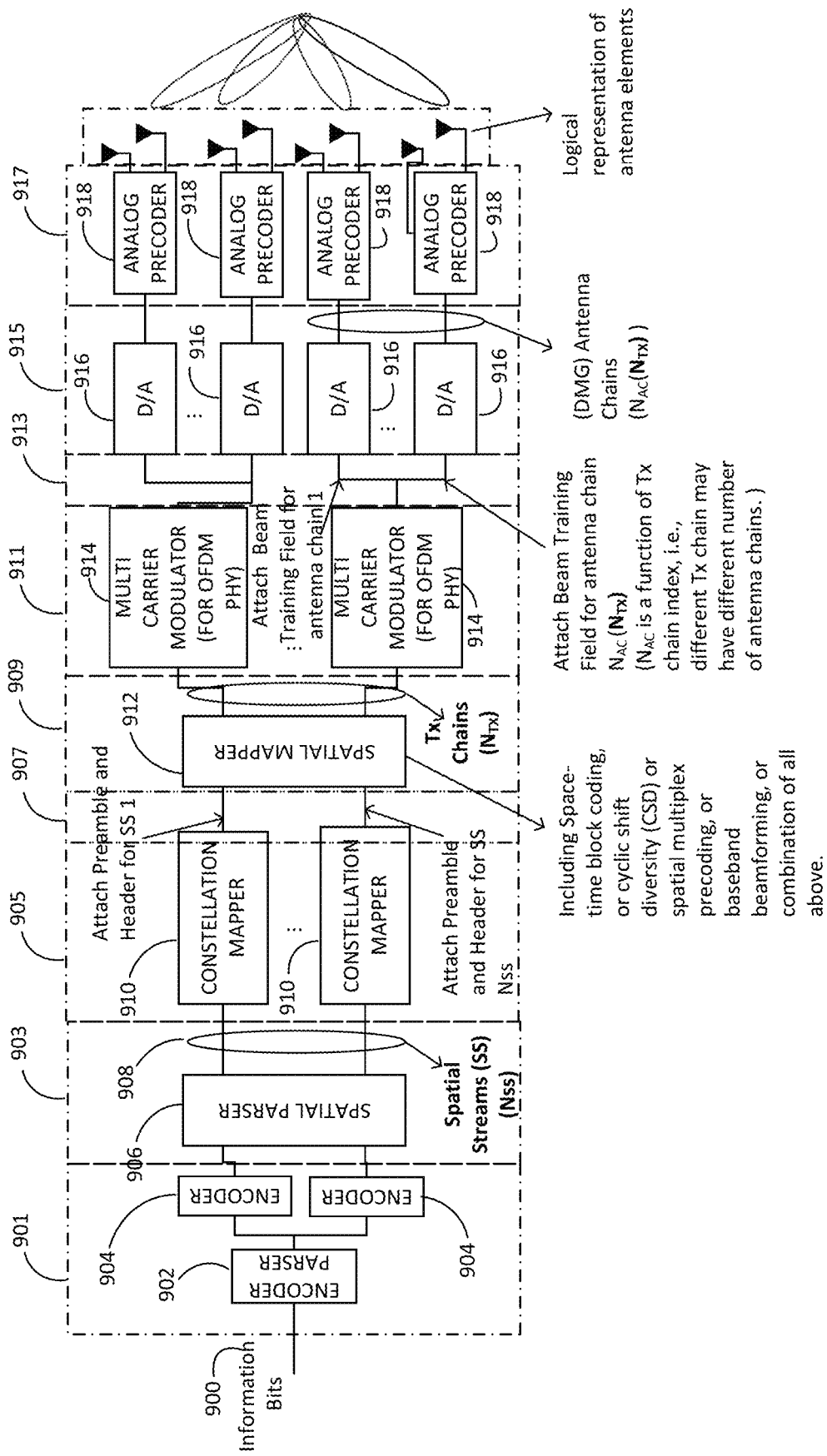
FIG. 9 illustrates a flowchart of performing MIMO transmissions.

FIG. 9 illustrates a flowchart of performing MIMO transmissions.

Referring to FIG. 9, information bits 900, which may also be referred to as data information bits 900, are inputted into an encoder parser 902 and one or more of encoders 904 in order to generate encoded data at operation 901. According to embodiments, a multiple encoder may be used when a packet size is very large. A coding rate of each of the encoders 904 may be selected from a modulation and coding scheme (MCS) table.

At operation 903, the encoded data, as generated at operation 901, may be provided to a spatial parser 906 in order to generate a plurality of spatial streams (SSs) 908 that are simultaneously transmitted to a receiver using MIMO technology. A quantity Nss may indicate a number of SSs in the plurality of SSs. At operation 905, respective binary sequences of each of the plurality of SSs 908 are mapped to the complex domain by a constellation mapper 910. According to an embodiment, the constellation mapper 910 may map the plurality of SSs 908 based on one or more of QPSK, 16QAM, π/2-BPSK, and/or any other similar and/or suitable modulation scheme. In some embodiments, different constellations and/or modulation schemes may be applied to different ones of the plurality of SSs 908, and a constellation and/or a modulation scheme to be applied may be determined based on the MCS table. An output of the constellation mapper 910 may be referred to as complex modulated symbols, and, according to an embodiment, the complex modulated symbols may be included in a data field of a packet, such as a PHY packet.

At operation 907, a preamble, which may also be a midamble and/or a postamble, may be attached to the data field of each PHY packet generated at operation 905, wherein the preamble includes one or more of a STF, a CEF, and a header field. According to an embodiment, a same or a different complex modulation applied to the data field may be applied to the fields included in the preamble. According to some embodiments supporting MIMO communications, orthogonal CEFs or low cross-correlation CEFs may be used for different spatial streams, such as different spatial streams among the plurality of SSs 908. At operation 909, a spatial mapper 912 processes the complex modulated symbols of all spatial streams of the plurality of SSs 908. The spatial mapper 912 may perform one or more of a Space-Time Block Coding (STBC), a Cyclic Shifting (for cyclic shifting diversity), and spatial multiplex recoding and beamforming. An output of the spatial mapper 912 may be referred to as a transmit (TX) chain.

According to certain embodiments, in a case where the PHY packet is an OFDM PHY packet, the complex symbols in each TX chain outputted by the spatial mapper 912 may be mapped to OFDM symbols and generated time-domain signals based on an inverse-discrete Fourier transform (IDFT) operation by a multi-carrier modulator 914, at operation 911. According to an embodiment, a guard interval (GI) may be attached to time-domain samples for each OFDM symbol, and a windowing operation may be performed after the attaching of the GI. According to an embodiment, the complex symbols in each TX chain may be transmitted from one or more DMG antenna chains. According to embodiments supporting simultaneous BRP operations, rather than sequential BRP operations, for each of the one or more DMG antenna chains, orthogonal beamforming training fields or low cross-correlation beam training fields, which may be referred to as training (TRN) fields, may be attached to the data field along with the preambles and header fields of respective DMG antenna chains, at operation 913. In a case where the DMG antenna chains for different TX chains use a same set of TRN fields, the beam refinement process for different TX chains may be done sequentially.

According to embodiments, outputs of operation 913, for each of the DMG antenna chains, are provided to respective digital/analog converters 916 at operation 915, and analog forms of the DMG antenna chains may be beamformed by respective analog precoders 918 at operation 917. The analog precoders 918 may be referred to as analog beamformers and may operate independently and/or collaboratively.

Method of Providing Backward Compatible CEFs for MIMO Transmissions

Multiple spatial layer transmission technology, for example SU-MIMO, may be used for providing and/or exceeding a 20 Gb/s throughput via multiple transmit antennas. To enable SU-MIMO, CEFs should be mutually orthogonal, that is, the CEFs should be generated and/or constructed so as to be mutually orthogonal CEFs, one for each spatial layer. Since backward compatibility and coexistence with legacy 802.11ad devices are needed for 802.11ay, a type of one of the CEFs used for 802.11ay may be the same as or similar to a type of CEF used in 802.11ad. Accordingly, an 802.11ay system needs to identify one or more CEFs such that the new CEFs and the CEF in 802.11ad are mutually orthogonal to each other and have the same and/or similar properties.

According to embodiments, two streams may be transmitted at the same time, or in other words, transmitted simultaneously. In such a case, $s_{uv} \in \mathbb{C}^{1 \times 1280}$ and $s_{vu} \in \mathbb{C}^{1 \times 1280}$ may be sequences respectively including the last 128 samples of STFs and CEFs of single carrier and OFDM transmissions in an IEEE 802.11ad system, where $\mathbb{C}$ is the field of complex numbers. Thus, according to embodiments, the vectors $s_{uv}$ and $s_{vu}$ may be given by:

$$s_{uv} = [-m_{Ga_{128}} \, m_{Gu_{512}} \, m_{Gv_{512}} \, -m_{Gb_{128}}]$$
$$s_{vu} = [-m_{Ga_{128}} \, m_{Gv_{512}} \, m_{Gu_{512}} \, -m_{Gb_{128}}]$$

where $m_{Ga_{128}} \in \mathbb{C}^{1 \times 128}$, $m_{Gu_{512}} \in \mathbb{C}^{1 \times 512}$, $m_{Gv_{512}} \in \mathbb{C}^{1 \times 512}$, and $m_{Gb_{128}} \in \mathbb{C}^{1 \times 128}$ are modulated Golay sequences, which may be expressed as:

$$m_{Ga_{128}} = Ga_{128} \odot r_{128}$$

$$m_{Gu_{512}} = Gu_{512} \odot r_{512}$$

$$m_{Gv_{512}} = Gv_{512} \odot r_{512}$$

$$m_{Gb_{128}} = Gb_{128} \odot r_{128}$$

where $Ga_{128} \in \mathbb{R}^{1 \times 128}$, $Gu_{512} \in \mathbb{R}^{1 \times 512}$, $Gv_{512} \in \mathbb{R}^{1 \times 512}$, $Gb_{128} \in \mathbb{R}^{1 \times 128}$ are Golay vectors that may be defined according to the IEEE 802.11ad standard, $\mathbb{R}$ is the field of real numbers, $$r_N = \left[ e^{j\frac{\pi}{2} 0} e^{j\frac{\pi}{2} 1} \ldots e^{j\frac{\pi}{2}(N-1)} \right]$$

which is for rotating the entries of the Golay vectors in the complex plane, and $\odot$ is the Hadamard product.

Figure 10:
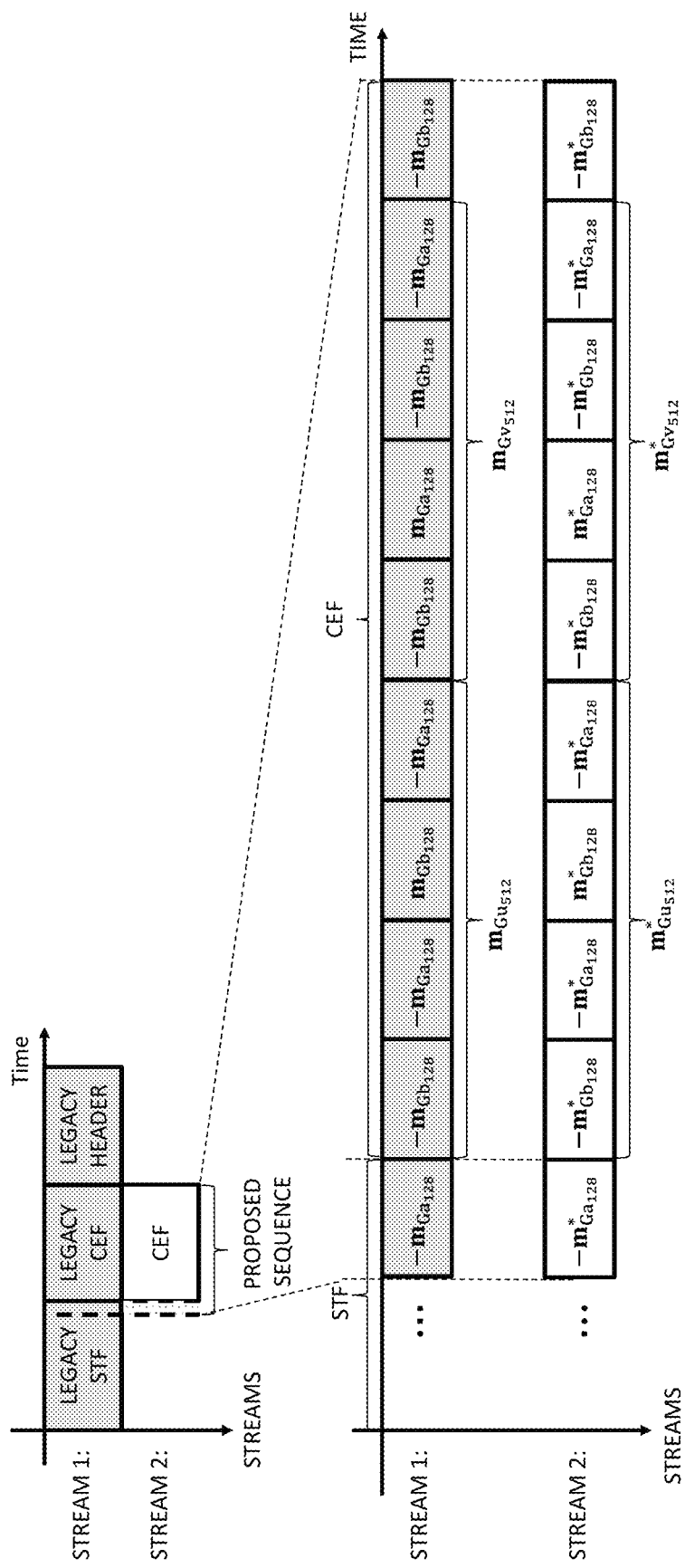
FIG. 10 illustrates Channel Estimation Fields (CEFs) for multiple streams of a single carrier transmission according to an embodiment.

FIG. 10 illustrates CEFs for multiple streams of a single carrier transmission according to an embodiment.

Referring to FIG. 10, a first sequence for stream 1 may come from legacy STF and legacy CEF(s). The first sequence for stream 1 may come from an MS preamble. In some embodiments, the vector $s_{uv}$ may correspond to the first sequence including the last part of the STF and the CEFs for an 802.11ad Single Carrier (SC) transmission, and $s_{vu}$ may correspond to a second sequence for the last part of STFs and the CEFs of an 802.11ad OFDM transmission. In the case of a multipath channel, the vectors $-m_{Ga_{128}}$ and $-m_{Gb_{128}}$ located at the right and left side of the vectors of $s_{uv}$ and $s_{vu}$ allow for the shifted versions $s_{uv}$ and $s_{vu}$ yield circular shifts for $m_{Gu_{512}}$ and $m_{Gv_{512}}$.

According to certain embodiments, in a case where two parallel streams are transmitted, the transmitter may generate the CEFs, including the last 128 samples of the STFs, of the streams by using the sequences defined in the 802.11ad standard, i.e., $s_{uv}$ and $s_{vu}$, and their conjugates, i.e., $s^*_{uv}$, and $s^*_{vu}$. In further detail, $s_{uv}$ and $s^*_{uv}$, may be used for streams in a SC transmission, and $s_{vu}$ and $s^*_{vu}$, may be used for stream in an OFDM transmission. Furthermore, by using the pair of $s_{uv}$ and $s^*_{uv}$, or the pair of $s_{vu}$ and $s^*_{vu}$, a maximum separation between the streams may be achieved, wherein the maximum separation between the streams is shown by the following observations:

(a) circshift$\{m_{Gu_{512}}, \tau\} \perp m_{Gu_{512}} |\tau| \leq 128$, $\tau \neq 0$
(b) circshift$\{m_{Gv_{512}}, \tau\} \perp m_{Gv_{512}} |\tau| \leq 128$, $\tau \neq 0$
(c) circshift$\{m^*_{Gu_{512}}, \tau\} \perp m^*_{Gu_{512}} |\tau| \leq 128$, $\tau \neq 0$
(d) circshift$\{m^*_{Gv_{512}}, \tau\} \perp m^*_{Gv_{512}} |\tau| \leq 128$, $\tau \neq 0$
(e) circshift$\{m_{Gu_{512}}, \tau\} \perp m^*_{Gu_{512}} |\tau| \leq 128$, $\tau \neq 0$
(f) circshift$\{m_{Gv_{512}}, \tau\} \perp m^*_{Gv_{512}} |\tau| \leq 128$, $\tau \neq 0$ wherein the circshift$\{a, n\}$ is an operator which applies n circular shifts from the left to right to the sequence a.

In certain embodiments, modulated symbol sequences used for CEFs may be designed for two data stream transmission. For example, a CEF for a first stream may have format $[m_{Gu512}, m_{Gv512} - m_{Gb128}]$, and a CEF for a second stream may have format $[m_{Gu512}^*, m_{Gv512}^* - m_{Gb128}^*]$. The modulated symbols used for the CEFs for the first stream and the second stream are illustrated in Table A. The first column may show a first modulated symbols corresponding to the CEF for the first stream with π/2 BPSK modulation. The second column may show a second modulated symbols corresponding to the CEF for the second stream with π/2 BPSK modulation. The third column may show a first modulated symbols corresponding to the CEF for the first stream without π/2 BPSK modulation. The fourth column may show a second modulated symbols corresponding to the CEF for the second stream without π/2 BPSK modulation. The operator $\odot$ corresponds to Hadamard product.

Figure 11:
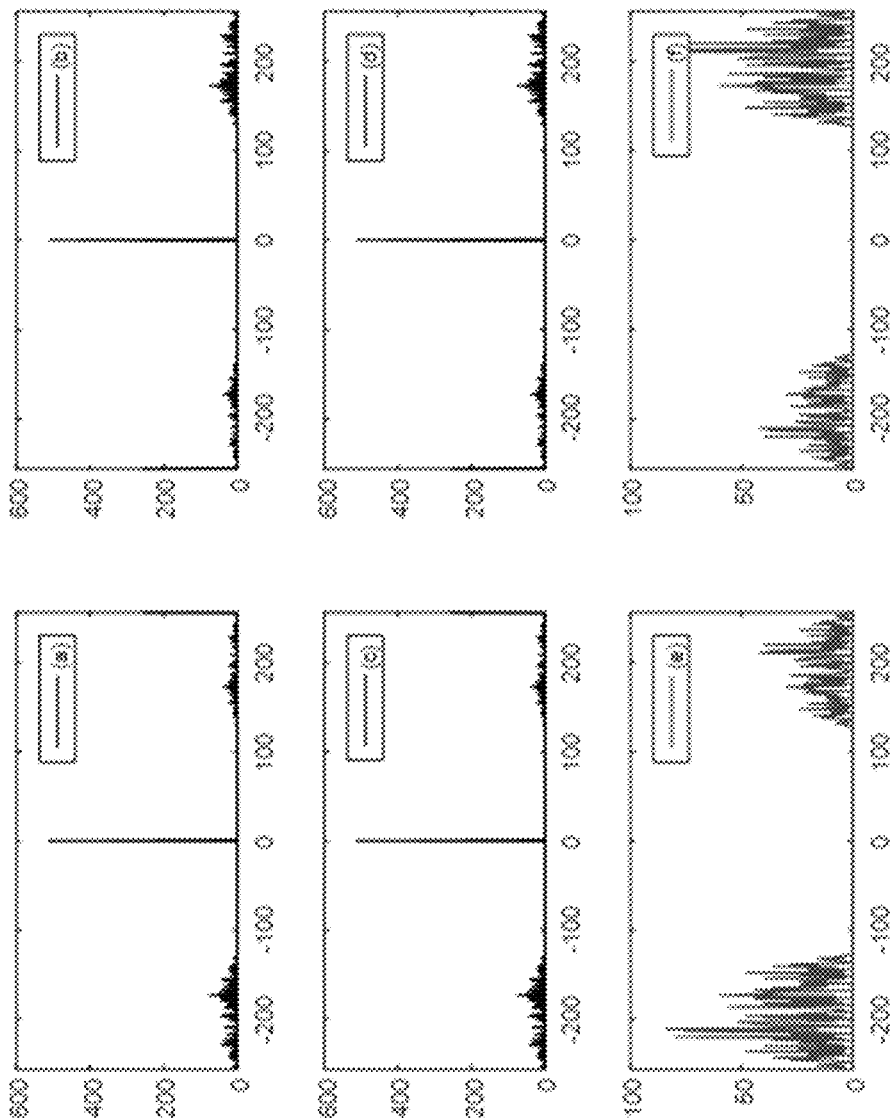
FIG. 11 illustrates autocorrelation zones and cross correlation zones of sequences $s_{uv}$ and $s_{vu}$ according to an embodiment.

FIG. 11 illustrates autocorrelation zones and cross correlation zones of sequences $s_{uv}$ and $s_{vu}$ according to an embodiment.

Referring to FIG. 11, the operations shown in (a)-(d) may indicate that $m_{Gu_{512}}$, $m_{Gv_{512}}$ and their conjugates have zero autocorrelation zones, the operations shown in (e)-(f) may indicate that the pair of $m_{Gu_{512}}$ and $m^*_{Gu_{512}}$ and the pair of $m_{Gv_{512}}$ and $m^*_{Gv_{512}}$ have zero cross-correlation zones. Since the number of elements in the vector $m_{Gu_{512}}$ is 512, the size of zero autocorrelation zone is 256, and the size of the zero cross-correlation zone is 256. Thus, according to embodiments, the proposed sequence may exploit all available degrees-of-freedom and may yield the maximum separation between the sequences. According to embodiments, because the sequences $s_{uv}$ and $s_{vu}$ have maximum separation, both 802.11ad and 802.11ay receivers may estimate the channels with ±128 taps by using Golay correlators.

According to certain embodiments, in a MIMO system and/or with respect to designing a MIMO system, orthogonality of a CEF (for example, a pilot signal, and/or a reference sequence) for multiple TX antennas may be implemented, executed, and/or achieved based on techniques similar to space-time coding. In some embodiments, in a case of a single TX antenna, a transmission time of a CEF may be increased by NT times (wherein, $N_T$ is a number of TX antennas). In other embodiments, in a case of more than one TX antenna, for example, $N_T=2$, one CEF (for example, which may have an increased transmission time) may be used instead of using two CEF. According to certain embodiments, and as discussed below, increasing the transmission time of CEFs may be extended and/or applied to cases with $N_T>2$, such as a case where $N_T=4$.

Figure 12:
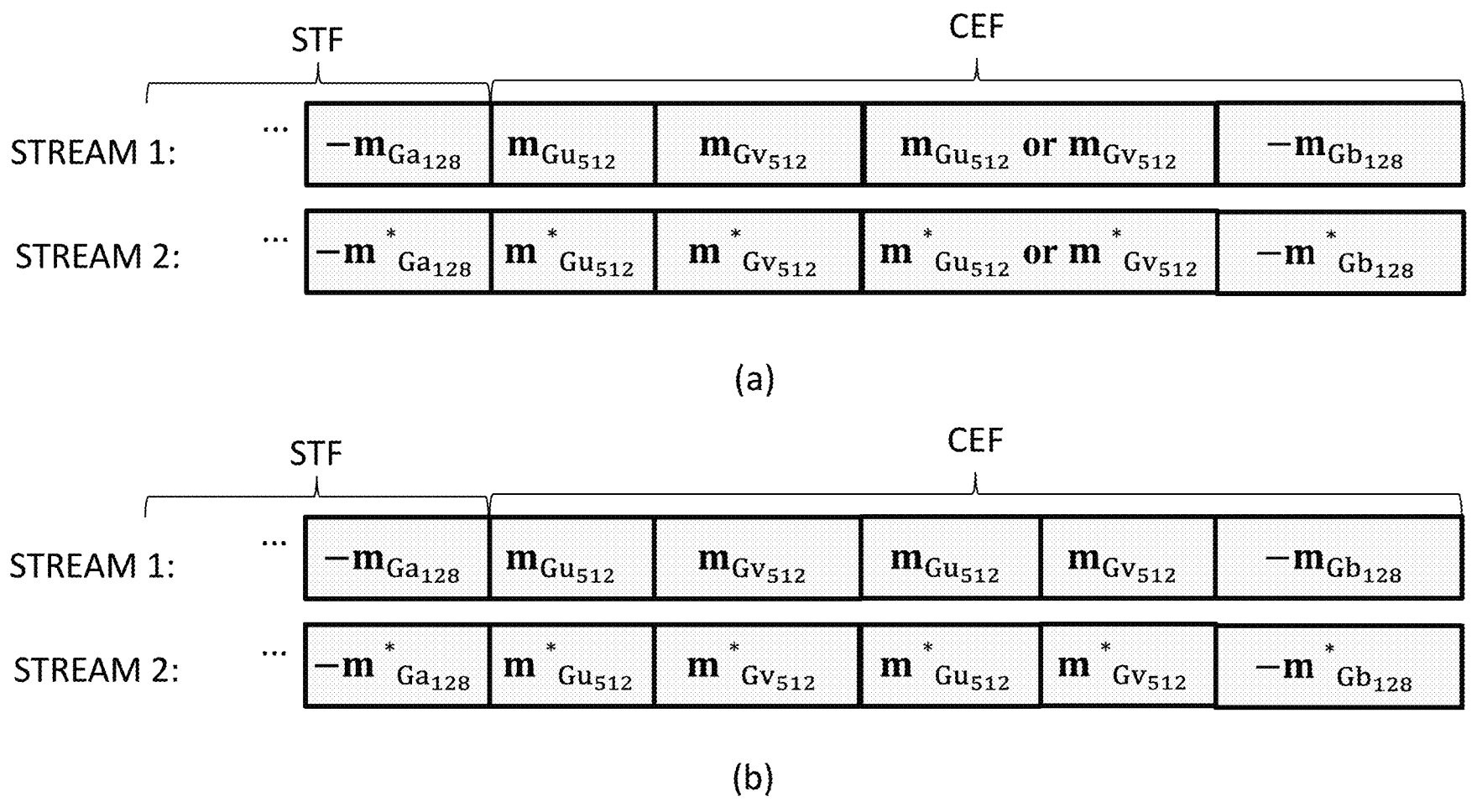

FIG. 12 illustrates extended CEFs for multiple streams according to an embodiment.

Referring to FIG. 12, a Signal-to-Noise Ratio (SNR) of an estimated channel may be increased. According to embodiments, parts of a CEF (for example, $[m_{Gu_{512}} \, m_{Gv_{512}}]$ parts of a CEF) may be extended by appending and/or repeating $m_{Gu_{512}}$, $m^*_{Gu_{512}}$, $m_{Gv_{512}}$, and $m^*_{Gv_{512}}$ in a CEF. According to certain embodiments, the extended CEFs may be used in certain cases, however, a CEF(s) that is not extended may be considered to be a default and/or baseline CEF structure, e.g., as used in many cases. According to certain embodiments, parts of a CEF may be extended by appending a corresponding cyclic suffix (for example, $-m_{Gb_{128}}$ and/or $-m^*_{Gb_{128}}$) in a CEF. FIG. 12, at parts (a) and (b) illustrates respective extensions of CEFs. However, the present disclosure is not limited thereto, and a reduced CEF may include any suitable and/or similar element for increasing a SNR.

Figure 13:
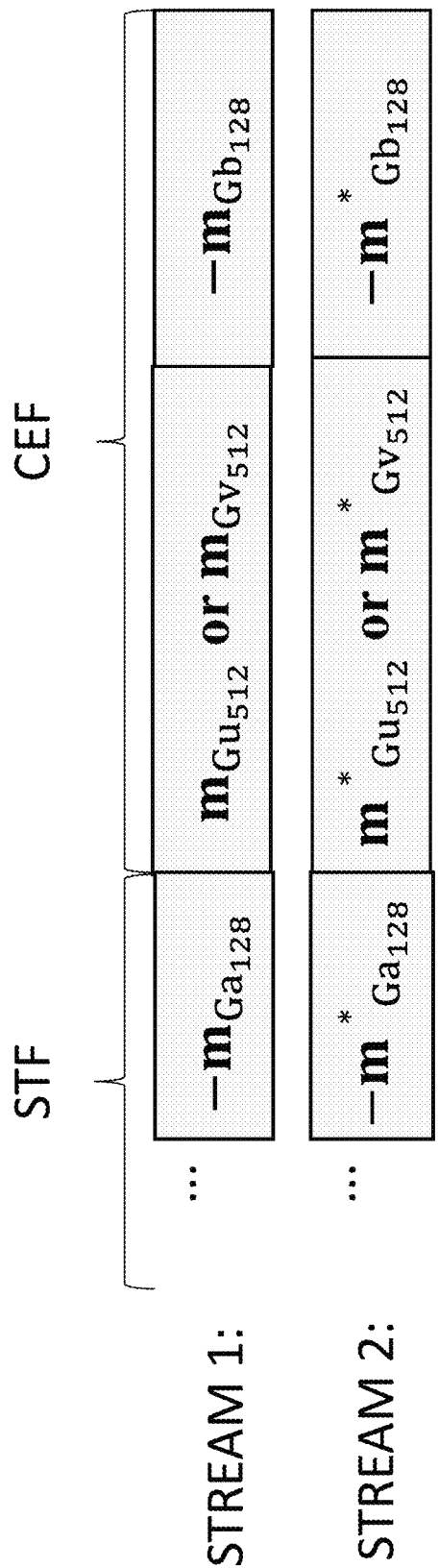
FIG. 13 illustrates reduced CEFs for multiple streams according to an embodiment.

FIG. 13 illustrates reduced CEFs for multiple streams according to an embodiment.

Referring to FIG. 13, a latency associated with a channel and/or a signal may be reduced. According to embodiments, a reduced CEF may be used to decrease associated latency. For example, a reduced CEF may include only $m_{Gu_{512}}$ or $m_{Gv_{512}}$. However, the present disclosure is not limited thereto, and a reduced CEF may include any suitable and/or similar element for reducing latency.

Method of Transmitting a Preamble and Header with Multiple Transmit Antennas

In order to provide backward compatibility of 802.11ay systems with legacy 802.11ad systems, a definition of the transmission method of a preamble, including a STF and a CEF, and the header part of the packet is needed.

Figure 14:
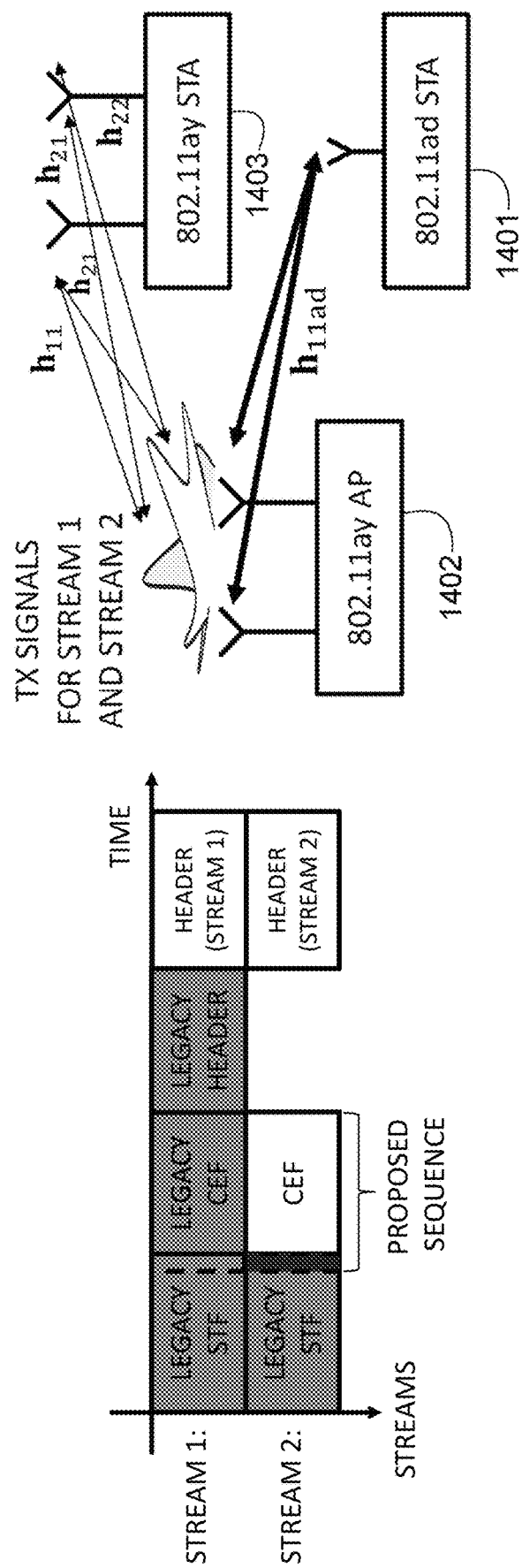
FIG. 14 illustrates interoperability of 802.11ad and 802.11ay systems according to an embodiment.

FIG. 14 illustrates interoperability of 802.11ad and 802.11ay systems according to an embodiment.

Referring to FIG. 14, an 802.11ad receiver 1401, which may be an 802.11ad STA, an 802.11ay transmitter 1402, which may be an 802.11ay AP, and an 802.11ay receiver 1403, which may be an 802.11ay STA, are illustrated. According to embodiments, in order for the 802.11ad receiver 1401 to successfully decode, or in other words correctly decode a received signal, the cross channel for Stream 1, i.e., $h_{11_{ad}}$, and the MIMO channels, i.e., $h_{11}$, $h_{12}$, $h_{21}$, and $h_{22}$, may be estimated respectively at the 802.11ad receiver 1401 and at the 802.11ay receiver 1402.

Figure 15:
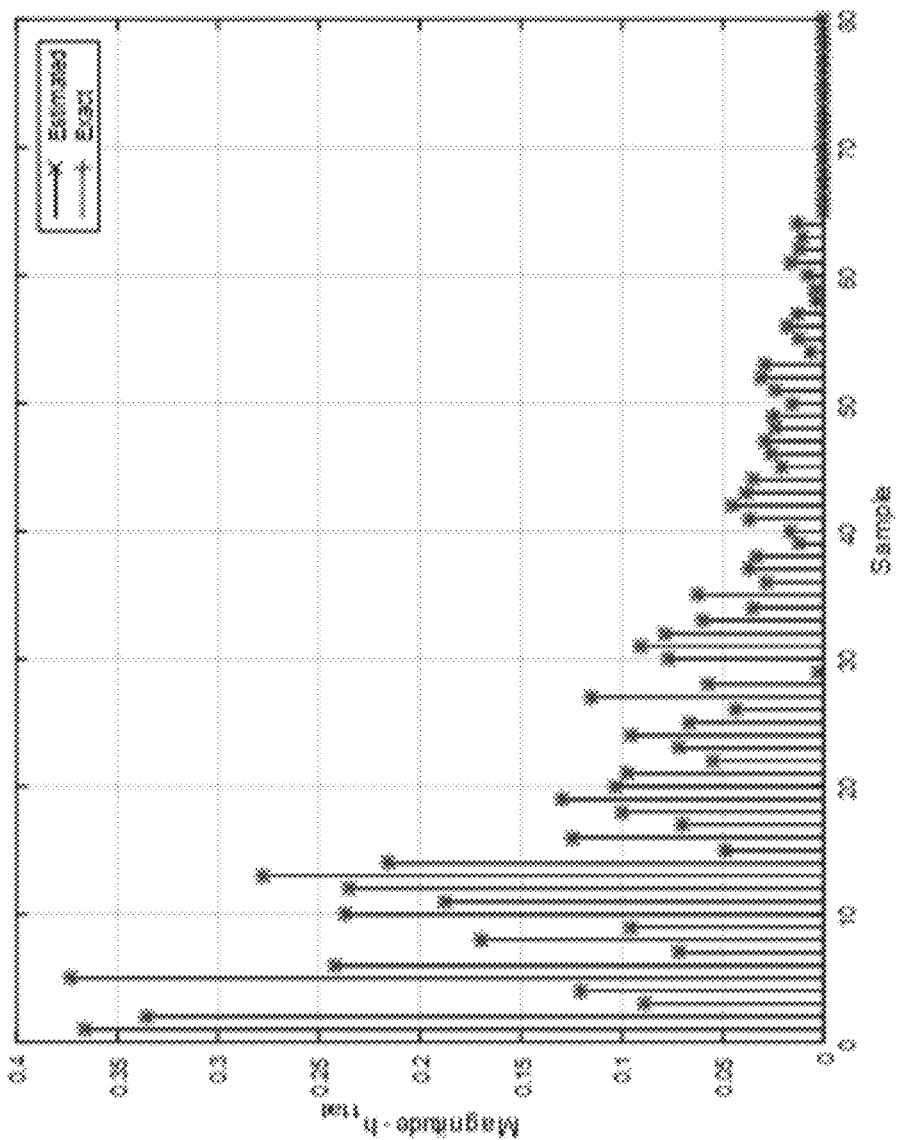
FIG. 15 illustrates channel estimation results of the 802.11ad receiver.
Figure 16:
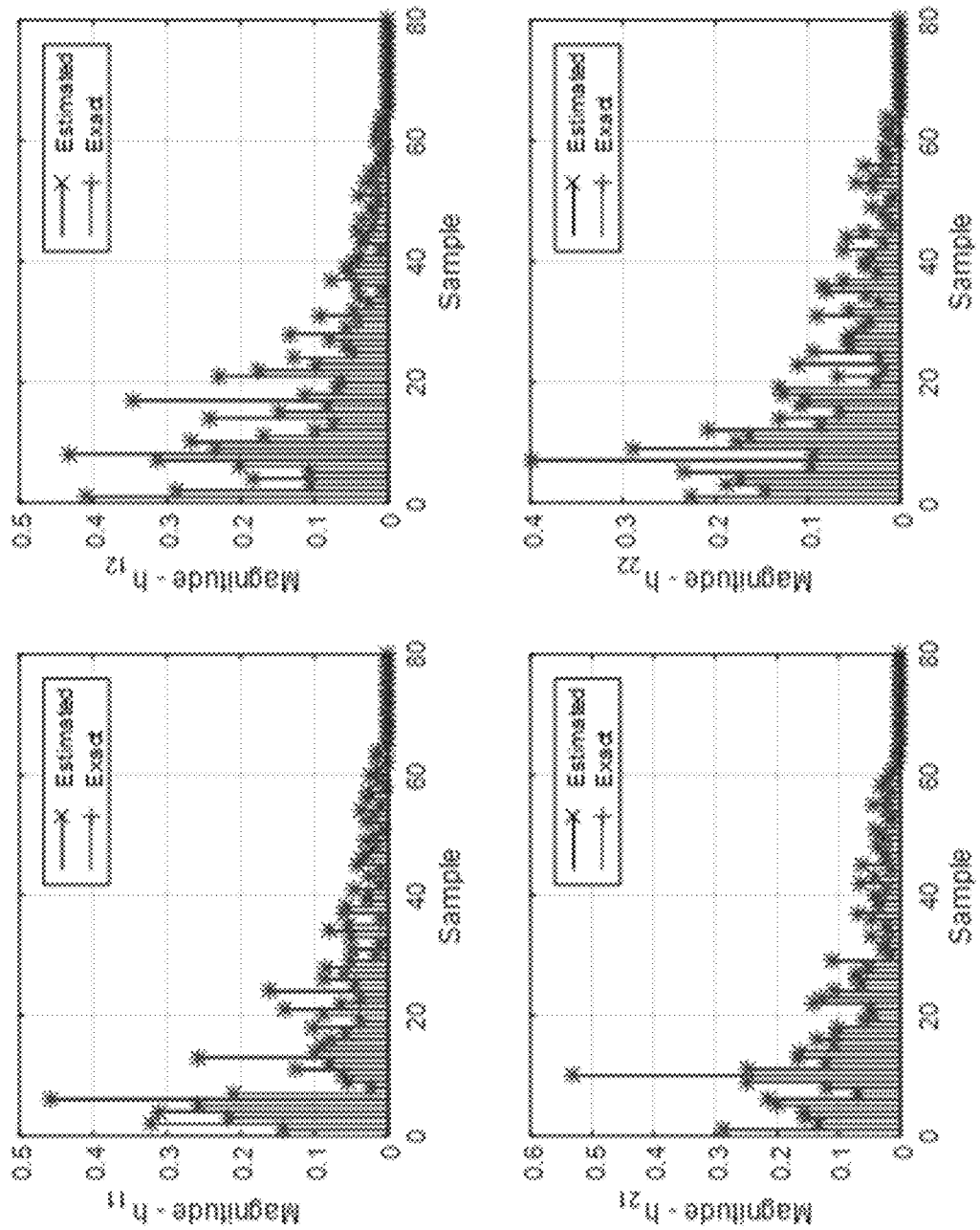
FIG. 16 illustrates channel estimation results of the 802.11ay receiver according to an embodiment.

FIG. 15 illustrates channel estimation results of the 802.11ad receiver; and FIG. 16 illustrates channel estimation results of the 802.11ay receiver according to an embodiment.

Referring to FIGS. 14, 15 and 16, according to embodiments using the aforementioned zero correlation zone properties of the Golay sequence, the estimated channel results at the 802.11ad receiver 1401 are shown in FIG. 15, and the estimated channel results at the 802.11ay receiver 1403 are shown in FIG. 16, for a random exponential delay channel. According to embodiments, perfect channel estimations may be achieved for both cross-channel and MIMO channels.

Figure 17:
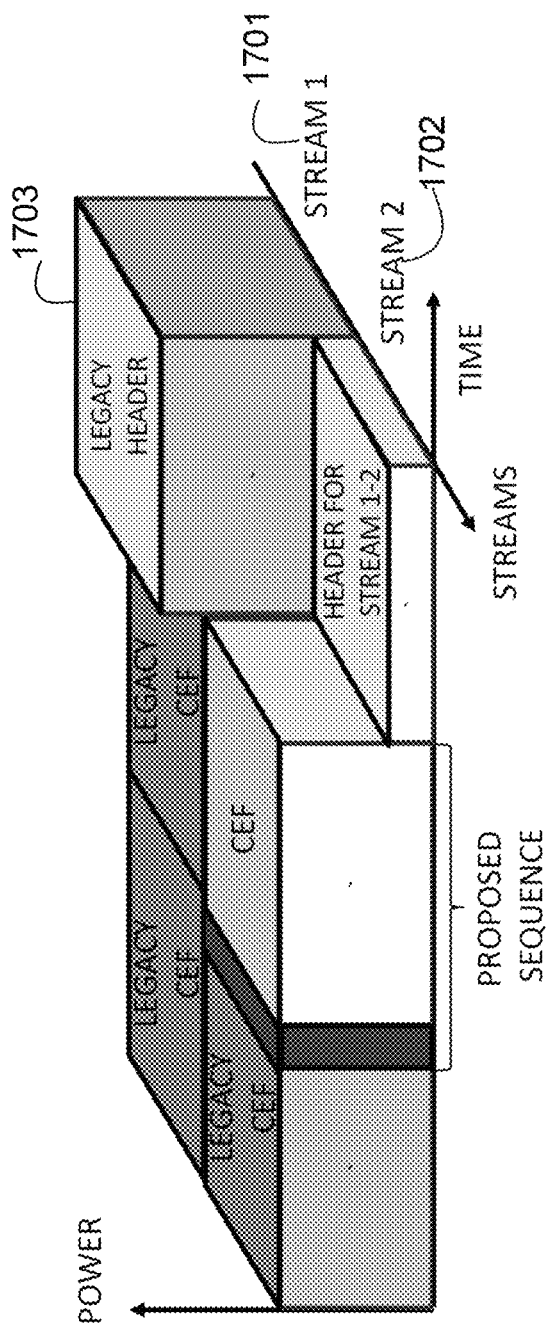
FIG. 17 illustrates a header for an 802.11 ay packet according to an embodiment.

FIG. 17 illustrates a header for an 802.11ay packet according to an embodiment.

Referring to FIG. 17, according to an embodiment, in order to transmit information related to the streams, extra header fields may be included for an embodiment using the aforementioned zero correlation zone properties of the Golay sequence, while providing a minimal overhead design for SU-MIMO transmissions. As shown in FIG. 17, header information related to a first stream 1701 and a second stream 1702 are transmitted over both the first and second streams 1701 and 1702. In order to minimize the overhead of the 802.11ay packet, existing bits in a legacy header 1703 may be used for the first stream 1701. Information related to new features of 802.11ay, e.g., information related to SU-MIMO, may be transmitted over the second stream 1702. According to embodiments, a format of the legacy header 1703 may be kept constant and the energy level for the second stream 1702 may be kept lower than that of the first stream 1701 so that the legacy header 1703 is decodable at 802.11ad receivers.

Method of Providing a CEF for Beam Tracking for Multiple Streams

According to embodiments, a BRP may be used to provide a needed link budget between a pair of STAs. For example, a WLAN that is an 802.11ad system may use a BRP for receiver training and iterative refinement of the antenna settings of both a transmitter and a receiver of both of the pair of STAs. For BRP, the channel estimation field defined for 802.11ad may be employed and transmitted repetitively during beam training and/or beam refinement operations. In a case in which multiple streams are supported, CEFs which allow the use of existing BRP may be needed.

Figure 18:
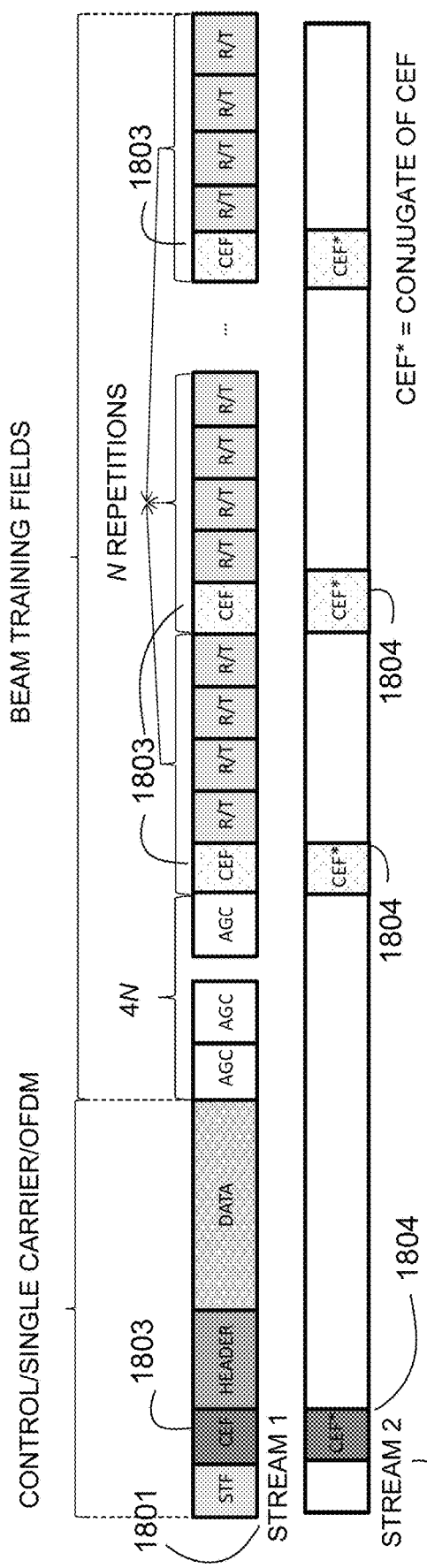
FIG. 18 illustrates CEFs for two streams, according to an embodiment.

FIG. 18 illustrates Channel Estimation Fields (CEFs) for two streams, according to an embodiment.

Referring to FIGS. 17 and 18, a first stream 1801 and a second stream 1802 may be use by BRP, or in other words, may be included in a BRP message. According to embodiments, a receiver, for example, an 802.11ay STA, an 802.11ay AP, and/or any other suitable and/or similar device, may simultaneously track two beams. In such a case, second CEFs 1804 of the second stream 1802, are used for BRP, or in other words, correspond to a second stream included in a BRP message, and a sector level sweep (SLS) message. The second CEFs are conjugates of first CEFs 1803 of the first stream 1801 used for BRP and SLS. According to embodiments, and as described above, the use of conjugate CEFs for the second stream 1802 may allow maximum separation between the first and second streams 1801 and 1802, and may yield perfect and/or approximately perfect channel estimation for antenna ports, for pairs of transmit antenna ports, and/or for an input of digital precoder of a transmitter, and a receive antenna port and/or an output of a digital precoder of a receiver, when a 2×2 MIMO system is considered. However, the present disclosure is not limited thereto, and two or more streams may be used for BRP and/or included in a BRP message.

In further detail, a CEF, such as the first and/or second CEFs 1603 and 1604, may be extended to allow N data stream MIMO transmissions, i.e., where N≥2 as described below. According to embodiments, CEFs illustrated in FIGS. 23 and 24 may also be used as and/or are similar to a CEF used in the beam training fields, or in other words, CEFs used for BRP and/or included in a BRP message.

CEF Designs for MIMO

According to embodiments, a method of tracking more than one stream may be applied to N data stream MIMO transmissions, where N≥2, and may be applied to SU-MIMO and MU-MIMO transmissions.

Figure 19:
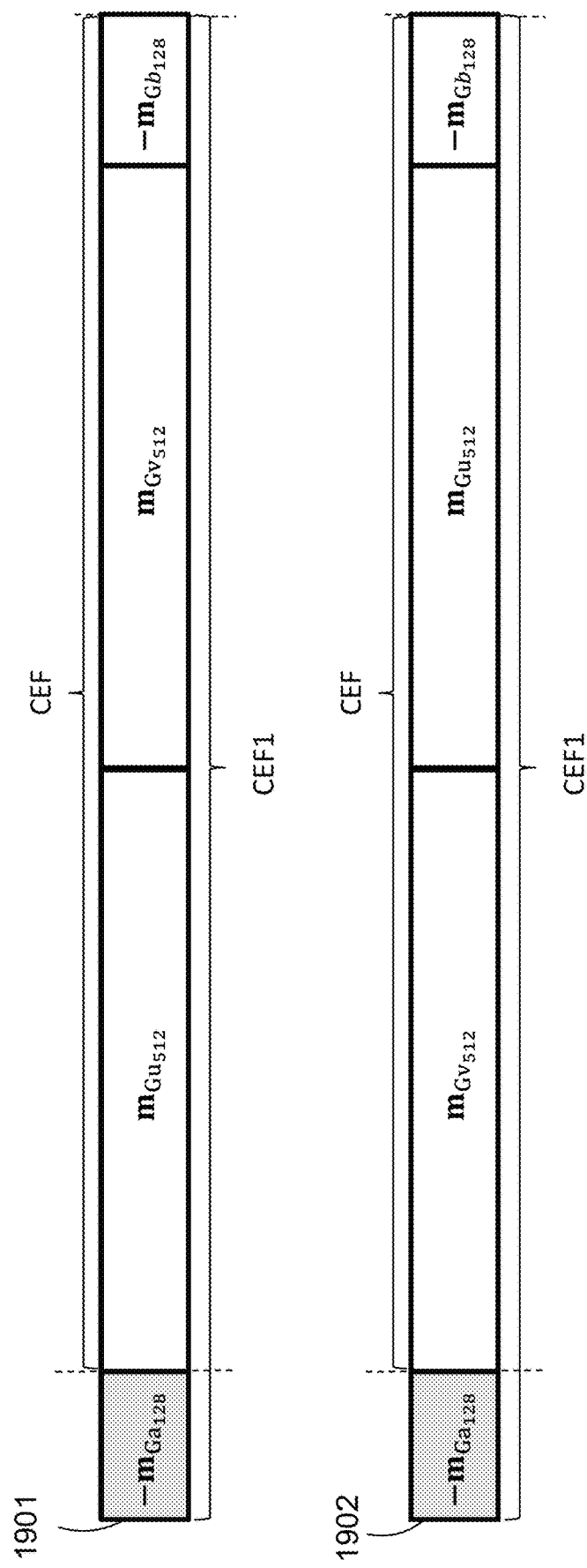
FIG. 19 illustrates an extra CEF according to an embodiment.

FIG. 19 illustrates an extra CEF according to an embodiment.

According to embodiments, extra CEFs may be inserted and/or used for MIMO channel estimation when the number of space-time streams, which may also be referred to as spatial streams, which may also refer to data streams, and/or streams, is greater than one. The extra CEFs, which may be referred to, and illustrated, as CEF1s, may be constructed based on the basic CEF sequences defined in 802.11ad. According to other embodiments, the CEF1s may be extended by prepending the last 128 symbols from a STF, as shown in FIG. 19. According to certain embodiments, a first CEF1 1901 may be referred to as, and/or determined according to, $s_{uv} \in \mathbb{C}^{1 \times 1280}$ and may be used for a SC frame type and/or a PHY frame type. A second CEF1 1902 may be referred to as, and/or determined according to, $s_{vu} \in \mathbb{C}^{1 \times 1280}$ for an OFDM frame type. According to some embodiments, extra CEFs, which may also be referred to as CEF1s, may be complex modulated symbols. Herein below, the term extra CEFs may refer to fields which may be composed of variations of a CEF1 described with respect to FIG. 19. However the present disclosure is not limited thereto, and an extra CEF may be composed, determined, and/or generated according to variations not based on the CEF1 described with respect to FIG. 19.

According to certain embodiments, including embodiments described and/or illustrated herein, a CEF1 and a CEF may be interchangeable. For example, a CEF1 may be replaced by a CEF, or vice versa.

Figure 20:
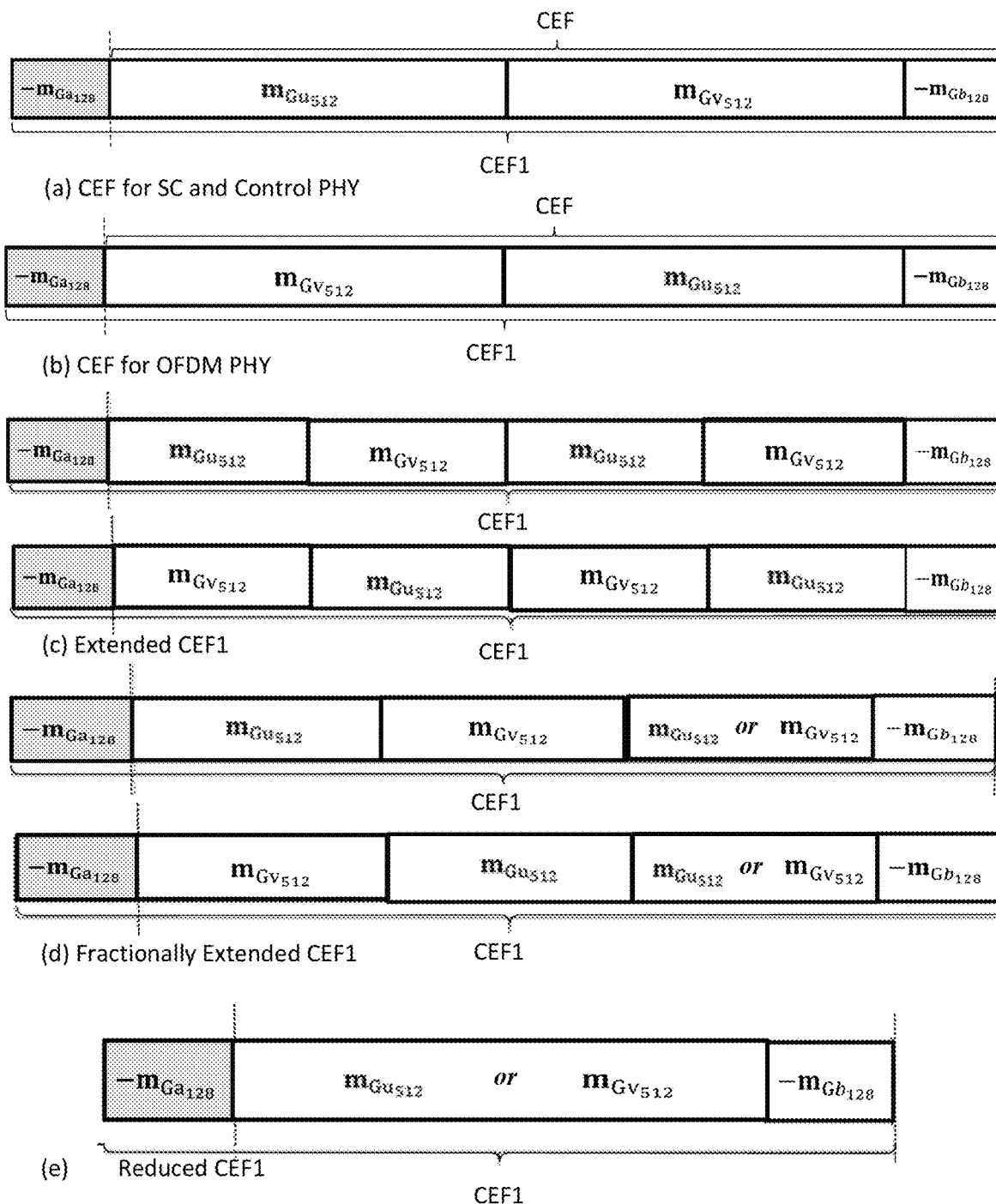
FIG. 20 illustrates CEFs for multiple streams according to an embodiment.

FIG. 20 illustrates CEFs for multiple streams according to an embodiment.

According to embodiments, a CEF may be constructed (e.g., configured, designed, etc.) in a variety of manners, types, and/or based on one or more parameters. According to certain embodiments, a size of a CEF may vary, e.g., may be changed. According to certain embodiments, a size of CEF1 may be changed and/or constructed according to a structure. For example, a size of a CEF1 may be changed according a structure (e.g., a proper structure) for certain parameters.

According to certain embodiments, in order to improve a SNR of an estimated channel, the $[m_{Gu_{512}}, m_{Gv_{512}}]$ and/or $[m_{Gv_{512}}, m_{Gu_{512}}]$ pair in a CEF1) may be duplicated (for example, may be extended), as shown in parts (a) and (b) of FIG. 20. According to other embodiments, in order to improve a SNR of an estimated channel, the $[m_{Gu_{512}}, m_{Gv_{512}}]$ and/or $[m_{Gv_{512}}m, m_{Gu_{512}}]$ pair in a CEF1 may be reduced (for example, may be shortened) between $-m_{Ga_{128}}$ and $-m_{Gb_{128}}$, as shown in parts (c) to (e) of FIG. 20. According to certain embodiments, any combination of elements of the above embodiments may be combined for improving a SNR of an estimated channel.

According to certain embodiments, a CEF1 may be configured and/or constructed in a variety of manners, types, and/or based on one or more parameters. In such a case, a transmitter may signal information related to a configuration and/or construction of a CEF1 is constructed. According to certain embodiments, information related to a configuration and/or construction of a CEF1 may be included in a New Header field, which will be discussed below. In any of the embodiments related to FIG. 20, a CEF1 may be replaced by a CEF.

Figure 21:
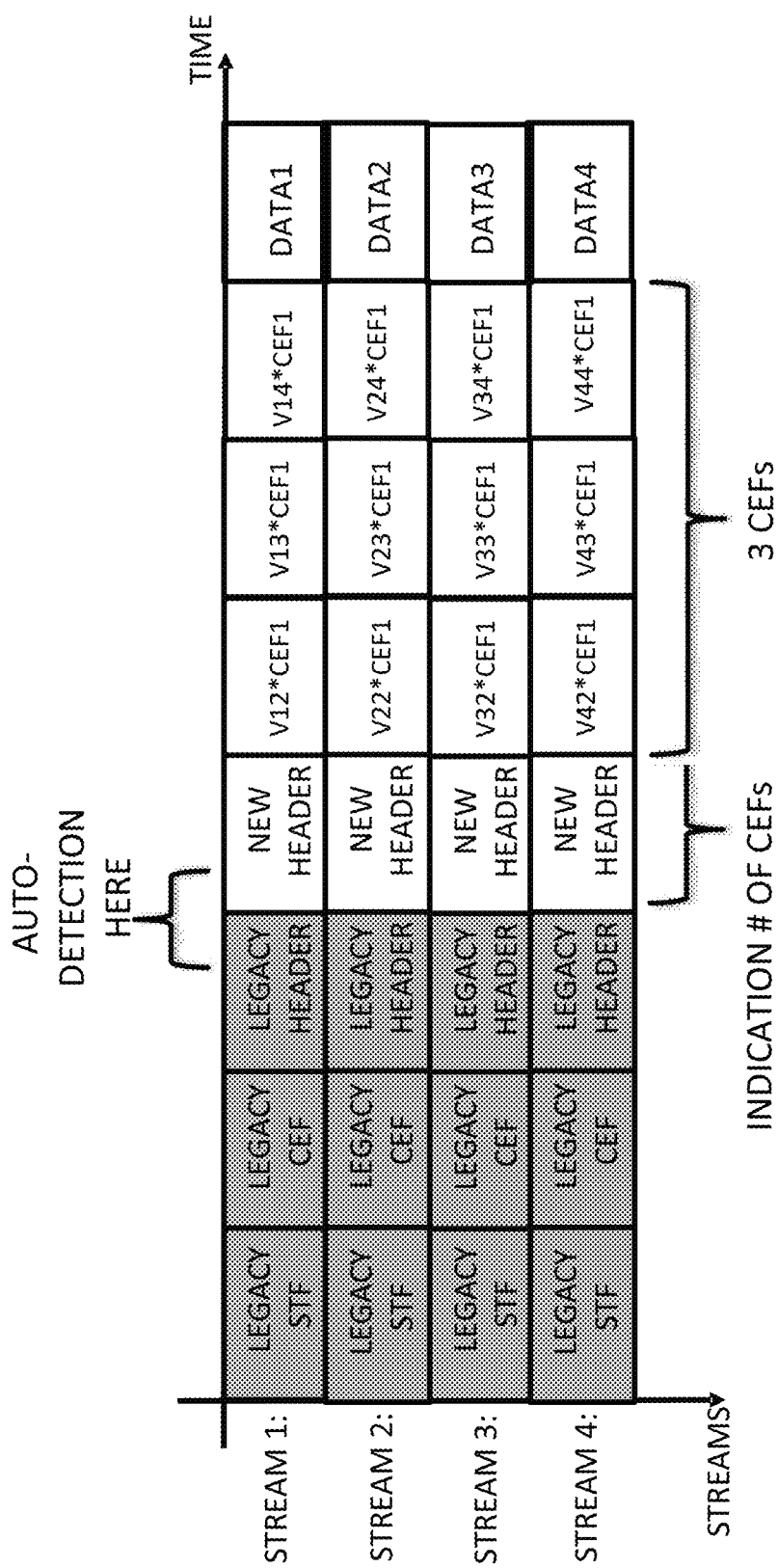
FIG. 21 illustrates a preamble and PHY header for MIMO transmissions, according to an embodiment.
Figure 22:
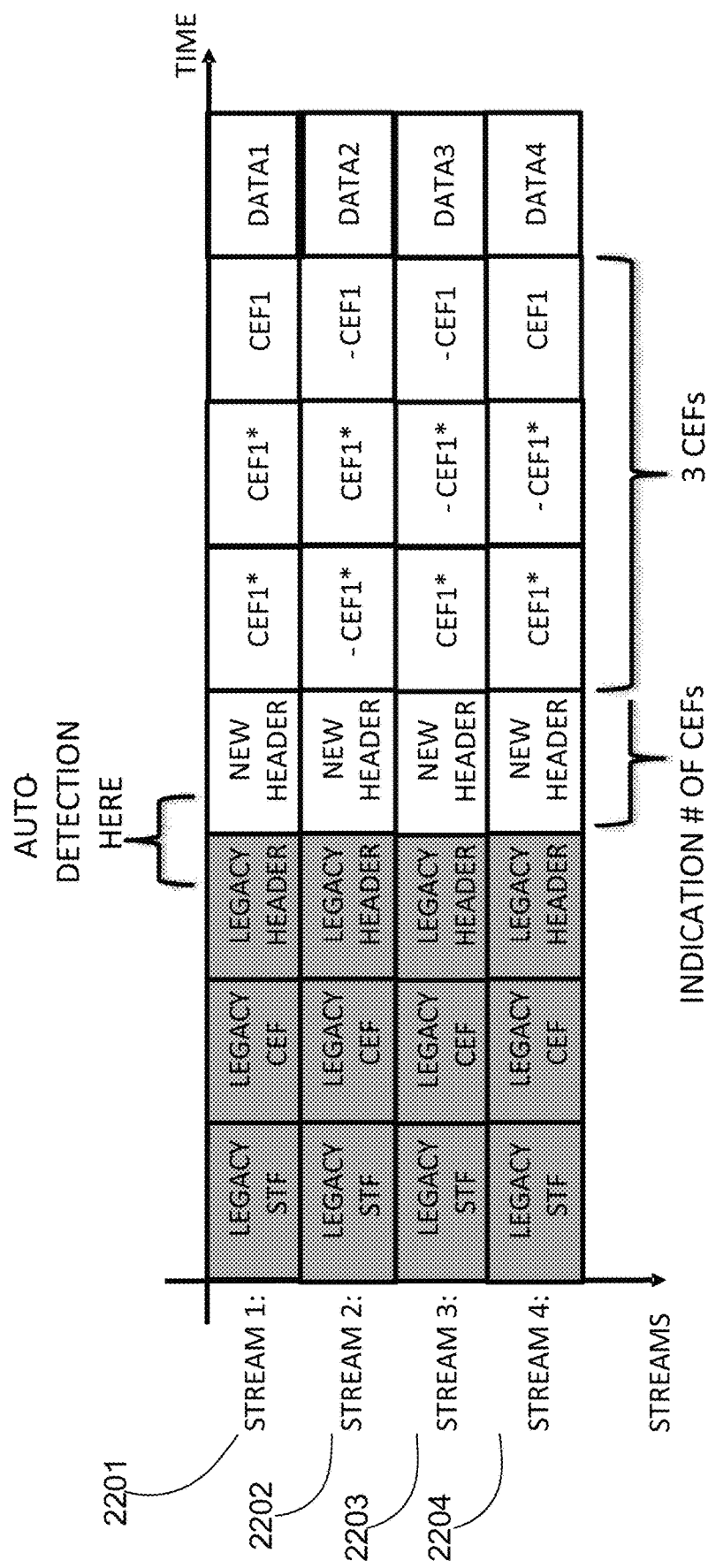
FIG. 22 illustrates a preamble and PHY header for MIMO transmissions according to another embodiment.

FIG. 21 illustrates a preamble and PHY header for MIMO transmissions, according to an embodiment, and FIG. 22 illustrates a preamble and PHY header for MIMO transmissions according to another embodiments.

Referring to FIGS. 21 and 22, according to one or more embodiments, a preamble and a PHY header may be for MIMO transmissions that include four data streams. However, the present disclosure is not limited thereto, and a preamble and PHY header may be for MIMO transmissions that include N data streams. According to embodiments, a legacy STF (L-STF), a legacy CEF (L-CEF) and a legacy header (L-Header) field may be the same as used in 802.11ad. Alternatively, different cyclic shifts may be applied to a L-STF, a L-CEF, and a L-Header field for a $2^{nd}$, a $3^{rd}$, and/or a $4^{th}$ data stream.

According to embodiments, a new header, which may also be referred to as a multi-stream (MS) header, may be inserted after the L-Header field. The new header may be encoded to be explicitly different from the data field defined in 802.11ad, such that the receiver may notice, or in other words, determine, that the new header is not part of a data transmission. According to certain embodiments, the new header, which may also be referred to as a new header field and/or an MS header field, may contain a parameter used to signal how many extra CEFs follow the new header field before a data transmission. According to certain embodiments, the new header may contain information related to a configuration and/or construction of a CEF1, for example, information related to any of the different configurations of CEFs illustrated in FIG. 21.

According to embodiments, extra CEFs, which may also be referred to as CEF1s, may be inserted after the new header field. The receiver may use the extra CEFs, together with the legacy CEF, for MIMO channel estimations. The number of extra CEFs used may be based on the number of space-time streams. According to other embodiments, if M space-time streams are transmitted, N extra CEFs may be used, wherein N≥M−1. For example, if 2 space-time streams are transmitted, then N may be equal to 1, if 4 space-time streams are transmitted, then N may be equal to 3, and if 3 space-time streams are transmitted, N may be 2 or 3. However, the present disclosure is not limited thereto, and N may be any value that suitably corresponds to M.

The CEF fields, including an extended L-CEF field which may include the last 128 symbols from a L-STF field and a L-CEF field, and extra CEFs, may be multiplied by an orthogonal matrix V, with size (N+1)×(N+1) as shown in FIG. 19. In further detail, according to embodiments, all symbols in the ith CEF field for the $j^{th}$ space-time stream, wherein the first CEF field may be the extended L-CEF field described above and the $k^{th}$ CEF field may be the $k-1^{th}$ CEF1 for k>1, may be multiplied by a constant number $V_{i,j}$. The V matrix may be defined as below:

$$V = \begin{pmatrix} V_{1,1} & \cdots & V_{1,N+1} \\ \vdots & \ddots & \vdots \\ V_{N+1,1} & \cdots & V_{N+1,N+1} \end{pmatrix}$$

According to embodiments, the first column of the V matrix may be fixed to 1. In such a case, the legacy CEF for different streams may not need to be modified and a legacy device may decode the legacy header. Additionally, the V matrix may be designed as an orthogonal matrix, for example:

$$V = \begin{bmatrix} 1 & 1 & 1 & 1 \\ 1 & -i & -1 & i \\ 1 & -1 & 1 & -1 \\ 1 & i & -1 & -i \end{bmatrix} \text{ or } V = \begin{bmatrix} 1 & -1 & -1 & 1 \\ 1 & 1 & -1 & -1 \\ 1 & -1 & 1 & -1 \\ 1 & 1 & 1 & 1 \end{bmatrix}$$

However, the present disclosure is not limited thereto, and other orthogonal matrices may be used as well.

Referring to FIG. 22, according to an embodiment, complex conjugate operators may be used to create orthogonality between spatial streams. However, the present disclosure is not limited to the choice of extra CEF fields as shown in FIG. 22. For example, the rows corresponding to streams may be interchanged, or in other words, the row for a third stream 2203 may be disposed between a first stream 2201 and a second stream 2202, while a fourth stream 2204 may be disposed adjacent to the second stream 1902 with respect to the configuration shown in FIG. 22.

Figure 23:
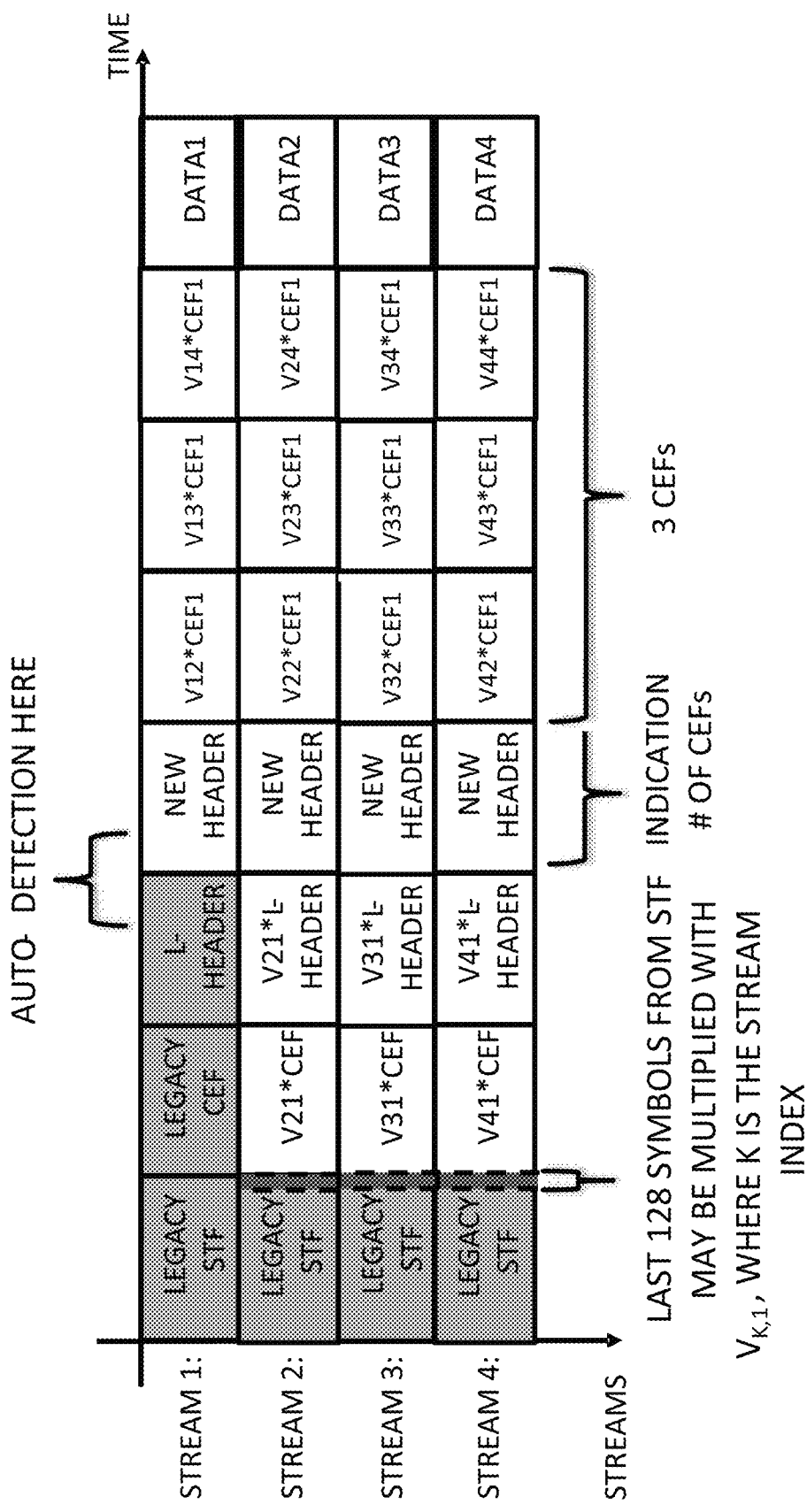
FIG. 23 illustrates a preamble and PHY header for MIMO transmissions according to another embodiment.

FIG. 23 illustrates a preamble and PHY header for MIMO transmissions according to other embodiments.

Referring to FIG. 23, the embodiment shown in FIG. 22 may be considered as an alternative to the embodiment shown in FIG. 21, using an orthogonal matrix V. According to embodiments, a first column of the orthogonal matrix V may be not fixed to 1s. Thus, starting from the second stream, instead of transmitting a L-STF, followed by a L-CEF, the extended L-CEF field, including the last 128 symbols from the L-STF and the L-CEF, may be multiplied by a coefficient from the orthogonal V matrix. Accordingly, $V_{k1}$*(extended L-CEF) is transmitted, where k is the stream index. Similarly, instead transmitting a L-Header directly through all the streams, $V_{k1}$*L-Header is transmitted. Thus the antenna configuration of the L-Header field is consistent with that of the L-CEF field, and the legacy device may decode the L-Header. According to embodiments, a similar strategy may be applied to the new header field too, such that V may be any orthogonal matrix, such as a P matrix utilized in 802.11n/ac, for example:

$$V = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

Figure 24:
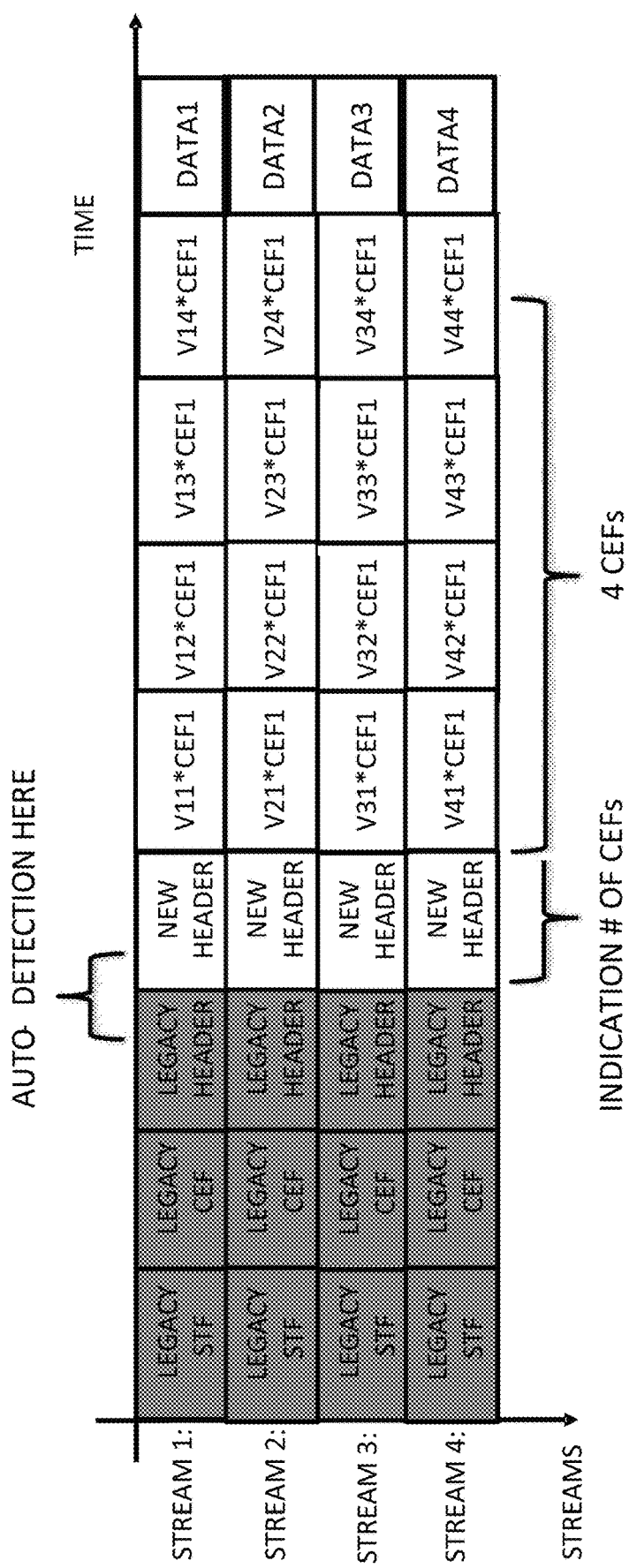
FIG. 24 illustrates a preamble and PHY header according to yet another embodiment.

FIG. 24 illustrates a preamble and PHY header according to yet another embodiment.

Referring to FIG. 24, a legacy CEF may not be combined with extra CEFs for MIMO channel estimation. Thus, according to embodiments, in a case of an M stream transmission, N=M new CEF fields may be used.

Figure 25:
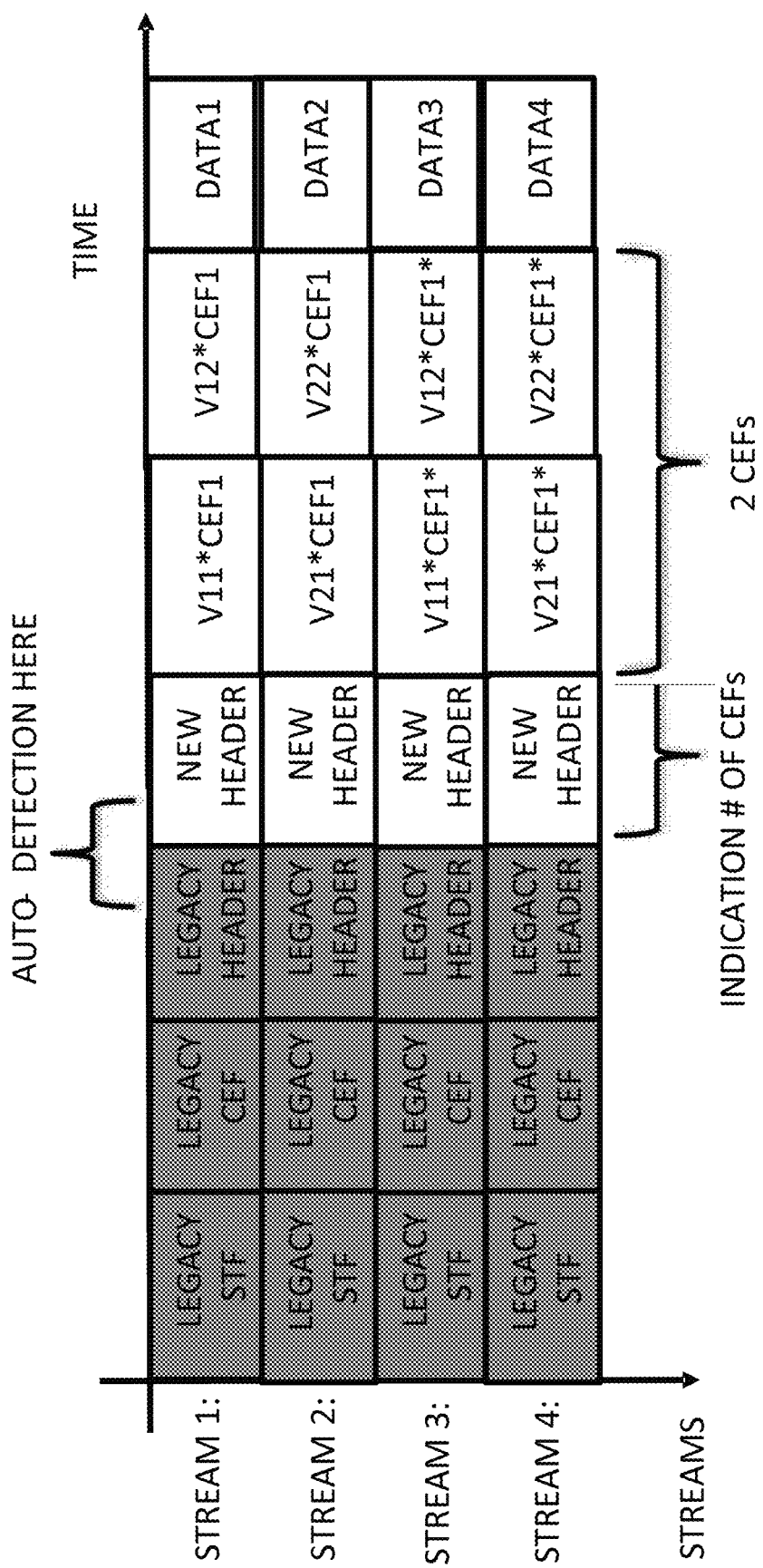
FIG. 25 illustrates a preamble and PHY header according to an embodiment.

FIG. 25 illustrates a preamble and PHY header according to an embodiment.

Referring to FIG. 25, a CEF resulting in less overhead is considered with respect to the embodiment shown in FIG. 10. According to certain embodiments, in a case where four streams may be transmitted, only two CEFs in MS preamble may be inserted after the new header field. The orthogonality between a first stream and a second stream may be maintained by the orthogonal matrix V with size 2×2. The first stream is orthogonal with a third stream due to a property of the CEFs shown in the embodiment of FIG. 10. The first and fourth streams are mutual orthogonal since the orthogonal matrix V and complex conjugate operators are applied. The first, second, third, and fourth streams may be placed in any order. Furthermore, other streams are mutual orthogonal according to the similar rules.

According to the embodiment of FIG. 25, V may be any 2×2 orthogonal matrix, for example:

$$V = \begin{pmatrix} V_{1,1} & V_{1,2} \\ V_{2,1} & V_{2,2} \end{pmatrix} = \begin{pmatrix} 1 & 1 \\ 1 & -1 \end{pmatrix} \quad (1)$$

Stream indices (e.g., stream 1-stream 4, in FIG. 25) and application of conjugation and orthogonal matrix operations may be exchanged in any order. For example: the first stream is orthogonal with the second stream due to a property of the CEFs as shown in FIG. 10. The first and third streams are mutual orthogonal since the orthogonal matrix V and complex conjugate operators are applied. Furthermore, other streams are mutual orthogonal according to the similar rules. The design may be extend to any number of spatial stream case by using different size of orthogonal matrix V.

Figure 26:
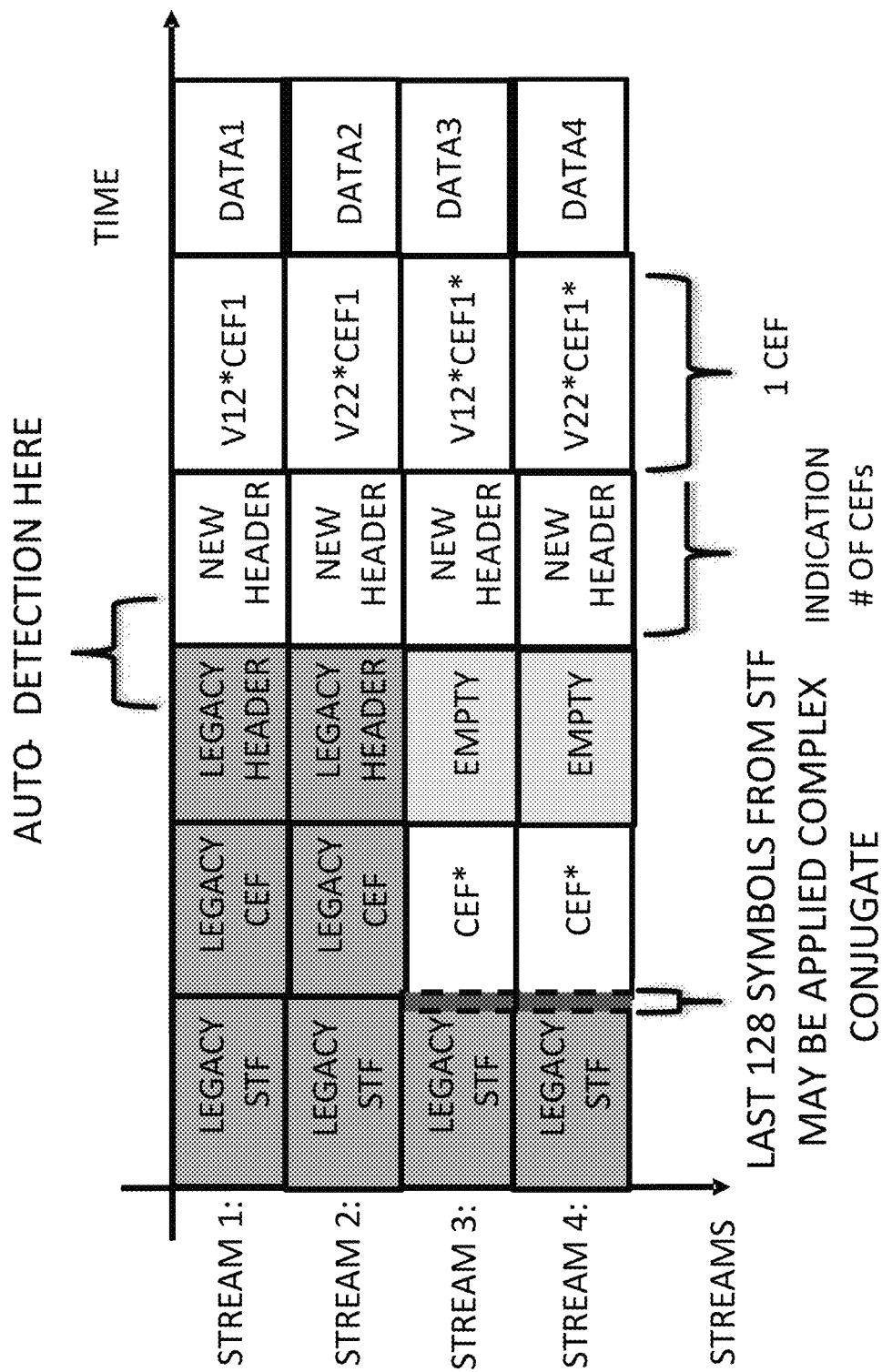
FIG. 26 illustrates a preamble and PHY header according to another embodiment.

FIG. 26 illustrates a preamble and PHY header according to another embodiment.

Referring to FIG. 26, overhead due to the extra CEFs may be reduced further. According to embodiments, an extended L-CEF field may be used and combined with the extra CEFs for MIMO channel estimation. A four stream transmission is shown in FIG. 23 to illustrate the CEF and header design, wherein only one extra CEF may be needed. According to the embodiment of FIG. 23, the V matrix may be defined as (1) (see above), where the elements in the first column are 1s. Thus the L-STF and the L-CEF field transmitted via a first stream and a second stream may be the same as used in 802.11ad. The extended L-CEF of a third stream and a fourth stream may be modified by performing a complex conjugate operation. A L-Header of the first stream and the second stream may be the same as used in 802.11ad, while the third stream and the fourth stream may not transmit the L-Header. The second column of the V matrix and the complex conjugate operator may be applied to the CEF1 as shown in FIG. 26.

According to the above discussed embodiments including a preamble and PHY header for MIMO transmission, the new header field may be used over, or in other words, use for, all the streams included in the MIMO transmission. However, the present disclosure is not limited thereto, and the new header field may be stream specific.

Method of Estimating a Channel of Multi-Stream Users in Close Proximity

In a case of a transmission to multiple users, the use of mutually orthogonal CEFs for each spatial layer and each user is needed, and thus, methods and procedures to identify and utilize the appropriate orthogonality method are needed.

Figure 27:
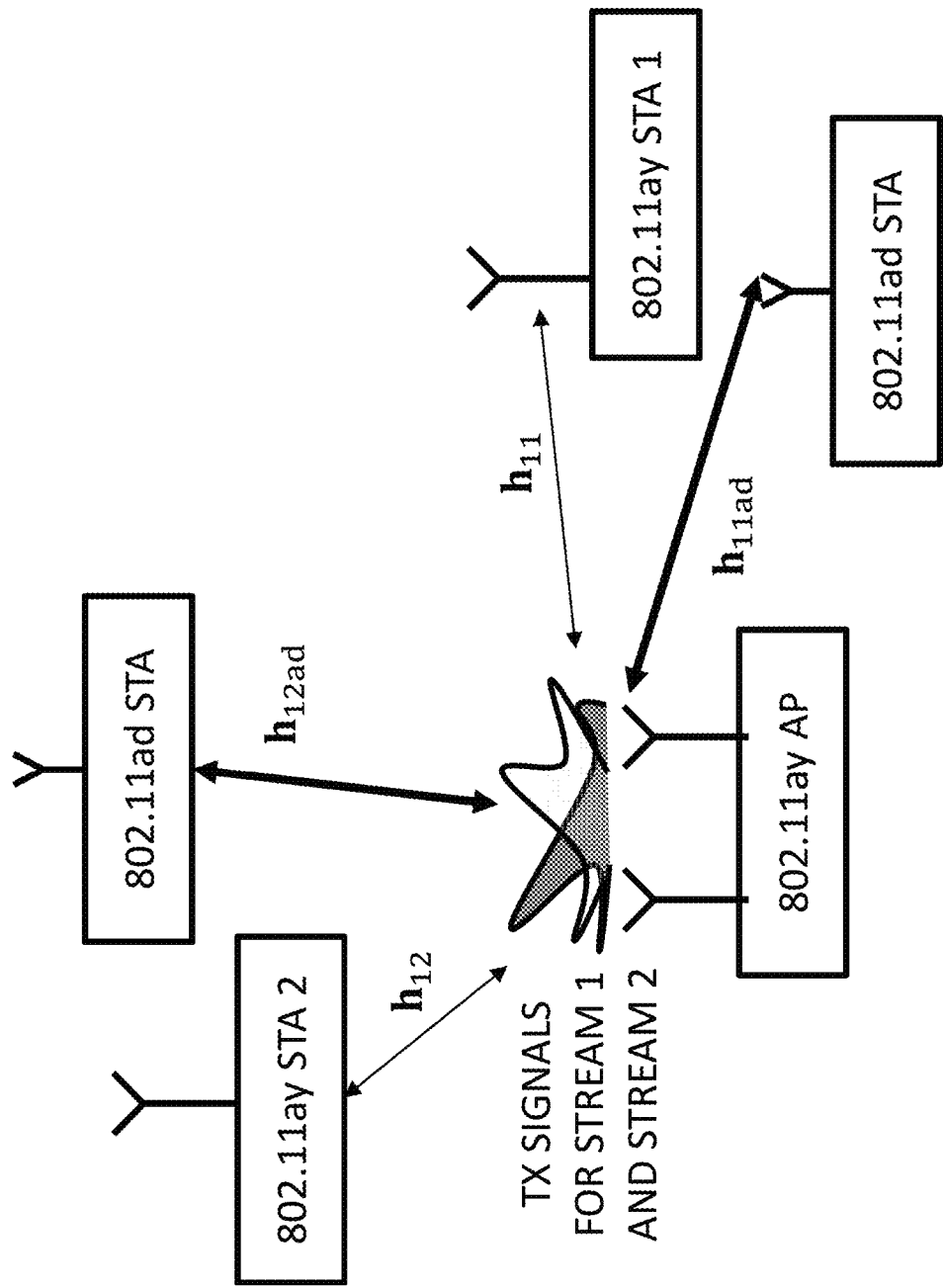
FIG. 27 illustrates a MU transmission having a large degree of separation according to an embodiment.

FIG. 27 illustrates a MU transmission having a large degree of separation according to an embodiment.

Figure 28:
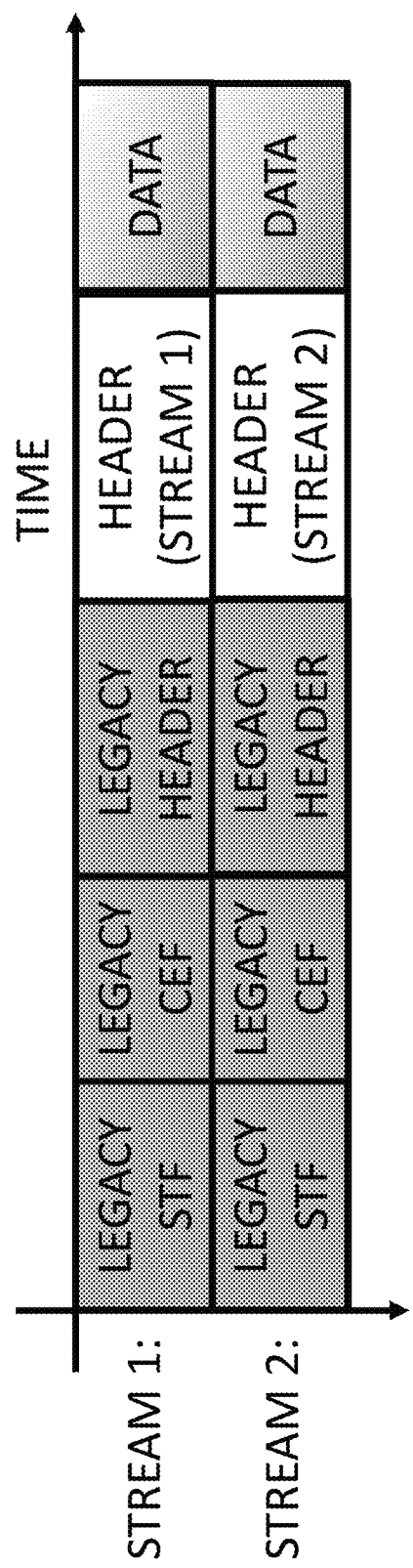
FIG. 28 illustrates a frame structure for a MU transmission having a large degree of separation according to an embodiment.

FIG. 28 illustrates a frame structure for a MU transmission having a large degree of separation according to an embodiment.

Figure 29:
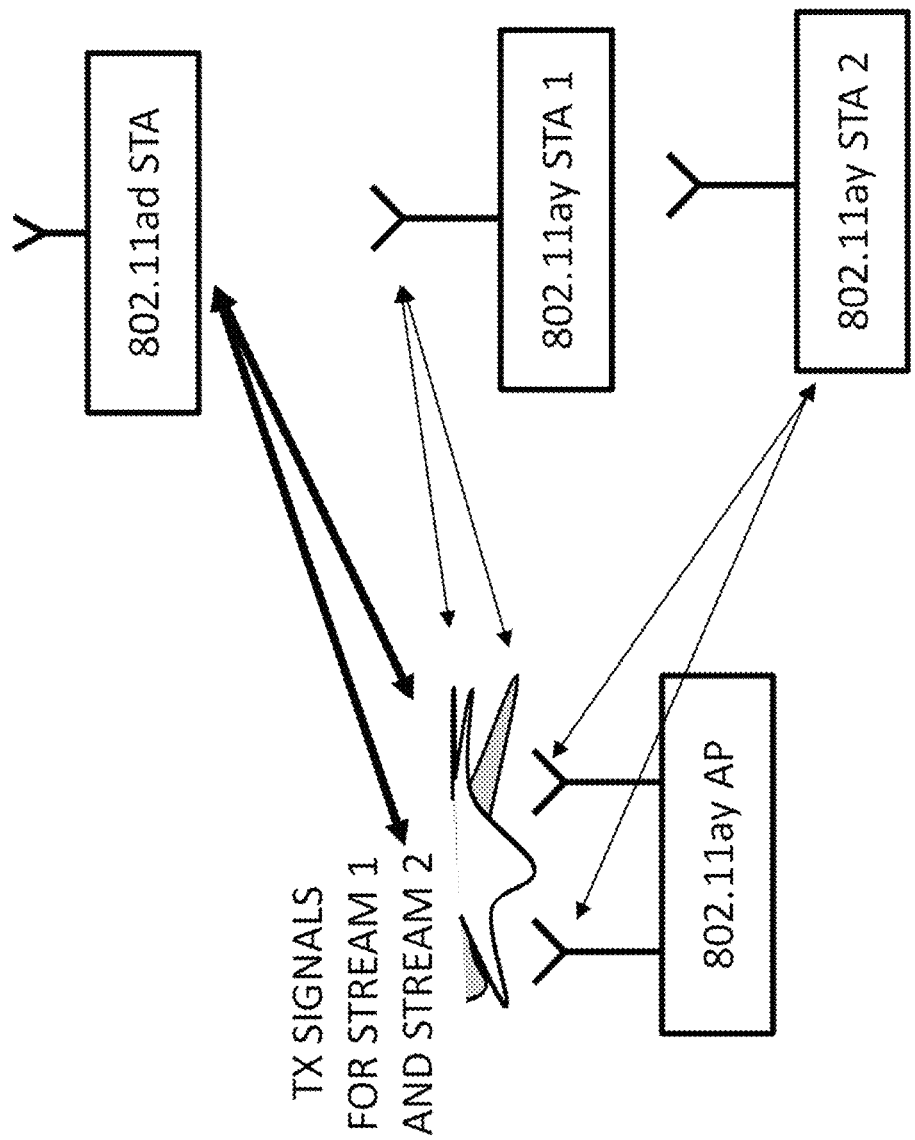
FIG. 29 illustrates a MU transmission having a small degree of separation according to an embodiment.

FIG. 29 illustrates a MU transmission having a small degree of separation according to an embodiment.

Figure 30:
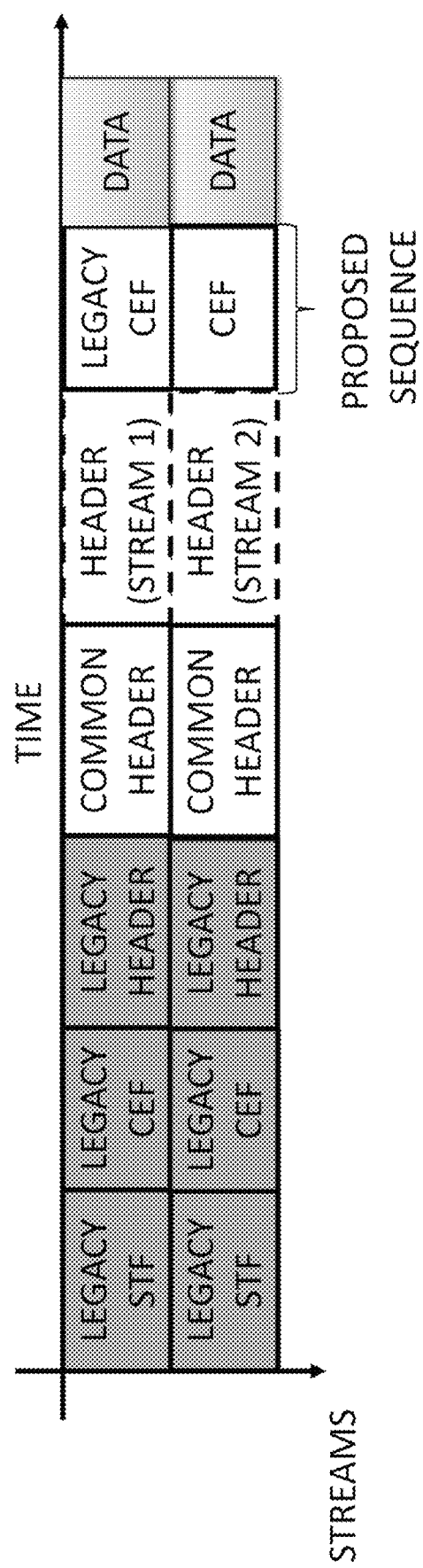
FIG. 30 illustrates a frame structure for a MU transmission having a small degree of separation according to an embodiment.

FIG. 30 illustrates a frame structure for a MU transmission having a small degree of separation according to an embodiment.

Referring to FIGS. 27 and 28, for a MU transmission, analog, digital or hybrid beamforming may be used to separate the streams meant for each user. According to embodiments, an extent to which the streams meant for each user are separated may depend on a degree of separation of the users; and the degree of separation may be determined by the spatial separation of the users and the efficacy of the beamforming scheme. According to embodiments, the CEF used in a MU transmission may be adapted based on the degree of separation of the users, allowing for the most efficient CEF to be sent for the MU transmission scenario.

According to embodiments, in a case where the degree of separation is large, independent streams, each with a respective set of CEFs, may be sent simultaneously to respective users, i.e., respective STAs, and the STAs may successfully perform channel estimation while legacy STAs may be able to successfully coexist with the transmissions, i.e., may be able to decode the header and decide that the packet is not for them, as shown in FIGS. 27 and 28.

Referring to FIGS. 29 and 30, according to another embodiment, in a case where the degree of separation is small, for example, in a case where multiple STAs may reside in the same or adjacent beams, additional measures may be needed to ensure that the CEFs are separable and the data is decodable. Separable CEFs may be designed using methods and procedures detailed with respect to the embodiments discussed above, as illustrated in FIGS. 29 and 30. According to embodiments, the header may contain information, such as a unique ID corresponding to a respective STA, that maps each user, i.e., STA, to the correct stream. According to embodiments, at each receiver the following signal is received:

$$y = h_{desired} s_{desired} + h_{undesired} s_{undesired} + n$$

wherein, $h_{desired}$ and $h_{undesired}$ may be known based on the separable CEFs, and the desired signal may be decoded at each receiver, especially in a case where the energy of the undesired signal is smaller than the desired signal due to partial spatial orthogonality based on transmit beamforming.

In such a case, according to embodiments, the following procedure may be performed. An AP may perform a Sector Level Sweep and Beam Refinement Protocol to identify the best beam for all STAs. The AP may identify STA1 and STA2 as residing in adjacent beams. The AP may send multi-user transmission to STA1 and STA2 using a frame structure illustrated in FIG. 24. The AP may transmit a legacy STF, LTF and SIG on both streams. In this case, each STA may see, or in other words, may receive and/or determine, the information as being transmitted in a large delay spread channel. The AP may transmit a common header that signals information on a number of users, specific user information, and a stream that each user is associated with. The AP may then transmit data to each user, and may transmit user specific information to each user.

Method of Providing a Training Field for Simultaneous Beam Training and MIMO Transmission In 802.11ad, the transmitter may have multiple DMG antennas, each of which could be a phased array, a single element antenna, or a set of switched beam antennas covered by a quasi-omni antenna pattern. Since 802.11ad supports single stream transmission, there is only one TX/RX chain in each transceiver. Therefore, when there are multiple DMG antennas, the beam training has to be done sequentially for each DMG antenna. In addition, in 802.11ay, multiple spatial layers may be transmitted and received simultaneously. This also provides the opportunity for refinement and/or training of steering vectors for multiple spatial layers at the same time. To support this functionality, the beam training field needs to be redesigned.

Figure 31:
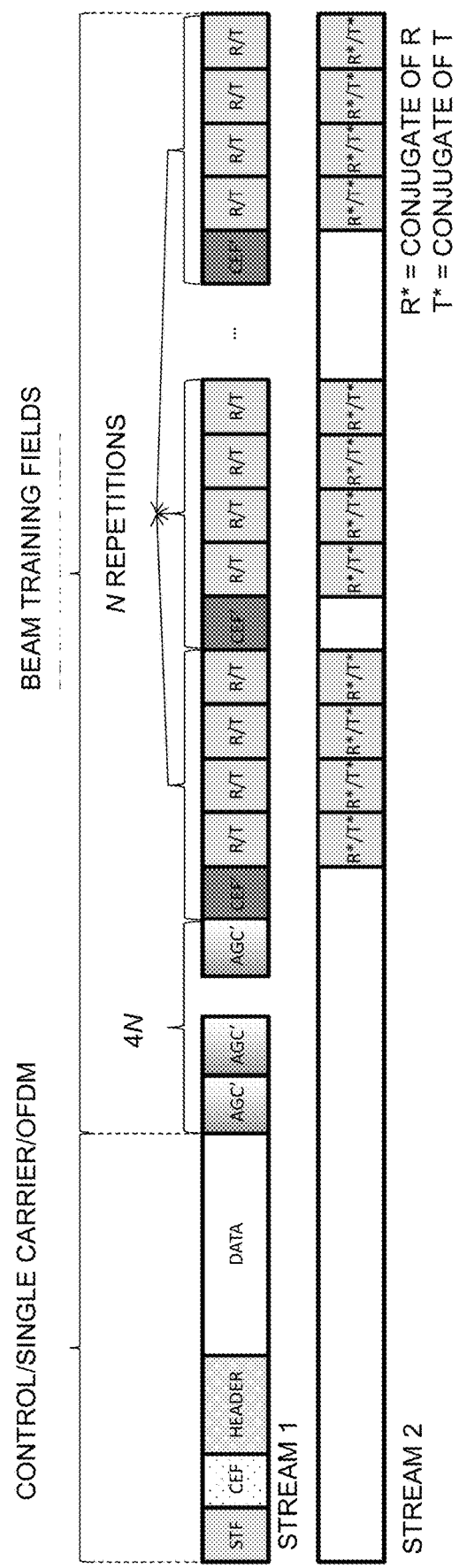
FIG. 31 illustrates receive/transmit (R/T) sequences for two steams.

FIG. 31 illustrates receive/transmit (R/T) sequences for two steams.

Referring to FIG. 31, according to an embodiment, new beam training fields may allow for simultaneous refinement and/or training of the steering vectors. According to embodiments that provides simultaneous refinement and/or training of the steering vectors, the receiver may estimate the channels between each pair of transmit antenna ports, and/or an input of a digital precoder of a transmitter, and a receive antenna port, and/or an output of a digital precoder of a receiver, while the transmitter/receiver changes its own steering vectors. For this purpose, the sequences with perfect autocorrelation and cross correlation properties in the beam training fields are highly desirable for accurate channel estimation. In order to achieve maximum utilization of the sequence, the modulated R/T sequences of 802.11ad, which are discussed above with respect to FIG. 8, and their complex conjugates may be employed in the streams. According to embodiments, a configuration that may achieve a maximum utilization of the sequence is illustrated in FIG. 31

Referring to FIG. 31, according to an embodiment, Let T and R be the sequences for R/T of 802.11ad and express the vector T and vector R as:

$$T=R=[s_{cp}\ s_{main}]$$

wherein, $$s_{main}=[-m_{Gb_{128}} m_{Ga_{128}} m_{Gb_{128}} m_{Ga_{128}}]$$

and, $$s_{cp}=[m_{Ga_{128}}].$$

Then, the following arguments (a) through (c), which allow channel estimations between each pair of transmit antenna ports, or an input of a digital precoder of a transmitter, and a receive antenna port, or an output of a digital precoder of a receiver, must hold true.

(a) circshift$\{s_{main}, \tau\} \perp s_{main}|\tau| \leq 128, \tau \neq 0$
(b) circshift$\{s^*_{main}, \tau\} \perp s_{main}|\tau| \leq 128, \tau \neq 0$
(c) circshift$\{s_{main}, \tau\} \perp s^*_{main}|\tau| \leq 128$ While arguments (a) and (b), according to embodiments, may ensure that the sequences allow perfect channel estimation for each individual pair of transmit antenna ports or an input of a digital precoder of a transmitter, and a receive antenna port, or an output of a digital precoder of a receiver, argument (c) may ensure that there is no cross-interference between different channels at the receiver after correlation.

Figure 32:
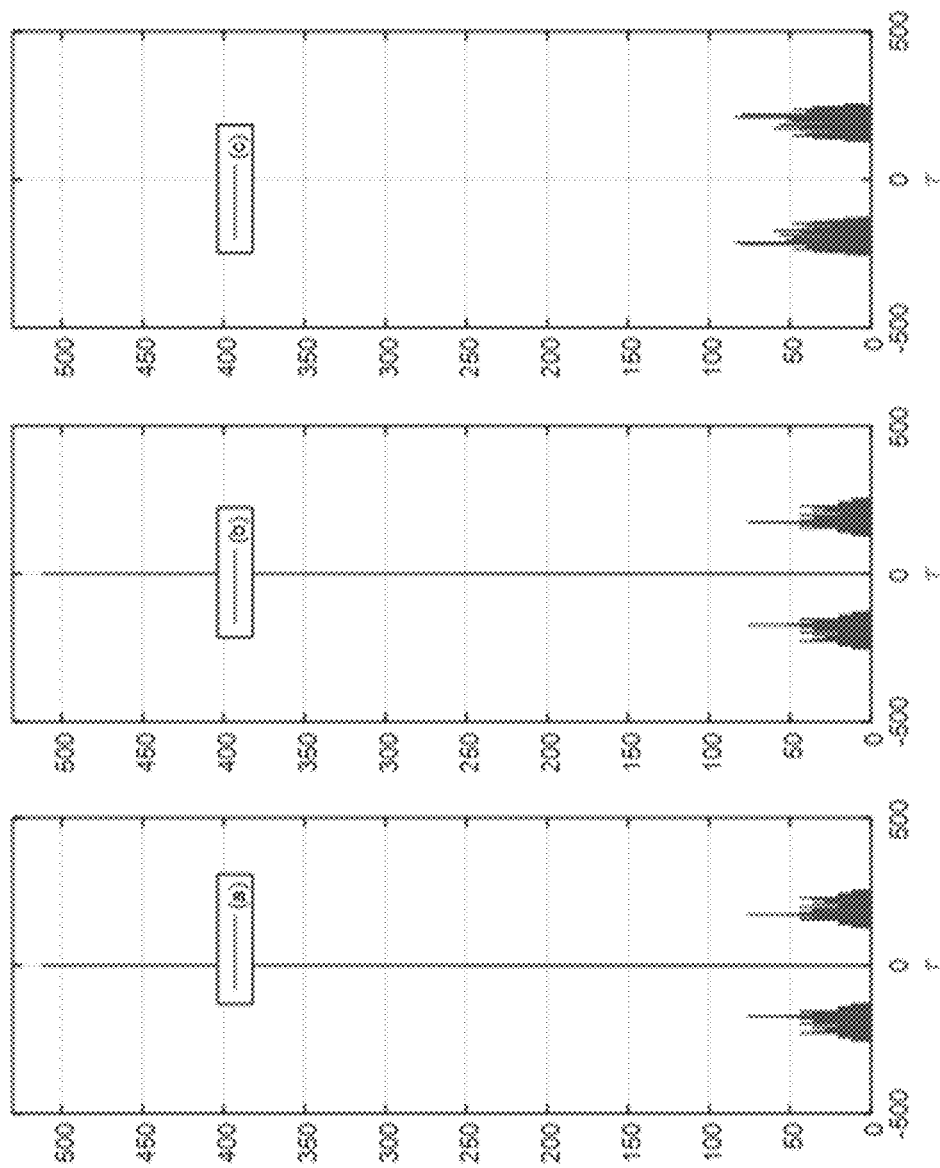
FIG. 32 illustrates Zero autocorrelation zones for arguments (a) and (b) and zero cross correlation zones for argument (c), according to an embodiment.

FIG. 32 illustrates zero autocorrelation zones for arguments (a) and (b) and zero cross correlation zones for argument (c), according to an embodiment.

Referring to FIG. 32, the results for arguments (a), (b), and (c) for the proposed sequences, i.e., T and T* (or R and R*), are illustrated.

Figure 33:
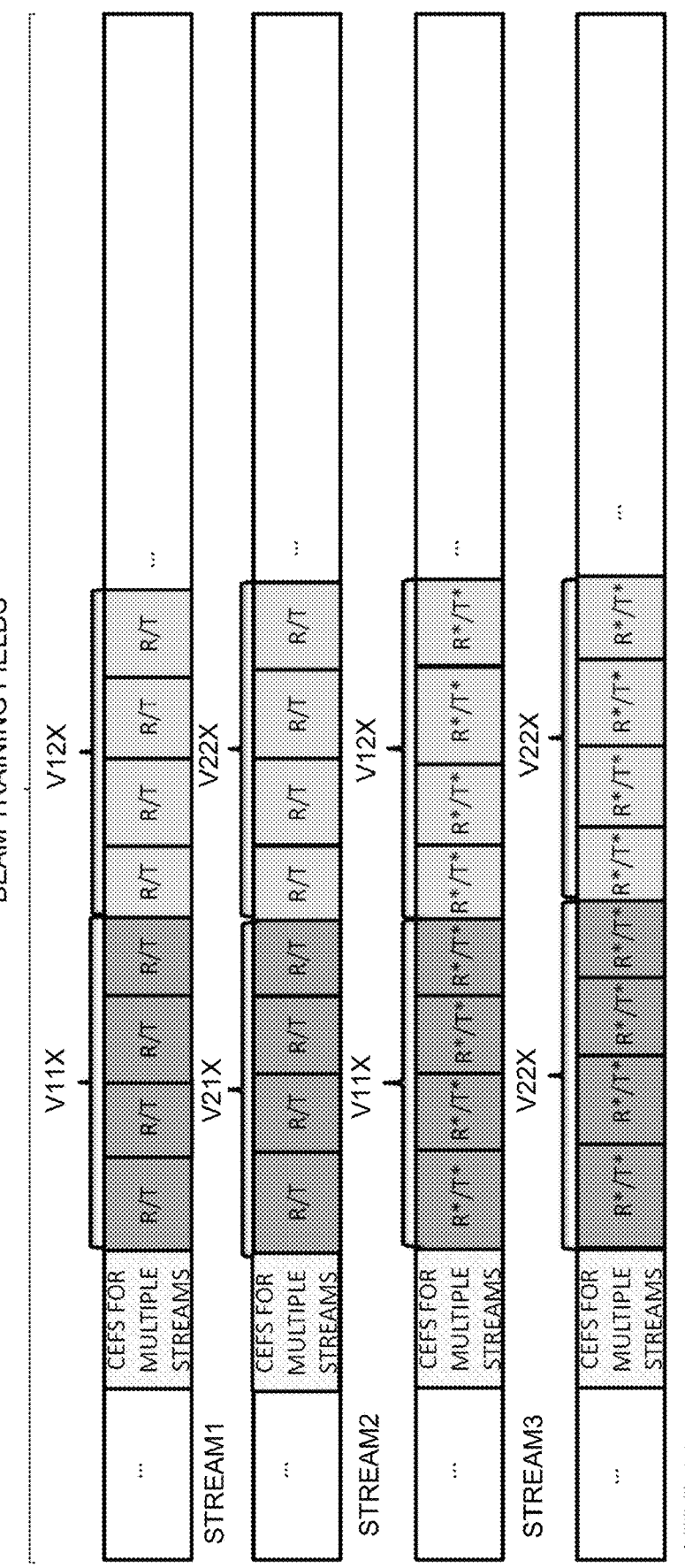
FIG. 33 illustrates beam training fields using complex conjugates of R/T sequences according to an embodiment.

FIG. 33 illustrates beam training fields using complex conjugates of R/T sequences according to an embodiment.

Figure 34:
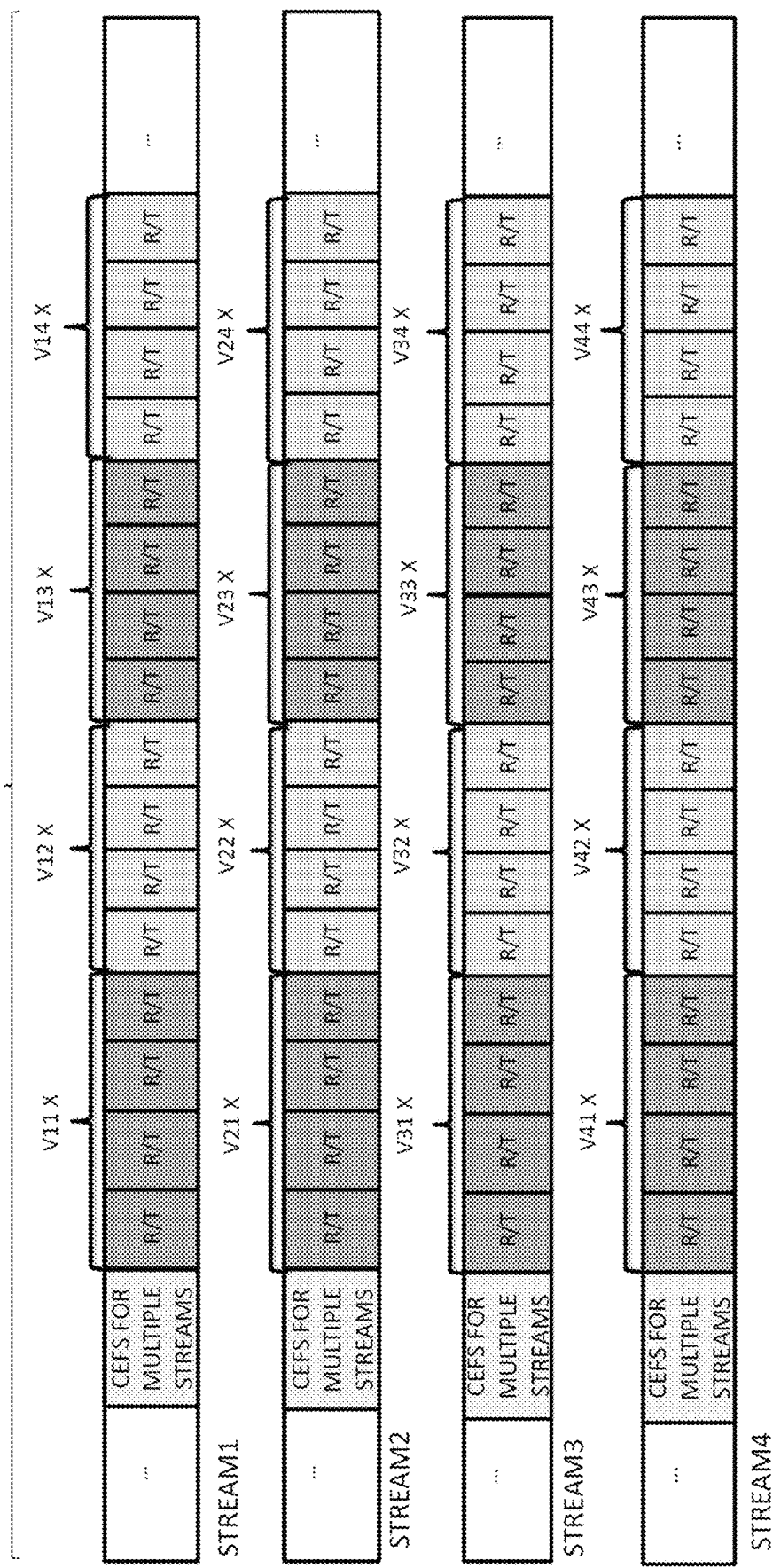
FIG. 34 illustrates beam training fields using R/T sequences based on an orthogonal V matrix according to an embodiment.

FIG. 34 illustrates beam training fields using R/T sequences based on an orthogonal V matrix according to an embodiment.

Referring to FIGS. 33 and 34, according to an embodiment, the method described above with reference to FIGS. 31 and 32 may be extended to allow beam training fields for N data stream MIMO transmissions by using a V matrix, which may be an orthogonal V matrix, which is described above. According to embodiments, in a case where multiple antennas are used, an 802.11 ay system may choose to partition the multiple antennas into groups. Parallel beam training, which may also be referred to as simultaneous beam training, may take place for antennas within each group and the groups of the antennas may be trained sequentially. In some embodiments, in a case having four antennas A1, A2, A3, A4, antennas A1 and A2 may be in a first group G1, and antennas A3 and A4 may be in a second group G2. The signals transmitted from the first group G1 use the beam training filed as shown in FIG. 28, and the same method may be applied to the second group G2. Then, the antennas in the first group G1 are trained first, and antennas in the second group G2 are trained after. However, the present disclosure is not limited thereto, and the antennas may be grouped in any suitable manner and may be trained in any suitable sequence and/or in parallel.

Method for Signaling and/or for Auto-Detecting Beam Training

A method and procedure is for signaling whether a sequential, simultaneous, or combination BRP is used is described below. According to embodiments, in a case where simultaneous beamforming training for multiple streams is provided, detecting and/or determining whether the beamforming training will be done sequentially or simultaneously, and/or as a combination of sequential and parallel methods is needed. Furthermore, signaling of and/or indicating that one or more sequences supporting simultaneous beamforming training for multiple streams are being used, is also needed. Explicit and implicit methods of making the above noted determinations and/or indications are discussed below according to one or more embodiments.

According to embodiments, re-interpreting and/or re-using reserved bits in the legacy header fields of a Control PHY frame, a low-power SC PHY frame, a SC PHY frame, and/or an OFDM PHY frame, may provide the above noted determinations and/or indications. According to embodiments, in a case of more than one reserved bits, the bits may be continuous reserved bits, or in other words contiguous and/or adjacent reserved bits, may be discontinuous reserved bits, or may be a combination of continuous and discontinuous reserved bits. According to embodiments, in a case of the Control PHY Header, two reserved bits, starting form bit 22, may be used, such that they may be set to 0 to maintain backward capability, and may indicate, to the receiver, use of legacy sequential beamforming training only. When the two reserved bits are set to any of non-zero value, e.g., 1, 2 or 3, they may implicitly signal that simultaneous beamforming training will be done by either a parallel method and/or a combination of sequential and parallel methods. In such a case, signaling the one or more sequences supporting simultaneous beamforming training for multiple streams may be implemented by one or any combination of the following methods. According to embodiments, in a first method, a first reserved bit is set equal to 1 or 0 in order to indicate whether the complex conjugates of the R/T sequences are used to support simultaneous beamforming training. According to other embodiments, in a second method, a second reserved bit may be set equal to 0 or 1 in order to indicate which V matrix is used to support simultaneously beamforming training. For example, 0 and 1 may be respectively pre-defined as the index of $V_{2\times2}$ and $V_{4\times4}$ matrixes. According to yet other embodiments, in a third method, non-zero values for the two reserved bits may indicate three pre-defined V matrixes if no complex conjugates of the R/T sequence is allowed.

According to embodiments, in a case of the OFDM PHY header, since an OFDM PHY header also has two reserved bits, starting from bit 46, a similar method and/or the same method described above for the Control PHY header may be applied to the OFDM PHY header.

According to embodiments, in a case of a low power (LP) single carrier (SC) PHY header or a SC PHY header, there are four reserved bits, starting from bit 44. In a case where two of the four reserved bits are re-used, in order to maintain consistency with the Control PHY header and the OFDM PHY header, the same methods proposed for the Control PHY header may be applied to the LP SC/SC PHY header. In a case where all four of the four reserved bits reused or re-interpreted, signaling simultaneously beamforming training may be implemented as follows. According to embodiments, the four reserved bits may be set to 0 to maintain the backward capability and to indicate that the legacy sequential beamforming training is to be performed. According to other embodiments, the four reserved bits may be set to a non-zero value, e.g., 1, 2, . . . , 15 for the four reserved bits, to implicitly signal that simultaneous beamforming training will be done by either a parallel method and/or a combination of sequential and parallel methods. Then, signaling the one or more sequences supporting simultaneous beamforming training for multiple streams may be implemented by one or any combination of the methods described below.

According to embodiments, in a first method, any of the four reserved bits, for example, a first reserved bit set as 1 or 0, may indicate whether the complex conjugates of the R/T sequences is used to support simultaneous beamforming training. According to other embodiments, in a second method, any of the remaining reserved bits, other than the reserved bit used to indicate the complex conjugates of the R/T sequences in the first method, may be set to 1 to indicate the corresponding V matrix used to support simultaneous beamforming training. In other embodiments, any one or more of the second, third, and fourth reserved bits may be respectively pre-defined as the index of $V_{2\times2}$, $V_{4\times4}$ and $V_{8\times8}$ matrices. According to yet another embodiments, in a third method, non-zero values for the four reserved bits may indicate any one or more of fifteen pre-defined V matrices in a case where no complex conjugates of the R/T sequence is allowed, or alternatively, may indicate one or more of fourteen pre-defined V matrices while enabling use of the complex conjugates of the R/T sequences.

According to other embodiments, a new header field may be used to indicate information regarding the beams to be trained, i.e., sequentially, or in parallel, or any combination of both. The new header may support the combination of both sequential and parallel methods as follows: N grouped-beams are sequentially trained, and M streams within each of the grouped-beams are trained in parallel. In a case where M indicates one stream, the present embodiment may perform the existing 802.11ad sequential beamforming training. In a case where N=1, the present embodiment may parallel beamforming training. To support this kind of combination of sequential and parallel training methods, the new header may be inserted after the Legacy-header field for M streams, and/or the new header field may contain a parameter used to signal the new sequences used for M simultaneous beamforming training for each of N grouped-beams. The legacy header may be the same as in 802.11ad to signal and/or indicate that the N grouped-beams are sequentially trained.

FIG. 35 illustrates a PHY header for a combination of sequential and parallel beamforming training according to an embodiment.

Referring to FIG. 35, a PHY header for the combination of sequential and parallel beamforming training, according to an embodiment, may include a legacy header indicating that N grouped-beams are sequentially trained, and may include a new header indicating that, for each of N grouped-beams, M=2, such that two streams of each of the N grouped beams are simultaneously trained.

According to other embodiments, auto detection of Beamforming training method may implicitly signal if the beamforming training for the streams will be done sequentially or simultaneously and/or signal a combination of sequential and simultaneous training. In order to distinguish parallel beamforming training or combination of sequential and parallel beamforming training from legacy sequential beamforming training, switching between different modulations for the legacy headers and the new headers may indicate and/or signal use of auto-detection of beamforming training methods which implicitly signal the selected method for the beamforming training. For example, the auto detection of beamforming training methods may signal and/or indicate a rotation and/or shift of a same or different degree of phase of the corresponding modulations of the new header field in a different PHY header, i.e., π/2-BPSK, π/2-DBPSK, QPSK-OFDM modulations respectively for a LP-SC/SC header, a control PHY header, and an OFDM PHY header.

Figure 36:
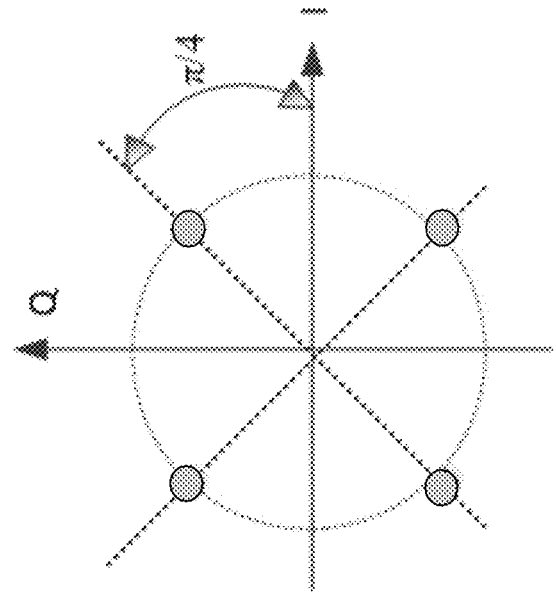
FIG. 36 illustrates auto detection of simultaneous beamforming training for a LP-SC/SC PHY header according to an embodiment.
Figure 36:
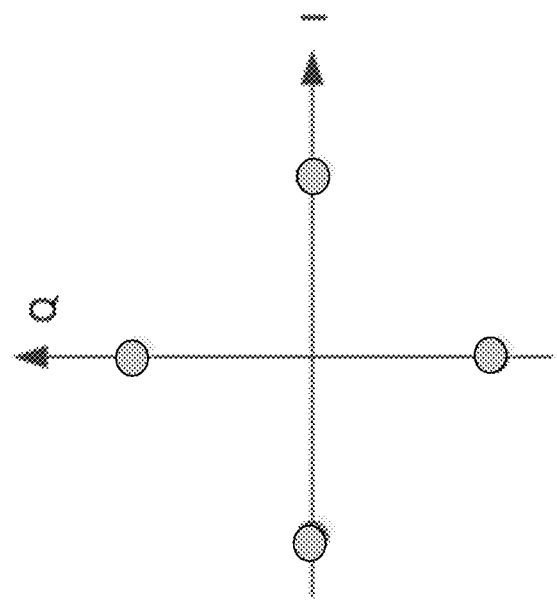

FIG. 36 illustrates auto detection of simultaneous beamforming training for a LP-SC/SC PHY header according to an embodiment.

Referring to FIG. 36, in a LP-SC frame or a SC PHY frame, the legacy header is modulated by π/2-BPSK, and the new header is signaled and/or indicated to be shifted and/or rotated by $\pi/4$ with respect to $\pi/2$-BPSK. The $\pi/4$-shifted $\pi/2$-BPSK results in a constellation of the new header being rotated by 45° relative to the legacy header in a MS SC PHY frame. Upon the receiver detecting and/or determining that the $\pi/2$-BPSK is rotated by $\pi/4$, the receiver is implicitly signaled to do simultaneous beamforming training which may be either a parallel beamforming training and/or combination of sequential and parallel beamforming training.

According to other embodiments, the streams may be indexed by Automatic Gain Control (AGC) fields of BRP, and the receiver may identify the streams to be trained by checking and/or determining the sequence at the AGC fields. In such a case:

$c=[c_1\ c_2\ c_3\ c_4]$ wherein, $c_i \in \{1, 2, \ldots, 16\}$.

Then, the sequence with for each stream will be:

$s_{stream}(c)=[s(c_1)\ s(c_2)\ s(c_3)\ s(c_4)]$ wherein, $$s(c) = \begin{cases} m_{Ga_{64}} & \text{if } c = 1 \\ -m_{Ga_{64}} & \text{if } c = 2 \\ m_{Gb_{64}} & \text{if } c = 3 \\ -m_{Gb_{64}} & \text{if } c = 4 \\ m^*_{Ga_{64}} & \text{if } c = 5 \\ -m^*_{Ga_{64}} & \text{if } c = 6 \\ m^*_{Gb_{64}} & \text{if } c = 7 \\ -m^*_{Gb_{64}} & \text{if } c = 8 \\ m_{flip\{Ga_{64}\}} & \text{if } c = 9 \\ -m_{flip\{Ga_{64}\}} & \text{if } c = 10 \\ m_{flip\{Gb_{64}\}} & \text{if } c = 11 \\ -m_{flip\{Gb_{64}\}} & \text{if } c = 12 \\ m^*_{flip\{Ga_{64}\}} & \text{if } c = 13 \\ -m^*_{flip\{Ga_{64}\}} & \text{if } c = 14 \\ m^*_{flip\{Gb_{64}\}} & \text{if } c = 15 \\ -m^*_{flip\{Gb_{64}\}} & \text{if } c = 16 \end{cases}$$

wherein, sign(•) is signum function and flip{•} reverses the order of the sequence on its argument.

Figure 37:
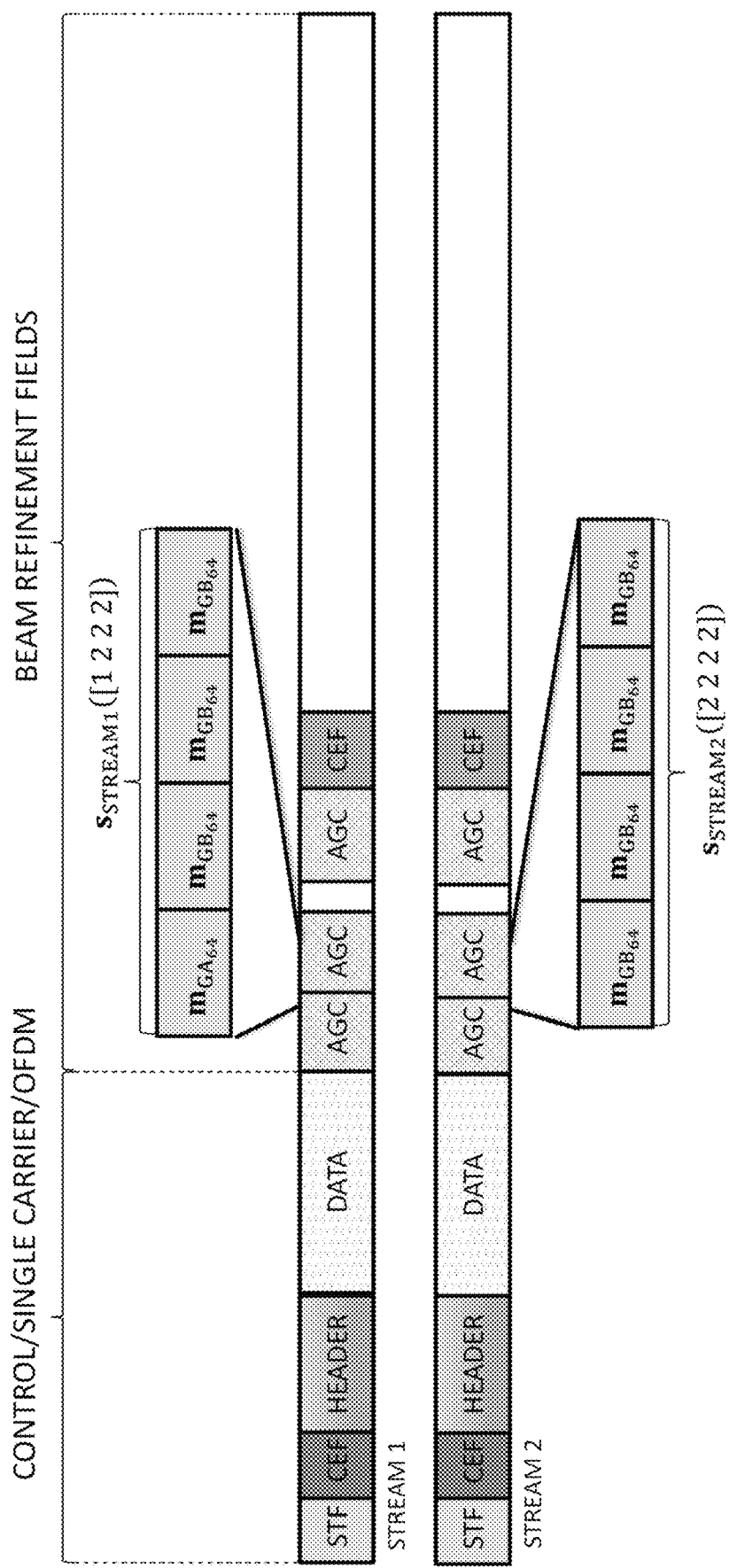
FIG. 37 illustrates implicit detection of the beams to be trained by using different sequences in the AGC fields.

FIG. 37 illustrates implicit detection of the beams to be trained by using different sequences in the AGC fields.

Referring to FIG. 37, different s(c) may also be considered, and a receiver may check and/or determine the one or more sequences to identify the one or more beams to be trained. For example, if there are two streams with the sequences of $s_{stream1}([1\ 2\ 2\ 2])$ and $s_{stream2}([2\ 2\ 2\ 2])$, the corresponding sequences are respectively obtained as:

$s_{stream1}([1\ 2\ 2\ 2])=[m_{Ga_{64}}\ m_{Gb_{64}}\ m_{Gb_{64}}\ m_{Gb_{64}}]$ and $s_{stream2}([2\ 2\ 2\ 2])=[m_{Gb_{64}}\ m_{Gb_{64}}\ m_{Gb_{64}}\ m_{Gb_{64}}]$, In such a case, according to an embodiment, the receiver checks and/or determines if $Ga_{64}$ exists. Since $Ga_{64}$ appears on the first quadrant of the $s_{stream1}$, the receiver understands and/or determines that only a beam related to stream 1 is going to be trained. The locations of the sequences are shown in FIG. 34. According to embodiments, a size of the vector c may change depending on an implementation and the different of Golay sequences, e.g., Golay sequences with different sizes may be considered for s(c). Additionally, the explicit and implicit methods of auto-detection of beam training methods described above may be used jointly to simplify the auto-detection process with a small increase in signaling overhead. For example, s(c) may be partitioned into two groups, and signaling may be used to indicate which group is used, such that the receiver may detect the AGC field configuration with a smaller search space.

Figure 38:
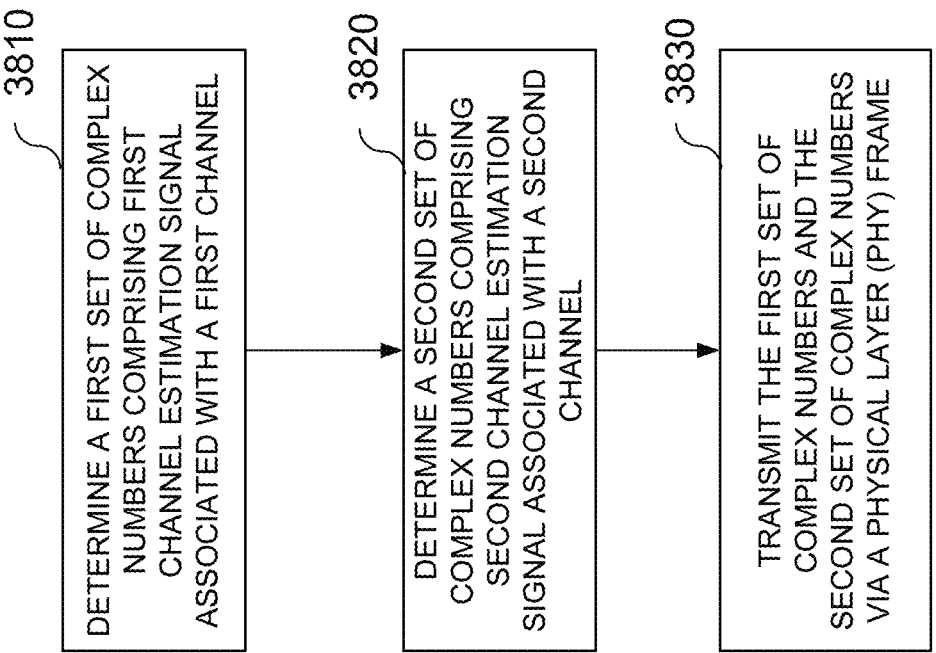
FIG. 38 illustrates an exemplary flowchart of transmitting information for channel estimation for more than one channel for MIMO communications in a wireless network.

FIG. 38 illustrates an exemplary flowchart of transmitting information for channel estimation for more than one channel for MIMO communications in a wireless network.

Referring to FIG. 38, it is assumed that there are two streams used by BRP or included in a BRP message. According to embodiments, a STA (e.g., 802.11ay STA), an AP (e.g., 802.11ay AP), and/or any other suitable device may simultaneously track two streams. For example, an electronic device may be configured to determine a first set of complex numbers comprising first channel estimation signal associated with a first channel at operation 3810.

The electronic device may also be configured to determine a second set of complex numbers comprising second channel estimation signal associated with a second channel at operation 3820. According to certain embodiments, the second set of complex numbers are complex conjugates of the first set of complex numbers. According to some embodiments, the use of complex conjugates for the second stream may allow maximum separation between the first and second streams. For example, in a case of a 2×2 MIMO system, the use of complex conjugates for the second stream may yield perfect and/or approximately perfect channel estimation for antenna ports, for pairs of transmit antenna ports, and/or for an input of a digital precoder of a transmitter, and a receive antenna port and/or an output of a digital precoder of a receiver.

At operation 3830, the electronic device may be configured to the first set of complex numbers and the second set of complex numbers via a physical layer (PHY) frame. However, the present disclosure is not limited thereto, and more than two streams may be used for BRP and/or included in a BRP message.

Figure 39:
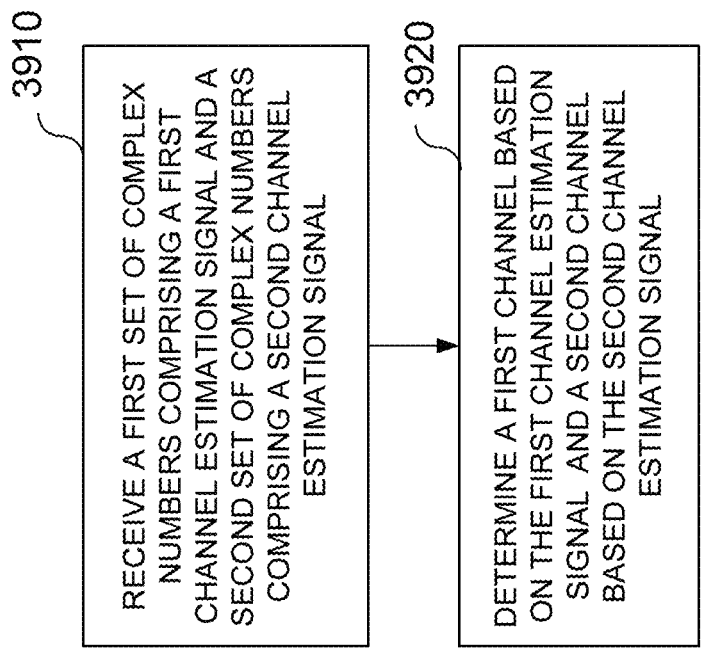
FIG. 39 illustrates another exemplary flowchart of performing channel estimation of more than one channel for MIMO communications in a wireless network.

FIG. 39 illustrates an exemplary flowchart of performing channel estimation of more than one channel for MIMO communications in a wireless network.

According to embodiments, a receiver in a STA (e.g., 802.11ay STA), an AP (e.g., 802.11ay AP), and/or any other suitable device may simultaneously track two streams. Referring to FIG. 39, an electronic device may be configured to receive a first set of complex numbers comprising a first channel estimation signal and a second set of complex numbers comprising a second channel estimation signal at operation 3910.

Then, the electronic device may be configured to determine, at operation 3920, a first channel based on the first channel estimation signal and a second channel based on the second channel estimation signal. According to some embodiments, the first set of complex numbers and the second set of complex numbers may be received, e.g., via a physical layer (PHY) frame. According to another embodiments, the second set of complex numbers may be complex conjugates of the first set of complex numbers. According to embodiments, as described above, the use of complex conjugates for the second stream may allow maximum separation between the first and second streams, and may yield perfect and/or approximately perfect channel estimation for antenna ports, for pairs of transmit antenna ports, and/or for an input of digital precoder of a transmitter, and a receive antenna port and/or an output of a digital precoder of a receiver, when a 2×2 MIMO system is considered.

FIG. 40 illustrates another exemplary flowchart of performing transmit beamforming for MIMO communications in a wireless network. According to embodiments, a STA (e.g., 802.11ay STA), an AP, and/or any other suitable or similar device may be configured to perform these methods of beamforming.

Referring to FIG. 40, an electronic device may be configured to perform a SLS and BRP to identify a beam for any and/or all of one or more STAs at operation 4010.

The electronic device may be configured to identify a first STA and a second STA disposed in adjacent beams at operation 4020. According to embodiments, a header may contain information, such as a unique ID corresponding to a respective STA, that maps each user (e.g., STA) to the correct stream. According to embodiments, at each receiver the following signal may be received:

$$y = h_{desired} s_{desired} + h_{undesired} s_{undesired} + n$$

wherein, $h_{desired}$ and $h_{undesired}$ may be known based on the separable CEFs, and the desired signal may be decoded at each receiver, especially in a case where the energy of the undesired signal is smaller than the desired signal due to partial spatial orthogonality based on transmit beamforming.

At operation 4030, the electronic device may be configured to transmit a multi-user transmission to the first STA and the second STA using a PHY frame including information on a first stream corresponding to a first channel and information on a second stream corresponding to a second channel.

At operation 4040, the electronic device may be configured to simultaneously transmit user specific information to the first STA and to the second STA in the PHY frame. In some embodiments, the PHY frame may include a legacy STF, a LTF, and a SIG on both the first stream and the second stream. According to certain embodiments, the PHY frame may include a common header including information on the one or more STAs and information associating the first stream with the first STA and associating the second stream with the second STA.

Although the solutions described herein consider 802.11 specific protocols, it is understood that the solutions described herein are not restricted to this scenario and are applicable to other wireless systems as well. According to embodiments, methods, apparatuses, and systems for channel estimation and simultaneous beamforming training for MIMO communications, as described herein, with reference to FIGS. 1-40, may be applied to any suitable and/or similar wireless systems, communication systems, and/or radio interfaces.

Throughout the solutions and provided examples, the blank areas in the figures, e.g., white space of the second stream of FIGS. 14 and 18, may imply that there is no restriction for this area and any solution can be employed therein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WRTU), user equipment (UE), terminal, base station, Mobility Management Entity (MME) or Evolved Packet Core (EPC), or any host computer. The WRTU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any WLAN or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

TABLE A

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 1 | 1 | 1.0000 + 0.0000i | 1 | 1.0000 + 0.0000i |
| 2 | 1 | 0.0000 + 1.0000i | −1 | 0.0000 − 1.0000i |
| 3 | −1 | 1.0000 − 0.0000i | −1 | 1.0000 + 0.0000i |
| 4 | −1 | 0.0000 + 1.0000i | 1 | 0.0000 − 1.0000i |
| 5 | −1 | −1.0000 + 0.0000i | −1 | −1.0000 − 0.0000i |
| 6 | −1 | −0.0000 − 1.0000i | 1 | −0.0000 + 1.0000i |
| 7 | −1 | 1.0000 − 0.0000i | −1 | 1.0000 + 0.0000i |
| 8 | −1 | 0.0000 + 1.0000i | 1 | 0.0000 − 1.0000i |
| 9 | −1 | −1.0000 + 0.0000i | −1 | −1.0000 − 0.0000i |
| 10 | 1 | 0.0000 + 1.0000i | −1 | 0.0000 − 1.0000i |
| 11 | −1 | 1.0000 − 0.0000i | −1 | 1.0000 + 0.0000i |
| 12 | 1 | −0.0000 − 1.0000i | −1 | −0.0000 + 1.0000i |
| 13 | 1 | 1.0000 − 0.0000i | 1 | 1.0000 + 0.0000i |
| 14 | −1 | 0.0000 − 1.0000i | 1 | 0.0000 + 1.0000i |
| 15 | −1 | 1.0000 − 0.0000i | −1 | 1.0000 + 0.0000i |
| 16 | 1 | −0.0000 − 1.0000i | −1 | −0.0000 + 1.0000i |
| 17 | 1 | 1.0000 − 0.0000i | 1 | 1.0000 + 0.0000i |
| 18 | 1 | −0.0000 + 1.0000i | −1 | −0.0000 − 1.0000i |
| 19 | −1 | 1.0000 − 0.0000i | −1 | 1.0000 + 0.0000i |
| 20 | −1 | 0.0000 + 1.0000i | 1 | 0.0000 − 1.0000i |
| 21 | 1 | 1.0000 − 0.0000i | 1 | 1.0000 + 0.0000i |
| 22 | 1 | −0.0000 + 1.0000i | −1 | −0.0000 − 1.0000i |
| 23 | 1 | −1.0000 + 0.0000i | 1 | −1.0000 − 0.0000i |
| 24 | 1 | −0.0000 − 1.0000i | −1 | −0.0000 + 1.0000i |
| 25 | −1 | −1.0000 + 0.0000i | −1 | −1.0000 − 0.0000i |
| 26 | 1 | −0.0000 + 1.0000i | −1 | −0.0000 − 1.0000i |
| 27 | −1 | 1.0000 + 0.0000i | −1 | 1.0000 − 0.0000i |
| 28 | 1 | −0.0000 − 1.0000i | −1 | −0.0000 + 1.0000i |
| 29 | −1 | −1.0000 + 0.0000i | −1 | −1.0000 − 0.0000i |
| 30 | 1 | −0.0000 + 1.0000i | −1 | −0.0000 − 1.0000i |
| 31 | 1 | −1.0000 + 0.0000i | 1 | −1.0000 − 0.0000i |
| 32 | −1 | 0.0000 + 1.0000i | 1 | 0.0000 − 1.0000i |
| 33 | −1 | −1.0000 + 0.0000i | −1 | −1.0000 − 0.0000i |
| 34 | −1 | −0.0000 − 1.0000i | 1 | −0.0000 + 1.0000i |
| 35 | 1 | −1.0000 − 0.0000i | 1 | −1.0000 + 0.0000i |
| 36 | 1 | −0.0000 − 1.0000i | −1 | −0.0000 + 1.0000i |
| 37 | 1 | 1.0000 − 0.0000i | 1 | 1.0000 + 0.0000i |
| 38 | 1 | 0.0000 + 1.0000i | −1 | 0.0000 − 1.0000i |
| 39 | 1 | −1.0000 + 0.0000i | 1 | −1.0000 − 0.0000i |
| 40 | 1 | −0.0000 − 1.0000i | −1 | −0.0000 + 1.0000i |
| 41 | 1 | 1.0000 − 0.0000i | 1 | 1.0000 + 0.0000i |
| 42 | −1 | −0.0000 + 1.0000i | 1 | −0.0000 + 1.0000i |
| 43 | 1 | −1.0000 − 0.0000i | 1 | −1.0000 + 0.0000i |
| 44 | −1 | 0.0000 + 1.0000i | 1 | 0.0000 − 1.0000i |
| 45 | −1 | −1.0000 + 0.0000i | −1 | −1.0000 − 0.0000i |
| 46 | 1 | 0.0000 + 1.0000i | −1 | 0.0000 − 1.0000i |
| 47 | 1 | −1.0000 + 0.0000i | 1 | −1.0000 − 0.0000i |
| 48 | −1 | −0.0000 + 1.0000i | 1 | −0.0000 − 1.0000i |
| 49 | 1 | 1.0000 − 0.0000i | 1 | 1.0000 + 0.0000i |
| 50 | 1 | 0.0000 + 1.0000i | −1 | 0.0000 − 1.0000i |
| 51 | −1 | 1.0000 + 0.0000i | −1 | 1.0000 − 0.0000i |
| 52 | −1 | 0.0000 + 1.0000i | 1 | 0.0000 − 1.0000i |
| 53 | 1 | 1.0000 + 0.0000i | 1 | 1.0000 − 0.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 54 | 1 | 0.0000 + 1.0000i | −1 | 0.0000 − 1.0000i |
| 55 | 1 | −1.0000 + 0.0000i | 1 | −1.0000 − 0.0000i |
| 56 | 1 | 0.0000 − 1.0000i | −1 | 0.0000 + 1.0000i |
| 57 | −1 | −1.0000 + 0.0000i | −1 | −1.0000 − 0.0000i |
| 58 | 1 | 0.0000 + 1.0000i | −1 | 0.0000 − 1.0000i |
| 59 | −1 | 1.0000 + 0.0000i | −1 | 1.0000 − 0.0000i |
| 60 | 1 | −0.0000 − 1.0000i | −1 | −0.0000 + 1.0000i |
| 61 | −1 | −1.0000 + 0.0000i | −1 | −1.0000 − 0.0000i |
| 62 | 1 | 0.0000 + 1.0000i | −1 | 0.0000 − 1.0000i |
| 63 | 1 | −1.0000 + 0.0000i | 1 | −1.0000 − 0.0000i |
| 64 | −1 | −0.0000 + 1.0000i | 1 | −0.0000 − 1.0000i |
| 65 | −1 | −1.0000 + 0.0000i | −1 | −1.0000 − 0.0000i |
| 66 | −1 | −0.0000 − 1.0000i | 1 | −0.0000 + 1.0000i |
| 67 | 1 | −1.0000 + 0.0000i | 1 | −1.0000 − 0.0000i |
| 68 | 1 | −0.0000 − 1.0000i | −1 | −0.0000 + 1.0000i |
| 69 | 1 | 1.0000 + 0.0000i | 1 | 1.0000 − 0.0000i |
| 70 | 1 | 0.0000 + 1.0000i | −1 | 0.0000 − 1.0000i |
| 71 | 1 | −1.0000 + 0.0000i | 1 | −1.0000 − 0.0000i |
| 72 | 1 | 0.0000 − 1.0000i | −1 | 0.0000 + 1.0000i |
| 73 | 1 | 1.0000 − 0.0000i | 1 | 1.0000 + 0.0000i |
| 74 | −1 | −0.0000 − 1.0000i | 1 | −0.0000 + 1.0000i |
| 75 | 1 | −1.0000 + 0.0000i | 1 | −1.0000 − 0.0000i |
| 76 | −1 | 0.0000 + 1.0000i | 1 | 0.0000 − 1.0000i |
| 77 | −1 | −1.0000 + 0.0000i | −1 | −1.0000 − 0.0000i |
| 78 | 1 | 0.0000 + 1.0000i | −1 | 0.0000 − 1.0000i |
| 79 | 1 | −1.0000 + 0.0000i | 1 | −1.0000 − 0.0000i |
| 80 | −1 | −0.0000 + 1.0000i | 1 | −0.0000 − 1.0000i |
| 81 | −1 | −1.0000 + 0.0000i | −1 | −1.0000 − 0.0000i |
| 82 | −1 | −0.0000 − 1.0000i | 1 | −0.0000 + 1.0000i |
| 83 | 1 | −1.0000 + 0.0000i | 1 | −1.0000 − 0.0000i |
| 84 | 1 | 0.0000 − 1.0000i | −1 | 0.0000 + 1.0000i |
| 85 | −1 | −1.0000 − 0.0000i | −1 | −1.0000 + 0.0000i |
| 86 | −1 | −0.0000 − 1.0000i | 1 | −0.0000 + 1.0000i |
| 87 | −1 | 1.0000 − 0.0000i | −1 | 1.0000 + 0.0000i |
| 88 | −1 | 0.0000 + 1.0000i | 1 | 0.0000 − 1.0000i |
| 89 | 1 | 1.0000 − 0.0000i | 1 | 1.0000 + 0.0000i |
| 90 | −1 | 0.0000 − 1.0000i | 1 | 0.0000 + 1.0000i |
| 91 | 1 | −1.0000 + 0.0000i | 1 | −1.0000 − 0.0000i |
| 92 | −1 | 0.0000 + 1.0000i | 1 | 0.0000 − 1.0000i |
| 93 | 1 | 1.0000 − 0.0000i | 1 | 1.0000 + 0.0000i |
| 94 | −1 | −0.0000 − 1.0000i | 1 | −0.0000 + 1.0000i |
| 95 | −1 | 1.0000 + 0.0000i | −1 | 1.0000 − 0.0000i |
| 96 | 1 | −0.0000 − 1.0000i | −1 | −0.0000 + 1.0000i |
| 97 | −1 | −1.0000 + 0.0000i | −1 | −1.0000 − 0.0000i |
| 98 | −1 | −0.0000 − 1.0000i | 1 | −0.0000 + 1.0000i |
| 99 | 1 | −1.0000 + 0.0000i | 1 | −1.0000 − 0.0000i |
| 100 | 1 | 0.0000 − 1.0000i | −1 | 0.0000 + 1.0000i |
| 101 | 1 | 1.0000 + 0.0000i | 1 | 1.0000 − 0.0000i |
| 102 | 1 | 0.0000 + 1.0000i | −1 | 0.0000 − 1.0000i |
| 103 | 1 | −1.0000 + 0.0000i | 1 | −1.0000 − 0.0000i |
| 104 | 1 | −0.0000 − 1.0000i | −1 | −0.0000 + 1.0000i |
| 105 | 1 | 1.0000 + 0.0000i | 1 | 1.0000 − 0.0000i |
| 106 | −1 | 0.0000 − 1.0000i | 1 | 0.0000 + 1.0000i |
| 107 | 1 | −1.0000 + 0.0000i | 1 | −1.0000 − 0.0000i |
| 108 | −1 | 0.0000 + 1.0000i | 1 | 0.0000 − 1.0000i |
| 109 | −1 | −1.0000 + 0.0000i | −1 | −1.0000 − 0.0000i |
| 110 | 1 | 0.0000 + 1.0000i | −1 | 0.0000 − 1.0000i |
| 111 | 1 | −1.0000 − 0.0000i | 1 | −1.0000 + 0.0000i |
| 112 | −1 | 0.0000 + 1.0000i | 1 | 0.0000 − 1.0000i |
| 113 | 1 | 1.0000 − 0.0000i | 1 | 1.0000 + 0.0000i |
| 114 | 1 | 0.0000 + 1.0000i | −1 | 0.0000 − 1.0000i |
| 115 | −1 | 1.0000 − 0.0000i | −1 | 1.0000 + 0.0000i |
| 116 | −1 | −0.0000 + 1.0000i | 1 | −0.0000 − 1.0000i |
| 117 | 1 | 1.0000 + 0.0000i | 1 | 1.0000 − 0.0000i |
| 118 | 1 | 0.0000 + 1.0000i | −1 | 0.0000 − 1.0000i |
| 119 | 1 | −1.0000 + 0.0000i | 1 | −1.0000 − 0.0000i |
| 120 | 1 | −0.0000 − 1.0000i | −1 | −0.0000 + 1.0000i |
| 121 | −1 | −1.0000 + 0.0000i | −1 | −1.0000 − 0.0000i |
| 122 | 1 | −0.0000 + 1.0000i | −1 | −0.0000 − 1.0000i |
| 123 | −1 | 1.0000 − 0.0000i | −1 | 1.0000 + 0.0000i |
| 124 | 1 | −0.0000 − 1.0000i | −1 | −0.0000 + 1.0000i |
| 125 | −1 | −1.0000 + 0.0000i | −1 | −1.0000 − 0.0000i |
| 126 | 1 | 0.0000 + 1.0000i | −1 | 0.0000 − 1.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 127 | 1 | −1.0000 − 0.0000i | 1 | −1.0000 + 0.0000i |
| 128 | −1 | 0.0000 + 1.0000i | 1 | 0.0000 − 1.0000i |
| 129 | −1 | −1.0000 + 0.0000i | −1 | −1.0000 − 0.0000i |
| 130 | −1 | −0.0000 − 1.0000i | 1 | −0.0000 + 1.0000i |
| 131 | 1 | −1.0000 + 0.0000i | 1 | −1.0000 − 0.0000i |
| 132 | 1 | 0.0000 − 1.0000i | −1 | 0.0000 + 1.0000i |
| 133 | 1 | 1.0000 − 0.0000i | 1 | 1.0000 + 0.0000i |
| 134 | 1 | 0.0000 + 1.0000i | −1 | 0.0000 − 1.0000i |
| 135 | 1 | −1.0000 + 0.0000i | 1 | −1.0000 − 0.0000i |
| 136 | 1 | −0.0000 + 1.0000i | −1 | −0.0000 + 1.0000i |
| 137 | 1 | 1.0000 + 0.0000i | 1 | 1.0000 − 0.0000i |
| 138 | −1 | 0.0000 − 1.0000i | 1 | 0.0000 + 1.0000i |
| 139 | 1 | −1.0000 + 0.0000i | 1 | −1.0000 − 0.0000i |
| 140 | −1 | 0.0000 + 1.0000i | 1 | 0.0000 − 1.0000i |
| 141 | −1 | −1.0000 + 0.0000i | −1 | −1.0000 − 0.0000i |
| 142 | 1 | 0.0000 + 1.0000i | −1 | 0.0000 − 1.0000i |
| 143 | 1 | −1.0000 − 0.0000i | 1 | −1.0000 + 0.0000i |
| 144 | −1 | 0.0000 + 1.0000i | 1 | 0.0000 − 1.0000i |
| 145 | −1 | −1.0000 + 0.0000i | −1 | −1.0000 − 0.0000i |
| 146 | −1 | −0.0000 − 1.0000i | 1 | −0.0000 + 1.0000i |
| 147 | 1 | −1.0000 + 0.0000i | 1 | −1.0000 − 0.0000i |
| 148 | 1 | 0.0000 − 1.0000i | −1 | 0.0000 + 1.0000i |
| 149 | −1 | −1.0000 + 0.0000i | −1 | −1.0000 − 0.0000i |
| 150 | −1 | −0.0000 − 1.0000i | 1 | −0.0000 + 1.0000i |
| 151 | −1 | 1.0000 − 0.0000i | −1 | 1.0000 + 0.0000i |
| 152 | −1 | 0.0000 + 1.0000i | 1 | 0.0000 − 1.0000i |
| 153 | 1 | 1.0000 − 0.0000i | 1 | 1.0000 + 0.0000i |
| 154 | −1 | −0.0000 − 1.0000i | 1 | −0.0000 + 1.0000i |
| 155 | 1 | −1.0000 + 0.0000i | 1 | −1.0000 − 0.0000i |
| 156 | −1 | 0.0000 + 1.0000i | 1 | 0.0000 − 1.0000i |
| 157 | 1 | 1.0000 − 0.0000i | 1 | 1.0000 + 0.0000i |
| 158 | −1 | −0.0000 − 1.0000i | 1 | −0.0000 + 1.0000i |
| 159 | −1 | 1.0000 + 0.0000i | −1 | 1.0000 − 0.0000i |
| 160 | 1 | −0.0000 − 1.0000i | −1 | −0.0000 + 1.0000i |
| 161 | 1 | 1.0000 − 0.0000i | 1 | 1.0000 + 0.0000i |
| 162 | 1 | 0.0000 + 1.0000i | −1 | 0.0000 − 1.0000i |
| 163 | −1 | 1.0000 − 0.0000i | −1 | 1.0000 + 0.0000i |
| 164 | −1 | 0.0000 + 1.0000i | 1 | 0.0000 − 1.0000i |
| 165 | −1 | −1.0000 + 0.0000i | −1 | −1.0000 − 0.0000i |
| 166 | −1 | −0.0000 − 1.0000i | 1 | −0.0000 + 1.0000i |
| 167 | −1 | 1.0000 + 0.0000i | −1 | 1.0000 − 0.0000i |
| 168 | −1 | −0.0000 + 1.0000i | 1 | −0.0000 − 1.0000i |
| 169 | −1 | −1.0000 − 0.0000i | −1 | −1.0000 + 0.0000i |
| 170 | 1 | 0.0000 + 1.0000i | −1 | 0.0000 − 1.0000i |
| 171 | −1 | 1.0000 − 0.0000i | −1 | 1.0000 + 0.0000i |
| 172 | 1 | −0.0000 − 1.0000i | −1 | −0.0000 + 1.0000i |
| 173 | 1 | 1.0000 − 0.0000i | 1 | 1.0000 + 0.0000i |
| 174 | −1 | −0.0000 − 1.0000i | 1 | −0.0000 + 1.0000i |
| 175 | −1 | 1.0000 − 0.0000i | −1 | 1.0000 + 0.0000i |
| 176 | 1 | −0.0000 − 1.0000i | −1 | −0.0000 + 1.0000i |
| 177 | −1 | −1.0000 + 0.0000i | −1 | −1.0000 − 0.0000i |
| 178 | −1 | 0.0000 − 1.0000i | 1 | 0.0000 + 1.0000i |
| 179 | 1 | −1.0000 − 0.0000i | 1 | −1.0000 + 0.0000i |
| 180 | 1 | 0.0000 − 1.0000i | −1 | 0.0000 + 1.0000i |
| 181 | −1 | −1.0000 + 0.0000i | −1 | −1.0000 − 0.0000i |
| 182 | −1 | −0.0000 − 1.0000i | 1 | −0.0000 + 1.0000i |
| 183 | −1 | 1.0000 − 0.0000i | −1 | 1.0000 + 0.0000i |
| 184 | −1 | 0.0000 + 1.0000i | 1 | 0.0000 − 1.0000i |
| 185 | 1 | 1.0000 − 0.0000i | 1 | 1.0000 + 0.0000i |
| 186 | −1 | −0.0000 − 1.0000i | 1 | −0.0000 + 1.0000i |
| 187 | 1 | −1.0000 + 0.0000i | 1 | −1.0000 − 0.0000i |
| 188 | −1 | −0.0000 + 1.0000i | 1 | −0.0000 − 1.0000i |
| 189 | 1 | 1.0000 + 0.0000i | 1 | 1.0000 − 0.0000i |
| 190 | −1 | 0.0000 − 1.0000i | 1 | 0.0000 + 1.0000i |
| 191 | −1 | 1.0000 − 0.0000i | −1 | 1.0000 + 0.0000i |
| 192 | 1 | −0.0000 − 1.0000i | −1 | −0.0000 + 1.0000i |
| 193 | −1 | −1.0000 + 0.0000i | −1 | −1.0000 − 0.0000i |
| 194 | −1 | −0.0000 − 1.0000i | 1 | −0.0000 + 1.0000i |
| 195 | 1 | −1.0000 + 0.0000i | 1 | −1.0000 − 0.0000i |
| 196 | 1 | −0.0000 − 1.0000i | −1 | −0.0000 + 1.0000i |
| 197 | 1 | 1.0000 − 0.0000i | 1 | 1.0000 + 0.0000i |
| 198 | 1 | 0.0000 + 1.0000i | −1 | 0.0000 − 1.0000i |
| 199 | 1 | −1.0000 − 0.0000i | 1 | −1.0000 + 0.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 200 | 1 | 0.0000 − 1.0000i | −1 | 0.0000 + 1.0000i |
| 201 | 1 | 1.0000 + 0.0000i | 1 | 1.0000 − 0.0000i |
| 202 | −1 | −0.0000 − 1.0000i | 1 | −0.0000 + 1.0000i |
| 203 | 1 | −1.0000 + 0.0000i | 1 | −1.0000 − 0.0000i |
| 204 | −1 | 0.0000 + 1.0000i | 1 | 0.0000 − 1.0000i |
| 205 | −1 | −1.0000 + 0.0000i | −1 | −1.0000 − 0.0000i |
| 206 | 1 | 0.0000 + 1.0000i | −1 | 0.0000 − 1.0000i |
| 207 | 1 | −1.0000 + 0.0000i | 1 | −1.0000 − 0.0000i |
| 208 | −1 | 0.0000 + 1.0000i | 1 | 0.0000 − 1.0000i |
| 209 | −1 | −1.0000 − 0.0000i | −1 | −1.0000 + 0.0000i |
| 210 | −1 | 0.0000 − 1.0000i | 1 | 0.0000 + 1.0000i |
| 211 | 1 | −1.0000 − 0.0000i | 1 | −1.0000 + 0.0000i |
| 212 | 1 | −0.0000 − 1.0000i | −1 | −0.0000 + 1.0000i |
| 213 | −1 | −1.0000 + 0.0000i | −1 | −1.0000 − 0.0000i |
| 214 | −1 | −0.0000 − 1.0000i | 1 | −0.0000 + 1.0000i |
| 215 | −1 | 1.0000 − 0.0000i | −1 | 1.0000 + 0.0000i |
| 216 | −1 | 0.0000 + 1.0000i | 1 | 0.0000 − 1.0000i |
| 217 | 1 | 1.0000 − 0.0000i | 1 | 1.0000 + 0.0000i |
| 218 | −1 | −0.0000 − 1.0000i | 1 | −0.0000 + 1.0000i |
| 219 | 1 | −1.0000 + 0.0000i | 1 | −1.0000 − 0.0000i |
| 220 | −1 | −0.0000 + 1.0000i | 1 | −0.0000 − 1.0000i |
| 221 | 1 | 1.0000 + 0.0000i | 1 | 1.0000 − 0.0000i |
| 222 | −1 | 0.0000 − 1.0000i | 1 | 0.0000 + 1.0000i |
| 223 | −1 | 1.0000 − 0.0000i | −1 | 1.0000 + 0.0000i |
| 224 | 1 | −0.0000 − 1.0000i | −1 | −0.0000 + 1.0000i |
| 225 | −1 | −1.0000 + 0.0000i | −1 | −1.0000 − 0.0000i |
| 226 | −1 | −0.0000 − 1.0000i | 1 | −0.0000 + 1.0000i |
| 227 | 1 | −1.0000 + 0.0000i | 1 | −1.0000 − 0.0000i |
| 228 | 1 | −0.0000 − 1.0000i | −1 | −0.0000 + 1.0000i |
| 229 | 1 | 1.0000 − 0.0000i | 1 | 1.0000 + 0.0000i |
| 230 | 1 | 0.0000 + 1.0000i | −1 | 0.0000 − 1.0000i |
| 231 | 1 | −1.0000 − 0.0000i | 1 | −1.0000 + 0.0000i |
| 232 | 1 | 0.0000 − 1.0000i | −1 | 0.0000 + 1.0000i |
| 233 | 1 | 1.0000 + 0.0000i | 1 | 1.0000 − 0.0000i |
| 234 | −1 | −0.0000 − 1.0000i | 1 | −0.0000 + 1.0000i |
| 235 | 1 | −1.0000 + 0.0000i | 1 | −1.0000 − 0.0000i |
| 236 | −1 | 0.0000 + 1.0000i | 1 | 0.0000 − 1.0000i |
| 237 | −1 | −1.0000 + 0.0000i | −1 | −1.0000 − 0.0000i |
| 238 | 1 | 0.0000 + 1.0000i | −1 | 0.0000 − 1.0000i |
| 239 | 1 | −1.0000 + 0.0000i | 1 | −1.0000 − 0.0000i |
| 240 | −1 | 0.0000 + 1.0000i | 1 | 0.0000 − 1.0000i |
| 241 | 1 | 1.0000 − 0.0000i | 1 | 1.0000 + 0.0000i |
| 242 | 1 | −0.0000 + 1.0000i | −1 | −0.0000 − 1.0000i |
| 243 | −1 | 1.0000 + 0.0000i | −1 | 1.0000 − 0.0000i |
| 244 | −1 | 0.0000 + 1.0000i | 1 | 0.0000 − 1.0000i |
| 245 | 1 | 1.0000 − 0.0000i | 1 | 1.0000 + 0.0000i |
| 246 | 1 | 0.0000 + 1.0000i | −1 | 0.0000 − 1.0000i |
| 247 | 1 | −1.0000 + 0.0000i | 1 | −1.0000 − 0.0000i |
| 248 | 1 | −0.0000 − 1.0000i | −1 | −0.0000 + 1.0000i |
| 249 | −1 | −1.0000 + 0.0000i | −1 | −1.0000 − 0.0000i |
| 250 | 1 | 0.0000 + 1.0000i | −1 | 0.0000 − 1.0000i |
| 251 | −1 | 1.0000 − 0.0000i | −1 | 1.0000 + 0.0000i |
| 252 | 1 | 0.0000 − 1.0000i | −1 | 0.0000 + 1.0000i |
| 253 | −1 | −1.0000 − 0.0000i | −1 | −1.0000 + 0.0000i |
| 254 | 1 | −0.0000 + 1.0000i | −1 | −0.0000 − 1.0000i |
| 255 | 1 | −1.0000 + 0.0000i | 1 | −1.0000 − 0.0000i |
| 256 | −1 | 0.0000 + 1.0000i | 1 | 0.0000 − 1.0000i |
| 257 | −1 | −1.0000 + 0.0000i | −1 | −1.0000 − 0.0000i |
| 258 | −1 | −0.0000 − 1.0000i | 1 | −0.0000 + 1.0000i |
| 259 | 1 | −1.0000 + 0.0000i | 1 | −1.0000 − 0.0000i |
| 260 | 1 | −0.0000 − 1.0000i | −1 | −0.0000 + 1.0000i |
| 261 | 1 | 1.0000 − 0.0000i | 1 | 1.0000 + 0.0000i |
| 262 | 1 | 0.0000 + 1.0000i | −1 | 0.0000 − 1.0000i |
| 263 | 1 | −1.0000 + 0.0000i | 1 | −1.0000 − 0.0000i |
| 264 | 1 | 0.0000 − 1.0000i | −1 | 0.0000 + 1.0000i |
| 265 | 1 | 1.0000 − 0.0000i | 1 | 1.0000 + 0.0000i |
| 266 | −1 | −0.0000 − 1.0000i | 1 | −0.0000 + 1.0000i |
| 267 | 1 | −1.0000 + 0.0000i | 1 | −1.0000 − 0.0000i |
| 268 | −1 | 0.0000 + 1.0000i | 1 | 0.0000 − 1.0000i |
| 269 | −1 | −1.0000 + 0.0000i | −1 | −1.0000 − 0.0000i |
| 270 | 1 | 0.0000 + 1.0000i | −1 | 0.0000 − 1.0000i |
| 271 | 1 | −1.0000 + 0.0000i | 1 | −1.0000 − 0.0000i |
| 272 | −1 | 0.0000 + 1.0000i | 1 | 0.0000 − 1.0000i |

TABLE A-continued

| Symbol No. | CEF for a first stream (without pi/2 BPSK Modulation) | Modulated CEF for a first stream (with pi/2 BPSK Modulation) [mGu512, mGv512 – mGb128] | CEF for a second stream (without pi/2 BPSK Modulation) | Modulated CEF for a second stream, that is Conjugated CEF [mGu512*, mGv512* – mGb128*]. |
|---|---|---|---|---|
| 273 | −1 | −1.0000 − 0.0000i | −1 | −1.0000 + 0.0000i |
| 274 | −1 | 0.0000 − 1.0000i | 1 | 0.0000 + 1.0000i |
| 275 | 1 | −1.0000 − 0.0000i | 1 | −1.0000 + 0.0000i |
| 276 | 1 | −0.0000 − 1.0000i | −1 | −0.0000 + 1.0000i |
| 277 | −1 | −1.0000 + 0.0000i | −1 | −1.0000 − 0.0000i |
| 278 | −1 | −0.0000 − 1.0000i | 1 | −0.0000 + 1.0000i |
| 279 | −1 | 1.0000 − 0.0000i | −1 | 1.0000 + 0.0000i |
| 280 | −1 | 0.0000 + 1.0000i | 1 | 0.0000 − 1.0000i |
| 281 | 1 | 1.0000 − 0.0000i | 1 | 1.0000 + 0.0000i |
| 282 | −1 | −0.0000 − 1.0000i | 1 | −0.0000 + 1.0000i |
| 283 | 1 | −1.0000 + 0.0000i | 1 | −1.0000 − 0.0000i |
| 284 | −1 | −0.0000 + 1.0000i | 1 | −0.0000 − 1.0000i |
| 285 | 1 | 1.0000 + 0.0000i | 1 | 1.0000 − 0.0000i |
| 286 | −1 | −0.0000 − 1.0000i | 1 | −0.0000 + 1.0000i |
| 287 | −1 | 1.0000 − 0.0000i | −1 | 1.0000 + 0.0000i |
| 288 | 1 | −0.0000 − 1.0000i | −1 | −0.0000 + 1.0000i |
| 289 | 1 | 1.0000 − 0.0000i | 1 | 1.0000 + 0.0000i |
| 290 | 1 | 0.0000 + 1.0000i | −1 | 0.0000 − 1.0000i |
| 291 | −1 | 1.0000 − 0.0000i | −1 | 1.0000 + 0.0000i |
| 292 | −1 | 0.0000 + 1.0000i | 1 | 0.0000 − 1.0000i |
| 293 | −1 | −1.0000 + 0.0000i | −1 | −1.0000 − 0.0000i |
| 294 | −1 | −0.0000 − 1.0000i | 1 | −0.0000 + 1.0000i |
| 295 | −1 | 1.0000 + 0.0000i | −1 | 1.0000 − 0.0000i |
| 296 | −1 | −0.0000 + 1.0000i | 1 | −0.0000 − 1.0000i |
| 297 | −1 | −1.0000 + 0.0000i | −1 | −1.0000 − 0.0000i |
| 298 | 1 | 0.0000 + 1.0000i | −1 | 0.0000 − 1.0000i |
| 299 | −1 | 1.0000 − 0.0000i | −1 | 1.0000 + 0.0000i |
| 300 | 1 | −0.0000 − 1.0000i | −1 | −0.0000 + 1.0000i |
| 301 | 1 | 1.0000 − 0.0000i | 1 | 1.0000 + 0.0000i |
| 302 | −1 | −0.0000 − 1.0000i | 1 | −0.0000 + 1.0000i |
| 303 | −1 | 1.0000 − 0.0000i | −1 | 1.0000 + 0.0000i |
| 304 | 1 | −0.0000 − 1.0000i | −1 | −0.0000 + 1.0000i |
| 305 | −1 | −1.0000 + 0.0000i | −1 | −1.0000 − 0.0000i |
| 306 | −1 | 0.0000 − 1.0000i | 1 | 0.0000 + 1.0000i |
| 307 | 1 | −1.0000 + 0.0000i | 1 | −1.0000 − 0.0000i |
| 308 | 1 | −0.0000 − 1.0000i | −1 | −0.0000 + 1.0000i |
| 309 | −1 | −1.0000 + 0.0000i | −1 | −1.0000 − 0.0000i |
| 310 | −1 | −0.0000 − 1.0000i | 1 | −0.0000 + 1.0000i |
| 311 | −1 | 1.0000 − 0.0000i | −1 | 1.0000 + 0.0000i |
| 312 | −1 | 0.0000 + 1.0000i | 1 | 0.0000 − 1.0000i |
| 313 | 1 | 1.0000 − 0.0000i | 1 | 1.0000 + 0.0000i |
| 314 | −1 | −0.0000 − 1.0000i | 1 | −0.0000 + 1.0000i |
| 315 | 1 | −1.0000 + 0.0000i | 1 | −1.0000 − 0.0000i |
| 316 | −1 | −0.0000 + 1.0000i | 1 | −0.0000 − 1.0000i |
| 317 | 1 | 1.0000 + 0.0000i | 1 | 1.0000 − 0.0000i |
| 318 | −1 | −0.0000 − 1.0000i | 1 | −0.0000 + 1.0000i |
| 319 | −1 | 1.0000 − 0.0000i | −1 | 1.0000 + 0.0000i |
| 320 | 1 | −0.0000 − 1.0000i | −1 | −0.0000 + 1.0000i |
| 321 | 1 | 1.0000 − 0.0000i | 1 | 1.0000 + 0.0000i |
| 322 | 1 | 0.0000 + 1.0000i | −1 | 0.0000 − 1.0000i |
| 323 | −1 | 1.0000 − 0.0000i | −1 | 1.0000 + 0.0000i |
| 324 | −1 | 0.0000 + 1.0000i | 1 | 0.0000 − 1.0000i |
| 325 | −1 | −1.0000 + 0.0000i | −1 | −1.0000 − 0.0000i |
| 326 | −1 | −0.0000 − 1.0000i | 1 | −0.0000 + 1.0000i |
| 327 | −1 | 1.0000 − 0.0000i | −1 | 1.0000 + 0.0000i |
| 328 | −1 | 0.0000 + 1.0000i | 1 | 0.0000 − 1.0000i |
| 329 | −1 | −1.0000 + 0.0000i | −1 | −1.0000 − 0.0000i |
| 330 | 1 | 0.0000 + 1.0000i | −1 | 0.0000 − 1.0000i |
| 331 | −1 | 1.0000 − 0.0000i | −1 | 1.0000 + 0.0000i |
| 332 | 1 | −0.0000 − 1.0000i | −1 | −0.0000 + 1.0000i |
| 333 | 1 | 1.0000 + 0.0000i | 1 | 1.0000 − 0.0000i |
| 334 | −1 | −0.0000 − 1.0000i | 1 | −0.0000 + 1.0000i |
| 335 | −1 | 1.0000 + 0.0000i | −1 | 1.0000 − 0.0000i |
| 336 | 1 | −0.0000 + 1.0000i | −1 | −0.0000 + 1.0000i |
| 337 | 1 | 1.0000 + 0.0000i | 1 | 1.0000 − 0.0000i |
| 338 | 1 | 0.0000 + 1.0000i | −1 | 0.0000 − 1.0000i |
| 339 | −1 | 1.0000 − 0.0000i | −1 | 1.0000 + 0.0000i |
| 340 | −1 | 0.0000 + 1.0000i | 1 | 0.0000 − 1.0000i |
| 341 | 1 | 1.0000 − 0.0000i | 1 | 1.0000 + 0.0000i |
| 342 | 1 | 0.0000 + 1.0000i | −1 | 0.0000 − 1.0000i |
| 343 | 1 | −1.0000 + 0.0000i | 1 | −1.0000 − 0.0000i |
| 344 | 1 | 0.0000 − 1.0000i | −1 | 0.0000 + 1.0000i |
| 345 | −1 | −1.0000 + 0.0000i | −1 | −1.0000 − 0.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 346 | 1 | −0.0000 + 1.0000i | −1 | −0.0000 − 1.0000i |
| 347 | −1 | 1.0000 − 0.0000i | −1 | 1.0000 + 0.0000i |
| 348 | 1 | 0.0000 − 1.0000i | −1 | 0.0000 + 1.0000i |
| 349 | −1 | −1.0000 + 0.0000i | −1 | −1.0000 − 0.0000i |
| 350 | 1 | 0.0000 + 1.0000i | −1 | 0.0000 − 1.0000i |
| 351 | 1 | −1.0000 + 0.0000i | 1 | −1.0000 − 0.0000i |
| 352 | −1 | 0.0000 + 1.0000i | 1 | 0.0000 − 1.0000i |
| 353 | 1 | 1.0000 − 0.0000i | 1 | 1.0000 + 0.0000i |
| 354 | 1 | 0.0000 + 1.0000i | −1 | 0.0000 − 1.0000i |
| 355 | −1 | 1.0000 + 0.0000i | −1 | 1.0000 − 0.0000i |
| 356 | −1 | 0.0000 + 1.0000i | 1 | 0.0000 − 1.0000i |
| 357 | −1 | −1.0000 − 0.0000i | −1 | −1.0000 + 0.0000i |
| 358 | −1 | −0.0000 − 1.0000i | 1 | −0.0000 + 1.0000i |
| 359 | −1 | 1.0000 + 0.0000i | −1 | 1.0000 − 0.0000i |
| 360 | −1 | 0.0000 + 1.0000i | 1 | 0.0000 − 1.0000i |
| 361 | −1 | −1.0000 + 0.0000i | −1 | −1.0000 − 0.0000i |
| 362 | 1 | 0.0000 + 1.0000i | −1 | 0.0000 − 1.0000i |
| 363 | −1 | 1.0000 − 0.0000i | −1 | 1.0000 + 0.0000i |
| 364 | 1 | 0.0000 − 1.0000i | −1 | 0.0000 + 1.0000i |
| 365 | 1 | 1.0000 − 0.0000i | 1 | 1.0000 + 0.0000i |
| 366 | −1 | 0.0000 − 1.0000i | 1 | 0.0000 + 1.0000i |
| 367 | −1 | 1.0000 − 0.0000i | −1 | 1.0000 + 0.0000i |
| 368 | 1 | 0.0000 − 1.0000i | −1 | 0.0000 + 1.0000i |
| 369 | −1 | −1.0000 + 0.0000i | −1 | −1.0000 − 0.0000i |
| 370 | −1 | 0.0000 − 1.0000i | 1 | 0.0000 + 1.0000i |
| 371 | 1 | −1.0000 + 0.0000i | 1 | −1.0000 − 0.0000i |
| 372 | 1 | −0.0000 − 1.0000i | −1 | −0.0000 + 1.0000i |
| 373 | −1 | −1.0000 + 0.0000i | −1 | −1.0000 − 0.0000i |
| 374 | −1 | −0.0000 − 1.0000i | 1 | −0.0000 + 1.0000i |
| 375 | −1 | 1.0000 + 0.0000i | −1 | 1.0000 − 0.0000i |
| 376 | −1 | 0.0000 + 1.0000i | 1 | 0.0000 − 1.0000i |
| 377 | 1 | 1.0000 + 0.0000i | 1 | 1.0000 − 0.0000i |
| 378 | −1 | −0.0000 − 1.0000i | 1 | −0.0000 + 1.0000i |
| 379 | 1 | −1.0000 − 0.0000i | 1 | −1.0000 + 0.0000i |
| 380 | −1 | 0.0000 + 1.0000i | 1 | 0.0000 − 1.0000i |
| 381 | 1 | 1.0000 − 0.0000i | 1 | 1.0000 + 0.0000i |
| 382 | −1 | −0.0000 − 1.0000i | 1 | −0.0000 + 1.0000i |
| 383 | −1 | 1.0000 − 0.0000i | −1 | 1.0000 + 0.0000i |
| 384 | 1 | −0.0000 − 1.0000i | −1 | −0.0000 + 1.0000i |
| 385 | −1 | −1.0000 + 0.0000i | −1 | −1.0000 − 0.0000i |
| 386 | −1 | 0.0000 − 1.0000i | 1 | 0.0000 + 1.0000i |
| 387 | 1 | −1.0000 + 0.0000i | 1 | −1.0000 − 0.0000i |
| 388 | 1 | 0.0000 − 1.0000i | −1 | 0.0000 + 1.0000i |
| 389 | 1 | 1.0000 − 0.0000i | 1 | 1.0000 + 0.0000i |
| 390 | 1 | −0.0000 + 1.0000i | −1 | −0.0000 − 1.0000i |
| 391 | 1 | −1.0000 + 0.0000i | 1 | −1.0000 − 0.0000i |
| 392 | 1 | −0.0000 − 1.0000i | −1 | −0.0000 + 1.0000i |
| 393 | 1 | 1.0000 − 0.0000i | 1 | 1.0000 + 0.0000i |
| 394 | −1 | −0.0000 − 1.0000i | 1 | −0.0000 + 1.0000i |
| 395 | 1 | −1.0000 + 0.0000i | 1 | −1.0000 − 0.0000i |
| 396 | −1 | 0.0000 + 1.0000i | 1 | 0.0000 − 1.0000i |
| 397 | −1 | −1.0000 − 0.0000i | −1 | −1.0000 + 0.0000i |
| 398 | 1 | 0.0000 + 1.0000i | −1 | 0.0000 − 1.0000i |
| 399 | 1 | −1.0000 − 0.0000i | 1 | −1.0000 + 0.0000i |
| 400 | −1 | 0.0000 + 1.0000i | 1 | 0.0000 − 1.0000i |
| 401 | −1 | −1.0000 − 0.0000i | −1 | −1.0000 + 0.0000i |
| 402 | −1 | −0.0000 − 1.0000i | 1 | −0.0000 + 1.0000i |
| 403 | 1 | −1.0000 + 0.0000i | 1 | −1.0000 − 0.0000i |
| 404 | 1 | −0.0000 − 1.0000i | −1 | −0.0000 + 1.0000i |
| 405 | −1 | −1.0000 + 0.0000i | −1 | −1.0000 − 0.0000i |
| 406 | −1 | −0.0000 − 1.0000i | 1 | −0.0000 + 1.0000i |
| 407 | −1 | 1.0000 − 0.0000i | −1 | 1.0000 + 0.0000i |
| 408 | −1 | −0.0000 + 1.0000i | 1 | −0.0000 − 1.0000i |
| 409 | 1 | 1.0000 − 0.0000i | 1 | 1.0000 + 0.0000i |
| 410 | −1 | 0.0000 − 1.0000i | 1 | 0.0000 + 1.0000i |
| 411 | 1 | −1.0000 + 0.0000i | 1 | −1.0000 − 0.0000i |
| 412 | −1 | −0.0000 + 1.0000i | 1 | −0.0000 − 1.0000i |
| 413 | 1 | 1.0000 − 0.0000i | 1 | 1.0000 + 0.0000i |
| 414 | −1 | −0.0000 − 1.0000i | 1 | −0.0000 + 1.0000i |
| 415 | −1 | 1.0000 − 0.0000i | −1 | 1.0000 + 0.0000i |
| 416 | 1 | −0.0000 − 1.0000i | −1 | −0.0000 + 1.0000i |
| 417 | 1 | 1.0000 + 0.0000i | 1 | 1.0000 − 0.0000i |
| 418 | 1 | 0.0000 + 1.0000i | −1 | 0.0000 − 1.0000i |

TABLE A-continued

| Symbol No. | CEF for a first stream (without pi/2 BPSK Modulation) | Modulated CEF for a first stream (with pi/2 BPSK Modulation) [mGu512, mGv512 – mGb128] | CEF for a second stream (without pi/2 BPSK Modulation) | Modulated CEF for a second stream, that is Conjugated CEF [mGu512*, mGv512* – mGb128*]. |
|---|---|---|---|---|
| 419 | −1 | 1.0000 + 0.0000i | −1 | 1.0000 − 0.0000i |
| 420 | −1 | 0.0000 + 1.0000i | 1 | 0.0000 − 1.0000i |
| 421 | −1 | −1.0000 − 0.0000i | −1 | −1.0000 + 0.0000i |
| 422 | −1 | −0.0000 − 1.0000i | 1 | −0.0000 + 1.0000i |
| 423 | −1 | 1.0000 − 0.0000i | −1 | 1.0000 + 0.0000i |
| 424 | −1 | 0.0000 + 1.0000i | 1 | 0.0000 − 1.0000i |
| 425 | −1 | −1.0000 + 0.0000i | −1 | −1.0000 − 0.0000i |
| 426 | 1 | 0.0000 + 1.0000i | −1 | 0.0000 − 1.0000i |
| 427 | −1 | 1.0000 − 0.0000i | −1 | 1.0000 + 0.0000i |
| 428 | 1 | 0.0000 − 1.0000i | −1 | 0.0000 + 1.0000i |
| 429 | 1 | 1.0000 − 0.0000i | 1 | 1.0000 + 0.0000i |
| 430 | −1 | 0.0000 − 1.0000i | 1 | 0.0000 + 1.0000i |
| 431 | −1 | 1.0000 − 0.0000i | −1 | 1.0000 + 0.0000i |
| 432 | 1 | 0.0000 − 1.0000i | −1 | 0.0000 + 1.0000i |
| 433 | −1 | −1.0000 + 0.0000i | −1 | −1.0000 − 0.0000i |
| 434 | −1 | −0.0000 − 1.0000i | 1 | −0.0000 + 1.0000i |
| 435 | 1 | −1.0000 + 0.0000i | 1 | −1.0000 − 0.0000i |
| 436 | 1 | −0.0000 − 1.0000i | −1 | −0.0000 + 1.0000i |
| 437 | −1 | −1.0000 + 0.0000i | −1 | −1.0000 − 0.0000i |
| 438 | −1 | −0.0000 − 1.0000i | 1 | −0.0000 + 1.0000i |
| 439 | −1 | 1.0000 + 0.0000i | −1 | 1.0000 − 0.0000i |
| 440 | −1 | 0.0000 + 1.0000i | 1 | 0.0000 − 1.0000i |
| 441 | 1 | 1.0000 + 0.0000i | 1 | 1.0000 − 0.0000i |
| 442 | −1 | −0.0000 − 1.0000i | 1 | −0.0000 + 1.0000i |
| 443 | 1 | −1.0000 − 0.0000i | 1 | −1.0000 + 0.0000i |
| 444 | −1 | 0.0000 + 1.0000i | 1 | 0.0000 − 1.0000i |
| 445 | 1 | 1.0000 − 0.0000i | 1 | 1.0000 + 0.0000i |
| 446 | −1 | −0.0000 − 1.0000i | 1 | −0.0000 + 1.0000i |
| 447 | −1 | 1.0000 − 0.0000i | −1 | 1.0000 + 0.0000i |
| 448 | 1 | −0.0000 − 1.0000i | −1 | −0.0000 + 1.0000i |
| 449 | −1 | −1.0000 + 0.0000i | −1 | −1.0000 − 0.0000i |
| 450 | −1 | 0.0000 − 1.0000i | 1 | 0.0000 + 1.0000i |
| 451 | 1 | −1.0000 + 0.0000i | 1 | −1.0000 − 0.0000i |
| 452 | 1 | 0.0000 − 1.0000i | −1 | 0.0000 + 1.0000i |
| 453 | 1 | 1.0000 − 0.0000i | 1 | 1.0000 + 0.0000i |
| 454 | 1 | −0.0000 + 1.0000i | −1 | −0.0000 − 1.0000i |
| 455 | 1 | −1.0000 + 0.0000i | 1 | −1.0000 − 0.0000i |
| 456 | 1 | −0.0000 − 1.0000i | −1 | −0.0000 + 1.0000i |
| 457 | 1 | 1.0000 − 0.0000i | 1 | 1.0000 + 0.0000i |
| 458 | −1 | −0.0000 − 1.0000i | 1 | −0.0000 + 1.0000i |
| 459 | 1 | −1.0000 + 0.0000i | 1 | −1.0000 − 0.0000i |
| 460 | −1 | 0.0000 + 1.0000i | 1 | 0.0000 − 1.0000i |
| 461 | −1 | −1.0000 − 0.0000i | −1 | −1.0000 + 0.0000i |
| 462 | 1 | 0.0000 + 1.0000i | −1 | 0.0000 − 1.0000i |
| 463 | 1 | −1.0000 − 0.0000i | 1 | −1.0000 + 0.0000i |
| 464 | −1 | 0.0000 + 1.0000i | 1 | 0.0000 − 1.0000i |
| 465 | −1 | −1.0000 − 0.0000i | −1 | −1.0000 + 0.0000i |
| 466 | −1 | −0.0000 − 1.0000i | 1 | −0.0000 + 1.0000i |
| 467 | 1 | −1.0000 + 0.0000i | 1 | −1.0000 − 0.0000i |
| 468 | 1 | −0.0000 − 1.0000i | −1 | −0.0000 + 1.0000i |
| 469 | −1 | −1.0000 + 0.0000i | −1 | −1.0000 − 0.0000i |
| 470 | −1 | −0.0000 − 1.0000i | 1 | −0.0000 + 1.0000i |
| 471 | −1 | 1.0000 − 0.0000i | −1 | 1.0000 + 0.0000i |
| 472 | −1 | −0.0000 + 1.0000i | 1 | −0.0000 − 1.0000i |
| 473 | 1 | 1.0000 − 0.0000i | 1 | 1.0000 + 0.0000i |
| 474 | −1 | 0.0000 − 1.0000i | 1 | 0.0000 + 1.0000i |
| 475 | 1 | −1.0000 + 0.0000i | 1 | −1.0000 − 0.0000i |
| 476 | −1 | 0.0000 + 1.0000i | 1 | 0.0000 − 1.0000i |
| 477 | 1 | 1.0000 − 0.0000i | 1 | 1.0000 + 0.0000i |
| 478 | −1 | −0.0000 − 1.0000i | 1 | −0.0000 + 1.0000i |
| 479 | −1 | 1.0000 − 0.0000i | −1 | 1.0000 + 0.0000i |
| 480 | 1 | −0.0000 − 1.0000i | −1 | −0.0000 + 1.0000i |
| 481 | −1 | −1.0000 + 0.0000i | −1 | −1.0000 − 0.0000i |
| 482 | −1 | −0.0000 + 1.0000i | 1 | −0.0000 − 1.0000i |
| 483 | 1 | −1.0000 − 0.0000i | 1 | −1.0000 + 0.0000i |
| 484 | 1 | −0.0000 − 1.0000i | −1 | −0.0000 + 1.0000i |
| 485 | 1 | 1.0000 + 0.0000i | 1 | 1.0000 − 0.0000i |
| 486 | 1 | 0.0000 + 1.0000i | −1 | 0.0000 − 1.0000i |
| 487 | 1 | −1.0000 + 0.0000i | 1 | −1.0000 − 0.0000i |
| 488 | 1 | −0.0000 − 1.0000i | −1 | −0.0000 + 1.0000i |
| 489 | 1 | 1.0000 − 0.0000i | 1 | 1.0000 + 0.0000i |
| 490 | −1 | −0.0000 − 1.0000i | 1 | −0.0000 + 1.0000i |
| 491 | 1 | −1.0000 + 0.0000i | 1 | −1.0000 − 0.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 492 | −1 | −0.0000 + 1.0000i | 1 | −0.0000 − 1.0000i |
| 493 | −1 | −1.0000 + 0.0000i | −1 | −1.0000 − 0.0000i |
| 494 | 1 | −0.0000 + 1.0000i | −1 | −0.0000 − 1.0000i |
| 495 | 1 | −1.0000 + 0.0000i | 1 | −1.0000 − 0.0000i |
| 496 | −1 | −0.0000 + 1.0000i | 1 | −0.0000 − 1.0000i |
| 497 | 1 | 1.0000 − 0.0000i | 1 | 1.0000 + 0.0000i |
| 498 | 1 | 0.0000 + 1.0000i | −1 | 0.0000 − 1.0000i |
| 499 | −1 | 1.0000 − 0.0000i | −1 | 1.0000 + 0.0000i |
| 500 | −1 | 0.0000 + 1.0000i | 1 | 0.0000 − 1.0000i |
| 501 | 1 | 1.0000 − 0.0000i | 1 | 1.0000 + 0.0000i |
| 502 | 1 | 0.0000 + 1.0000i | −1 | 0.0000 − 1.0000i |
| 503 | 1 | −1.0000 − 0.0000i | 1 | −1.0000 + 0.0000i |
| 504 | 1 | −0.0000 − 1.0000i | −1 | −0.0000 + 1.0000i |
| 505 | −1 | −1.0000 − 0.0000i | −1 | −1.0000 + 0.0000i |
| 506 | 1 | 0.0000 + 1.0000i | −1 | 0.0000 − 1.0000i |
| 507 | −1 | 1.0000 + 0.0000i | −1 | 1.0000 − 0.0000i |
| 508 | 1 | −0.0000 − 1.0000i | −1 | −0.0000 + 1.0000i |
| 509 | −1 | −1.0000 + 0.0000i | −1 | −1.0000 − 0.0000i |
| 510 | 1 | 0.0000 + 1.0000i | −1 | 0.0000 − 1.0000i |
| 511 | 1 | −1.0000 + 0.0000i | 1 | −1.0000 − 0.0000i |
| 512 | −1 | 0.0000 + 1.0000i | 1 | 0.0000 − 1.0000i |
| 513 | 1 | 1.0000 − 0.0000i | 1 | 1.0000 + 0.0000i |
| 514 | 1 | −0.0000 + 1.0000i | −1 | −0.0000 − 1.0000i |
| 515 | −1 | 1.0000 − 0.0000i | −1 | 1.0000 + 0.0000i |
| 516 | −1 | −0.0000 + 1.0000i | 1 | −0.0000 − 1.0000i |
| 517 | −1 | −1.0000 + 0.0000i | −1 | −1.0000 − 0.0000i |
| 518 | −1 | −0.0000 − 1.0000i | 1 | −0.0000 + 1.0000i |
| 519 | −1 | 1.0000 − 0.0000i | −1 | 1.0000 + 0.0000i |
| 520 | −1 | 0.0000 + 1.0000i | 1 | 0.0000 − 1.0000i |
| 521 | −1 | −1.0000 + 0.0000i | −1 | −1.0000 − 0.0000i |
| 522 | 1 | 0.0000 + 1.0000i | −1 | 0.0000 − 1.0000i |
| 523 | −1 | 1.0000 − 0.0000i | −1 | 1.0000 + 0.0000i |
| 524 | 1 | −0.0000 − 1.0000i | −1 | −0.0000 + 1.0000i |
| 525 | 1 | 1.0000 + 0.0000i | 1 | 1.0000 − 0.0000i |
| 526 | −1 | −0.0000 − 1.0000i | 1 | −0.0000 + 1.0000i |
| 527 | −1 | 1.0000 + 0.0000i | −1 | 1.0000 − 0.0000i |
| 528 | 1 | −0.0000 − 1.0000i | −1 | −0.0000 + 1.0000i |
| 529 | 1 | 1.0000 − 0.0000i | 1 | 1.0000 + 0.0000i |
| 530 | 1 | 0.0000 + 1.0000i | −1 | 0.0000 − 1.0000i |
| 531 | −1 | 1.0000 − 0.0000i | −1 | 1.0000 + 0.0000i |
| 532 | −1 | 0.0000 + 1.0000i | 1 | 0.0000 − 1.0000i |
| 533 | 1 | 1.0000 − 0.0000i | 1 | 1.0000 + 0.0000i |
| 534 | 1 | 0.0000 + 1.0000i | −1 | 0.0000 − 1.0000i |
| 535 | 1 | −1.0000 + 0.0000i | 1 | −1.0000 − 0.0000i |
| 536 | 1 | 0.0000 − 1.0000i | −1 | 0.0000 + 1.0000i |
| 537 | −1 | −1.0000 + 0.0000i | −1 | −1.0000 − 0.0000i |
| 538 | 1 | −0.0000 + 1.0000i | −1 | −0.0000 − 1.0000i |
| 539 | −1 | 1.0000 − 0.0000i | −1 | 1.0000 + 0.0000i |
| 540 | 1 | −0.0000 − 1.0000i | −1 | −0.0000 + 1.0000i |
| 541 | −1 | −1.0000 + 0.0000i | −1 | −1.0000 − 0.0000i |
| 542 | 1 | 0.0000 + 1.0000i | −1 | 0.0000 − 1.0000i |
| 543 | 1 | −1.0000 + 0.0000i | 1 | −1.0000 − 0.0000i |
| 544 | −1 | 0.0000 + 1.0000i | 1 | 0.0000 − 1.0000i |
| 545 | −1 | −1.0000 − 0.0000i | −1 | −1.0000 + 0.0000i |
| 546 | −1 | −0.0000 − 1.0000i | 1 | −0.0000 + 1.0000i |
| 547 | 1 | −1.0000 − 0.0000i | 1 | −1.0000 + 0.0000i |
| 548 | 1 | −0.0000 − 1.0000i | −1 | −0.0000 + 1.0000i |
| 549 | 1 | 1.0000 + 0.0000i | 1 | 1.0000 − 0.0000i |
| 550 | 1 | 0.0000 + 1.0000i | −1 | 0.0000 − 1.0000i |
| 551 | 1 | −1.0000 + 0.0000i | 1 | −1.0000 − 0.0000i |
| 552 | 1 | −0.0000 − 1.0000i | −1 | −0.0000 + 1.0000i |
| 553 | 1 | 1.0000 − 0.0000i | 1 | 1.0000 + 0.0000i |
| 554 | −1 | −0.0000 − 1.0000i | 1 | −0.0000 + 1.0000i |
| 555 | 1 | −1.0000 + 0.0000i | 1 | −1.0000 − 0.0000i |
| 556 | −1 | −0.0000 + 1.0000i | 1 | −0.0000 − 1.0000i |
| 557 | −1 | −1.0000 + 0.0000i | −1 | −1.0000 − 0.0000i |
| 558 | 1 | −0.0000 + 1.0000i | −1 | −0.0000 − 1.0000i |
| 559 | 1 | −1.0000 + 0.0000i | 1 | −1.0000 − 0.0000i |
| 560 | −1 | 0.0000 + 1.0000i | 1 | 0.0000 − 1.0000i |
| 561 | 1 | 1.0000 − 0.0000i | 1 | 1.0000 + 0.0000i |
| 562 | 1 | 0.0000 + 1.0000i | −1 | 0.0000 − 1.0000i |
| 563 | −1 | 1.0000 − 0.0000i | −1 | 1.0000 + 0.0000i |
| 564 | −1 | 0.0000 + 1.0000i | 1 | 0.0000 − 1.0000i |

TABLE A-continued

| Symbol No. | CEF for a first stream (without pi/2 BPSK Modulation) | Modulated CEF for a first stream (with pi/2 BPSK Modulation) [mGu512, mGv512 – mGb128] | CEF for a second stream (without pi/2 BPSK Modulation) | Modulated CEF for a second stream, that is Conjugated CEF [mGu512*, mGv512* – mGb128*]. |
|---|---|---|---|---|
| 565 | 1 | 1.0000 − 0.0000i | 1 | 1.0000 + 0.0000i |
| 566 | 1 | 0.0000 + 1.0000i | −1 | 0.0000 − 1.0000i |
| 567 | 1 | −1.0000 − 0.0000i | 1 | −1.0000 + 0.0000i |
| 568 | 1 | −0.0000 − 1.0000i | −1 | −0.0000 + 1.0000i |
| 569 | −1 | −1.0000 − 0.0000i | −1 | −1.0000 + 0.0000i |
| 570 | 1 | 0.0000 + 1.0000i | −1 | 0.0000 − 1.0000i |
| 571 | −1 | 1.0000 − 0.0000i | −1 | 1.0000 + 0.0000i |
| 572 | 1 | −0.0000 − 1.0000i | −1 | −0.0000 + 1.0000i |
| 573 | −1 | −1.0000 + 0.0000i | −1 | −1.0000 − 0.0000i |
| 574 | 1 | 0.0000 + 1.0000i | −1 | 0.0000 − 1.0000i |
| 575 | 1 | −1.0000 + 0.0000i | 1 | −1.0000 − 0.0000i |
| 576 | −1 | 0.0000 + 1.0000i | 1 | 0.0000 − 1.0000i |
| 577 | −1 | −1.0000 + 0.0000i | −1 | −1.0000 − 0.0000i |
| 578 | −1 | 0.0000 − 1.0000i | 1 | 0.0000 + 1.0000i |
| 579 | 1 | −1.0000 + 0.0000i | 1 | −1.0000 − 0.0000i |
| 580 | 1 | 0.0000 − 1.0000i | −1 | 0.0000 + 1.0000i |
| 581 | 1 | 1.0000 − 0.0000i | 1 | 1.0000 + 0.0000i |
| 582 | 1 | 0.0000 + 1.0000i | −1 | 0.0000 − 1.0000i |
| 583 | 1 | −1.0000 + 0.0000i | 1 | −1.0000 − 0.0000i |
| 584 | 1 | −0.0000 − 1.0000i | −1 | −0.0000 + 1.0000i |
| 585 | 1 | 1.0000 − 0.0000i | 1 | 1.0000 + 0.0000i |
| 586 | −1 | −0.0000 − 1.0000i | 1 | −0.0000 + 1.0000i |
| 587 | 1 | −1.0000 + 0.0000i | 1 | −1.0000 − 0.0000i |
| 588 | −1 | 0.0000 + 1.0000i | 1 | 0.0000 − 1.0000i |
| 589 | −1 | −1.0000 − 0.0000i | −1 | −1.0000 + 0.0000i |
| 590 | 1 | 0.0000 + 1.0000i | −1 | 0.0000 − 1.0000i |
| 591 | 1 | −1.0000 − 0.0000i | 1 | −1.0000 + 0.0000i |
| 592 | −1 | 0.0000 + 1.0000i | 1 | 0.0000 − 1.0000i |
| 593 | −1 | −1.0000 + 0.0000i | −1 | −1.0000 − 0.0000i |
| 594 | −1 | −0.0000 − 1.0000i | 1 | −0.0000 + 1.0000i |
| 595 | 1 | −1.0000 + 0.0000i | 1 | −1.0000 − 0.0000i |
| 596 | 1 | −0.0000 − 1.0000i | −1 | −0.0000 + 1.0000i |
| 597 | −1 | −1.0000 + 0.0000i | −1 | −1.0000 − 0.0000i |
| 598 | −1 | −0.0000 − 1.0000i | 1 | −0.0000 + 1.0000i |
| 599 | −1 | 1.0000 − 0.0000i | −1 | 1.0000 + 0.0000i |
| 600 | −1 | −0.0000 + 1.0000i | 1 | −0.0000 − 1.0000i |
| 601 | 1 | 1.0000 − 0.0000i | 1 | 1.0000 + 0.0000i |
| 602 | −1 | 0.0000 − 1.0000i | 1 | 0.0000 + 1.0000i |
| 603 | 1 | −1.0000 + 0.0000i | 1 | −1.0000 − 0.0000i |
| 604 | −1 | 0.0000 + 1.0000i | 1 | 0.0000 − 1.0000i |
| 605 | 1 | 1.0000 − 0.0000i | 1 | 1.0000 + 0.0000i |
| 606 | −1 | −0.0000 − 1.0000i | 1 | −0.0000 + 1.0000i |
| 607 | −1 | 1.0000 − 0.0000i | −1 | 1.0000 + 0.0000i |
| 608 | 1 | −0.0000 − 1.0000i | −1 | −0.0000 + 1.0000i |
| 609 | −1 | −1.0000 + 0.0000i | −1 | −1.0000 − 0.0000i |
| 610 | −1 | −0.0000 − 1.0000i | 1 | −0.0000 + 1.0000i |
| 611 | 1 | −1.0000 − 0.0000i | 1 | −1.0000 + 0.0000i |
| 612 | 1 | −0.0000 − 1.0000i | −1 | −0.0000 + 1.0000i |
| 613 | 1 | 1.0000 − 0.0000i | 1 | 1.0000 + 0.0000i |
| 614 | 1 | 0.0000 + 1.0000i | −1 | 0.0000 − 1.0000i |
| 615 | 1 | −1.0000 + 0.0000i | 1 | −1.0000 − 0.0000i |
| 616 | 1 | −0.0000 − 1.0000i | −1 | −0.0000 + 1.0000i |
| 617 | 1 | 1.0000 − 0.0000i | 1 | 1.0000 + 0.0000i |
| 618 | −1 | −0.0000 − 1.0000i | 1 | −0.0000 + 1.0000i |
| 619 | 1 | −1.0000 + 0.0000i | 1 | −1.0000 − 0.0000i |
| 620 | −1 | −0.0000 + 1.0000i | 1 | −0.0000 − 1.0000i |
| 621 | −1 | −1.0000 + 0.0000i | −1 | −1.0000 − 0.0000i |
| 622 | 1 | −0.0000 + 1.0000i | −1 | −0.0000 − 1.0000i |
| 623 | 1 | −1.0000 + 0.0000i | 1 | −1.0000 − 0.0000i |
| 624 | −1 | 0.0000 + 1.0000i | 1 | 0.0000 − 1.0000i |
| 625 | 1 | 1.0000 − 0.0000i | 1 | 1.0000 + 0.0000i |
| 626 | 1 | 0.0000 + 1.0000i | −1 | 0.0000 − 1.0000i |
| 627 | −1 | 1.0000 − 0.0000i | −1 | 1.0000 + 0.0000i |
| 628 | −1 | 0.0000 − 1.0000i | 1 | 0.0000 + 1.0000i |
| 629 | 1 | 1.0000 − 0.0000i | 1 | 1.0000 + 0.0000i |
| 630 | 1 | 0.0000 + 1.0000i | −1 | 0.0000 − 1.0000i |
| 631 | 1 | −1.0000 − 0.0000i | 1 | −1.0000 + 0.0000i |
| 632 | 1 | −0.0000 − 1.0000i | −1 | −0.0000 + 1.0000i |
| 633 | −1 | −1.0000 − 0.0000i | −1 | −1.0000 + 0.0000i |
| 634 | 1 | 0.0000 + 1.0000i | −1 | 0.0000 − 1.0000i |
| 635 | −1 | 1.0000 − 0.0000i | −1 | 1.0000 + 0.0000i |
| 636 | 1 | −0.0000 − 1.0000i | −1 | −0.0000 + 1.0000i |
| 637 | −1 | −1.0000 + 0.0000i | −1 | −1.0000 − 0.0000i |

TABLE A-continued

| Symbol No. | CEF for a first stream (without pi/2 BPSK Modulation) | Modulated CEF for a first stream (with pi/2 BPSK Modulation) [mGu512, mGv512 – mGb128] | CEF for a second stream (without pi/2 BPSK Modulation) | Modulated CEF for a second stream, that is Conjugated CEF [mGu512*, mGv512* – mGb128*]. |
|---|---|---|---|---|
| 638 | 1 | 0.0000 + 1.0000i | −1 | 0.0000 − 1.0000i |
| 639 | 1 | −1.0000 + 0.0000i | 1 | −1.0000 − 0.0000i |
| 640 | −1 | 0.0000 + 1.0000i | 1 | 0.0000 − 1.0000i |
| 641 | 1 | 1.0000 − 0.0000i | 1 | 1.0000 + 0.0000i |
| 642 | 1 | −0.0000 + 1.0000i | −1 | −0.0000 − 1.0000i |
| 643 | −1 | 1.0000 − 0.0000i | −1 | 1.0000 + 0.0000i |
| 644 | −1 | −0.0000 + 1.0000i | 1 | −0.0000 − 1.0000i |
| 645 | −1 | −1.0000 + 0.0000i | −1 | −1.0000 − 0.0000i |
| 646 | −1 | −0.0000 − 1.0000i | 1 | −0.0000 + 1.0000i |
| 647 | −1 | 1.0000 − 0.0000i | −1 | 1.0000 + 0.0000i |
| 648 | −1 | 0.0000 + 1.0000i | 1 | 0.0000 − 1.0000i |
| 649 | −1 | −1.0000 + 0.0000i | −1 | −1.0000 − 0.0000i |
| 650 | 1 | 0.0000 + 1.0000i | −1 | 0.0000 − 1.0000i |
| 651 | −1 | 1.0000 − 0.0000i | −1 | 1.0000 + 0.0000i |
| 652 | 1 | −0.0000 − 1.0000i | −1 | −0.0000 + 1.0000i |
| 653 | 1 | 1.0000 − 0.0000i | 1 | 1.0000 + 0.0000i |
| 654 | −1 | 0.0000 − 1.0000i | 1 | 0.0000 + 1.0000i |
| 655 | −1 | 1.0000 − 0.0000i | −1 | 1.0000 + 0.0000i |
| 656 | 1 | −0.0000 − 1.0000i | −1 | −0.0000 + 1.0000i |
| 657 | 1 | 1.0000 − 0.0000i | 1 | 1.0000 + 0.0000i |
| 658 | 1 | −0.0000 + 1.0000i | −1 | −0.0000 − 1.0000i |
| 659 | −1 | 1.0000 − 0.0000i | −1 | 1.0000 + 0.0000i |
| 660 | −1 | 0.0000 + 1.0000i | 1 | 0.0000 − 1.0000i |
| 661 | 1 | 1.0000 − 0.0000i | 1 | 1.0000 + 0.0000i |
| 662 | 1 | −0.0000 + 1.0000i | −1 | −0.0000 − 1.0000i |
| 663 | 1 | −1.0000 + 0.0000i | 1 | −1.0000 − 0.0000i |
| 664 | 1 | −0.0000 − 1.0000i | −1 | −0.0000 + 1.0000i |
| 665 | −1 | −1.0000 − 0.0000i | −1 | −1.0000 + 0.0000i |
| 666 | 1 | 0.0000 + 1.0000i | −1 | 0.0000 − 1.0000i |
| 667 | −1 | 1.0000 − 0.0000i | −1 | 1.0000 + 0.0000i |
| 668 | 1 | −0.0000 − 1.0000i | −1 | −0.0000 + 1.0000i |
| 669 | −1 | −1.0000 − 0.0000i | −1 | −1.0000 + 0.0000i |
| 670 | 1 | 0.0000 + 1.0000i | −1 | 0.0000 − 1.0000i |
| 671 | 1 | −1.0000 + 0.0000i | 1 | −1.0000 − 0.0000i |
| 672 | −1 | 0.0000 + 1.0000i | 1 | 0.0000 − 1.0000i |
| 673 | −1 | −1.0000 − 0.0000i | −1 | −1.0000 + 0.0000i |
| 674 | −1 | −0.0000 − 1.0000i | 1 | −0.0000 + 1.0000i |
| 675 | 1 | −1.0000 + 0.0000i | 1 | −1.0000 − 0.0000i |
| 676 | 1 | 0.0000 − 1.0000i | −1 | 0.0000 + 1.0000i |
| 677 | 1 | 1.0000 − 0.0000i | 1 | 1.0000 + 0.0000i |
| 678 | 1 | 0.0000 + 1.0000i | −1 | 0.0000 − 1.0000i |
| 679 | 1 | −1.0000 + 0.0000i | 1 | −1.0000 − 0.0000i |
| 680 | 1 | 0.0000 − 1.0000i | −1 | 0.0000 + 1.0000i |
| 681 | 1 | 1.0000 − 0.0000i | 1 | 1.0000 + 0.0000i |
| 682 | −1 | −0.0000 − 1.0000i | 1 | −0.0000 + 1.0000i |
| 683 | 1 | −1.0000 + 0.0000i | 1 | −1.0000 − 0.0000i |
| 684 | −1 | −0.0000 + 1.0000i | 1 | −0.0000 − 1.0000i |
| 685 | −1 | −1.0000 + 0.0000i | −1 | −1.0000 − 0.0000i |
| 686 | 1 | 0.0000 + 1.0000i | −1 | 0.0000 − 1.0000i |
| 687 | 1 | −1.0000 − 0.0000i | 1 | −1.0000 + 0.0000i |
| 688 | −1 | 0.0000 + 1.0000i | 1 | 0.0000 − 1.0000i |
| 689 | 1 | 1.0000 − 0.0000i | 1 | 1.0000 + 0.0000i |
| 690 | 1 | 0.0000 + 1.0000i | −1 | 0.0000 − 1.0000i |
| 691 | −1 | 1.0000 + 0.0000i | −1 | 1.0000 − 0.0000i |
| 692 | −1 | 0.0000 + 1.0000i | 1 | 0.0000 − 1.0000i |
| 693 | 1 | 1.0000 − 0.0000i | 1 | 1.0000 + 0.0000i |
| 694 | 1 | 0.0000 + 1.0000i | −1 | 0.0000 − 1.0000i |
| 695 | 1 | −1.0000 − 0.0000i | 1 | −1.0000 + 0.0000i |
| 696 | 1 | −0.0000 − 1.0000i | −1 | −0.0000 + 1.0000i |
| 697 | −1 | −1.0000 + 0.0000i | −1 | −1.0000 − 0.0000i |
| 698 | 1 | −0.0000 + 1.0000i | −1 | −0.0000 − 1.0000i |
| 699 | −1 | 1.0000 − 0.0000i | −1 | 1.0000 + 0.0000i |
| 700 | 1 | −0.0000 − 1.0000i | −1 | −0.0000 + 1.0000i |
| 701 | −1 | −1.0000 + 0.0000i | −1 | −1.0000 − 0.0000i |
| 702 | 1 | −0.0000 + 1.0000i | −1 | −0.0000 − 1.0000i |
| 703 | −1 | −1.0000 + 0.0000i | 1 | −1.0000 − 0.0000i |
| 704 | −1 | 0.0000 + 1.0000i | 1 | 0.0000 − 1.0000i |
| 705 | 1 | 1.0000 − 0.0000i | 1 | 1.0000 + 0.0000i |
| 706 | 1 | −0.0000 + 1.0000i | −1 | −0.0000 − 1.0000i |
| 707 | −1 | 1.0000 − 0.0000i | −1 | 1.0000 + 0.0000i |
| 708 | −1 | 0.0000 + 1.0000i | 1 | 0.0000 − 1.0000i |
| 709 | −1 | −1.0000 − 0.0000i | −1 | −1.0000 + 0.0000i |
| 710 | −1 | −0.0000 − 1.0000i | 1 | −0.0000 + 1.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 711 | −1 | 1.0000 − 0.0000i | −1 | 1.0000 + 0.0000i |
| 712 | −1 | 0.0000 + 1.0000i | 1 | 0.0000 − 1.0000i |
| 713 | −1 | −1.0000 − 0.0000i | −1 | −1.0000 + 0.0000i |
| 714 | 1 | 0.0000 + 1.0000i | −1 | 0.0000 − 1.0000i |
| 715 | −1 | 1.0000 − 0.0000i | −1 | 1.0000 + 0.0000i |
| 716 | 1 | 0.0000 − 1.0000i | −1 | 0.0000 + 1.0000i |
| 717 | 1 | 1.0000 + 0.0000i | 1 | 1.0000 − 0.0000i |
| 718 | −1 | −0.0000 − 1.0000i | 1 | −0.0000 + 1.0000i |
| 719 | −1 | 1.0000 − 0.0000i | −1 | 1.0000 + 0.0000i |
| 720 | 1 | 0.0000 − 1.0000i | −1 | 0.0000 + 1.0000i |
| 721 | 1 | 1.0000 − 0.0000i | 1 | 1.0000 + 0.0000i |
| 722 | 1 | 0.0000 + 1.0000i | −1 | 0.0000 − 1.0000i |
| 723 | −1 | 1.0000 − 0.0000i | −1 | 1.0000 + 0.0000i |
| 724 | −1 | −0.0000 + 1.0000i | 1 | −0.0000 − 1.0000i |
| 725 | 1 | 1.0000 − 0.0000i | 1 | 1.0000 + 0.0000i |
| 726 | 1 | 0.0000 + 1.0000i | −1 | 0.0000 − 1.0000i |
| 727 | 1 | −1.0000 − 0.0000i | 1 | −1.0000 + 0.0000i |
| 728 | 1 | 0.0000 − 1.0000i | −1 | 0.0000 + 1.0000i |
| 729 | −1 | −1.0000 + 0.0000i | −1 | −1.0000 − 0.0000i |
| 730 | 1 | 0.0000 + 1.0000i | −1 | 0.0000 − 1.0000i |
| 731 | −1 | 1.0000 + 0.0000i | −1 | 1.0000 − 0.0000i |
| 732 | 1 | −0.0000 − 1.0000i | −1 | −0.0000 + 1.0000i |
| 733 | −1 | −1.0000 + 0.0000i | −1 | −1.0000 − 0.0000i |
| 734 | 1 | 0.0000 + 1.0000i | −1 | 0.0000 − 1.0000i |
| 735 | 1 | −1.0000 − 0.0000i | 1 | −1.0000 + 0.0000i |
| 736 | −1 | 0.0000 + 1.0000i | 1 | 0.0000 − 1.0000i |
| 737 | 1 | 1.0000 − 0.0000i | 1 | 1.0000 + 0.0000i |
| 738 | 1 | −0.0000 + 1.0000i | −1 | −0.0000 − 1.0000i |
| 739 | −1 | 1.0000 + 0.0000i | −1 | 1.0000 − 0.0000i |
| 740 | −1 | 0.0000 + 1.0000i | 1 | 0.0000 − 1.0000i |
| 741 | −1 | −1.0000 + 0.0000i | −1 | −1.0000 − 0.0000i |
| 742 | −1 | 0.0000 − 1.0000i | 1 | 0.0000 + 1.0000i |
| 743 | −1 | 1.0000 − 0.0000i | −1 | 1.0000 + 0.0000i |
| 744 | −1 | 0.0000 + 1.0000i | 1 | 0.0000 − 1.0000i |
| 745 | −1 | −1.0000 + 0.0000i | −1 | −1.0000 − 0.0000i |
| 746 | 1 | −0.0000 + 1.0000i | −1 | −0.0000 − 1.0000i |
| 747 | −1 | 1.0000 − 0.0000i | −1 | 1.0000 + 0.0000i |
| 748 | 1 | −0.0000 − 1.0000i | −1 | −0.0000 + 1.0000i |
| 749 | 1 | 1.0000 + 0.0000i | 1 | 1.0000 − 0.0000i |
| 750 | −1 | −0.0000 − 1.0000i | 1 | −0.0000 + 1.0000i |
| 751 | −1 | 1.0000 − 0.0000i | −1 | 1.0000 + 0.0000i |
| 752 | 1 | −0.0000 − 1.0000i | −1 | −0.0000 + 1.0000i |
| 753 | −1 | −1.0000 − 0.0000i | −1 | −1.0000 + 0.0000i |
| 754 | −1 | −0.0000 − 1.0000i | 1 | −0.0000 + 1.0000i |
| 755 | 1 | −1.0000 + 0.0000i | 1 | −1.0000 − 0.0000i |
| 756 | 1 | −0.0000 − 1.0000i | −1 | −0.0000 + 1.0000i |
| 757 | −1 | −1.0000 − 0.0000i | −1 | −1.0000 + 0.0000i |
| 758 | −1 | −0.0000 − 1.0000i | 1 | −0.0000 + 1.0000i |
| 759 | −1 | 1.0000 − 0.0000i | −1 | 1.0000 + 0.0000i |
| 760 | −1 | −0.0000 + 1.0000i | 1 | −0.0000 − 1.0000i |
| 761 | 1 | 1.0000 − 0.0000i | 1 | 1.0000 + 0.0000i |
| 762 | −1 | −0.0000 − 1.0000i | 1 | −0.0000 + 1.0000i |
| 763 | 1 | −1.0000 + 0.0000i | 1 | −1.0000 − 0.0000i |
| 764 | −1 | −0.0000 + 1.0000i | 1 | −0.0000 − 1.0000i |
| 765 | 1 | 1.0000 − 0.0000i | 1 | 1.0000 + 0.0000i |
| 766 | −1 | −0.0000 − 1.0000i | 1 | −0.0000 + 1.0000i |
| 767 | −1 | 1.0000 − 0.0000i | −1 | 1.0000 + 0.0000i |
| 768 | 1 | 0.0000 − 1.0000i | −1 | 0.0000 + 1.0000i |
| 769 | 1 | 1.0000 − 0.0000i | 1 | 1.0000 + 0.0000i |
| 770 | 1 | 0.0000 + 1.0000i | −1 | 0.0000 − 1.0000i |
| 771 | −1 | 1.0000 + 0.0000i | −1 | 1.0000 − 0.0000i |
| 772 | −1 | 0.0000 + 1.0000i | 1 | 0.0000 − 1.0000i |
| 773 | −1 | −1.0000 + 0.0000i | −1 | −1.0000 − 0.0000i |
| 774 | −1 | −0.0000 + 1.0000i | 1 | −0.0000 − 1.0000i |
| 775 | −1 | 1.0000 + 0.0000i | −1 | 1.0000 − 0.0000i |
| 776 | −1 | 0.0000 + 1.0000i | 1 | 0.0000 − 1.0000i |
| 777 | −1 | −1.0000 + 0.0000i | −1 | −1.0000 − 0.0000i |
| 778 | 1 | 0.0000 + 1.0000i | −1 | 0.0000 − 1.0000i |
| 779 | −1 | 1.0000 + 0.0000i | −1 | 1.0000 − 0.0000i |
| 780 | 1 | −0.0000 − 1.0000i | −1 | −0.0000 + 1.0000i |
| 781 | 1 | 1.0000 − 0.0000i | 1 | 1.0000 + 0.0000i |
| 782 | −1 | 0.0000 − 1.0000i | 1 | 0.0000 + 1.0000i |
| 783 | −1 | 1.0000 − 0.0000i | −1 | 1.0000 + 0.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 784 | 1 | −0.0000 − 1.0000i | −1 | −0.0000 + 1.0000i |
| 785 | 1 | 1.0000 − 0.0000i | 1 | 1.0000 + 0.0000i |
| 786 | 1 | −0.0000 + 1.0000i | −1 | −0.0000 − 1.0000i |
| 787 | −1 | 1.0000 − 0.0000i | −1 | 1.0000 + 0.0000i |
| 788 | −1 | 0.0000 + 1.0000i | 1 | 0.0000 − 1.0000i |
| 789 | 1 | 1.0000 − 0.0000i | 1 | 1.0000 + 0.0000i |
| 790 | 1 | −0.0000 + 1.0000i | −1 | −0.0000 − 1.0000i |
| 791 | 1 | −1.0000 + 0.0000i | 1 | −1.0000 − 0.0000i |
| 792 | 1 | −0.0000 − 1.0000i | −1 | −0.0000 + 1.0000i |
| 793 | −1 | −1.0000 + 0.0000i | −1 | −1.0000 + 0.0000i |
| 794 | 1 | 0.0000 + 1.0000i | −1 | 0.0000 − 1.0000i |
| 795 | −1 | 1.0000 − 0.0000i | −1 | 1.0000 + 0.0000i |
| 796 | 1 | −0.0000 − 1.0000i | −1 | −0.0000 + 1.0000i |
| 797 | −1 | −1.0000 − 0.0000i | −1 | −1.0000 + 0.0000i |
| 798 | 1 | 0.0000 + 1.0000i | −1 | 0.0000 − 1.0000i |
| 799 | 1 | −1.0000 + 0.0000i | 1 | −1.0000 − 0.0000i |
| 800 | −1 | 0.0000 + 1.0000i | 1 | 0.0000 − 1.0000i |
| 801 | −1 | −1.0000 − 0.0000i | −1 | −1.0000 + 0.0000i |
| 802 | −1 | −0.0000 − 1.0000i | 1 | −0.0000 + 1.0000i |
| 803 | 1 | −1.0000 + 0.0000i | 1 | −1.0000 − 0.0000i |
| 804 | 1 | 0.0000 − 1.0000i | −1 | 0.0000 + 1.0000i |
| 805 | 1 | 1.0000 − 0.0000i | 1 | 1.0000 + 0.0000i |
| 806 | 1 | 0.0000 + 1.0000i | −1 | 0.0000 − 1.0000i |
| 807 | 1 | −1.0000 + 0.0000i | 1 | −1.0000 − 0.0000i |
| 808 | 1 | 0.0000 − 1.0000i | −1 | 0.0000 + 1.0000i |
| 809 | 1 | 1.0000 − 0.0000i | 1 | 1.0000 + 0.0000i |
| 810 | −1 | −0.0000 − 1.0000i | 1 | −0.0000 + 1.0000i |
| 811 | 1 | −1.0000 + 0.0000i | 1 | −1.0000 − 0.0000i |
| 812 | −1 | −0.0000 + 1.0000i | 1 | −0.0000 − 1.0000i |
| 813 | −1 | −1.0000 + 0.0000i | −1 | −1.0000 − 0.0000i |
| 814 | 1 | 0.0000 + 1.0000i | −1 | 0.0000 − 1.0000i |
| 815 | 1 | −1.0000 − 0.0000i | 1 | −1.0000 + 0.0000i |
| 816 | −1 | 0.0000 + 1.0000i | 1 | 0.0000 − 1.0000i |
| 817 | 1 | 1.0000 − 0.0000i | 1 | 1.0000 + 0.0000i |
| 818 | 1 | 0.0000 + 1.0000i | −1 | 0.0000 − 1.0000i |
| 819 | −1 | 1.0000 + 0.0000i | −1 | 1.0000 − 0.0000i |
| 820 | −1 | 0.0000 + 1.0000i | 1 | 0.0000 − 1.0000i |
| 821 | 1 | 1.0000 − 0.0000i | 1 | 1.0000 + 0.0000i |
| 822 | 1 | 0.0000 + 1.0000i | −1 | 0.0000 − 1.0000i |
| 823 | 1 | −1.0000 − 0.0000i | 1 | −1.0000 + 0.0000i |
| 824 | 1 | −0.0000 − 1.0000i | −1 | −0.0000 + 1.0000i |
| 825 | −1 | −1.0000 + 0.0000i | −1 | −1.0000 − 0.0000i |
| 826 | 1 | −0.0000 + 1.0000i | −1 | −0.0000 − 1.0000i |
| 827 | −1 | 1.0000 − 0.0000i | −1 | 1.0000 + 0.0000i |
| 828 | 1 | −0.0000 − 1.0000i | −1 | −0.0000 + 1.0000i |
| 829 | −1 | −1.0000 + 0.0000i | −1 | −1.0000 − 0.0000i |
| 830 | 1 | −0.0000 + 1.0000i | −1 | −0.0000 − 1.0000i |
| 831 | 1 | −1.0000 + 0.0000i | 1 | −1.0000 − 0.0000i |
| 832 | −1 | 0.0000 + 1.0000i | 1 | 0.0000 − 1.0000i |
| 833 | −1 | −1.0000 − 0.0000i | −1 | −1.0000 + 0.0000i |
| 834 | −1 | 0.0000 − 1.0000i | 1 | 0.0000 + 1.0000i |
| 835 | 1 | −1.0000 + 0.0000i | 1 | −1.0000 − 0.0000i |
| 836 | 1 | −0.0000 − 1.0000i | −1 | −0.0000 + 1.0000i |
| 837 | 1 | 1.0000 + 0.0000i | 1 | 1.0000 − 0.0000i |
| 838 | 1 | 0.0000 + 1.0000i | −1 | 0.0000 − 1.0000i |
| 839 | 1 | −1.0000 + 0.0000i | 1 | −1.0000 − 0.0000i |
| 840 | 1 | −0.0000 − 1.0000i | −1 | −0.0000 + 1.0000i |
| 841 | 1 | 1.0000 + 0.0000i | 1 | 1.0000 − 0.0000i |
| 842 | −1 | −0.0000 − 1.0000i | 1 | −0.0000 + 1.0000i |
| 843 | 1 | −1.0000 + 0.0000i | 1 | −1.0000 − 0.0000i |
| 844 | −1 | −0.0000 + 1.0000i | 1 | −0.0000 − 1.0000i |
| 845 | −1 | −1.0000 + 0.0000i | −1 | −1.0000 − 0.0000i |
| 846 | 1 | 0.0000 + 1.0000i | −1 | 0.0000 − 1.0000i |
| 847 | 1 | −1.0000 + 0.0000i | 1 | −1.0000 − 0.0000i |
| 848 | −1 | −0.0000 + 1.0000i | 1 | −0.0000 − 1.0000i |
| 849 | −1 | −1.0000 + 0.0000i | −1 | −1.0000 − 0.0000i |
| 850 | −1 | −0.0000 − 1.0000i | 1 | −0.0000 + 1.0000i |
| 851 | 1 | −1.0000 + 0.0000i | 1 | −1.0000 − 0.0000i |
| 852 | 1 | 0.0000 − 1.0000i | −1 | 0.0000 + 1.0000i |
| 853 | −1 | −1.0000 + 0.0000i | −1 | −1.0000 − 0.0000i |
| 854 | −1 | −0.0000 − 1.0000i | 1 | −0.0000 + 1.0000i |
| 855 | −1 | 1.0000 + 0.0000i | −1 | 1.0000 − 0.0000i |
| 856 | −1 | 0.0000 + 1.0000i | 1 | 0.0000 − 1.0000i |

TABLE A-continued

| Symbol No. | CEF for a first stream (without pi/2 BPSK Modulation) | Modulated CEF for a first stream (with pi/2 BPSK Modulation) [mGu512, mGv512 – mGb128] | CEF for a second stream (without pi/2 BPSK Modulation) | Modulated CEF for a second stream, that is Conjugated CEF [mGu512*, mGv512* – mGb128*]. |
|---|---|---|---|---|
| 857 | 1 | 1.0000 – 0.0000i | 1 | 1.0000 + 0.0000i |
| 858 | −1 | −0.0000 – 1.0000i | 1 | −0.0000 + 1.0000i |
| 859 | 1 | −1.0000 – 0.0000i | 1 | −1.0000 + 0.0000i |
| 860 | −1 | 0.0000 + 1.0000i | 1 | 0.0000 – 1.0000i |
| 861 | 1 | 1.0000 – 0.0000i | 1 | 1.0000 + 0.0000i |
| 862 | −1 | −0.0000 – 1.0000i | 1 | −0.0000 + 1.0000i |
| 863 | −1 | 1.0000 + 0.0000i | −1 | 1.0000 – 0.0000i |
| 864 | 1 | −0.0000 – 1.0000i | −1 | −0.0000 + 1.0000i |
| 865 | −1 | −1.0000 + 0.0000i | −1 | −1.0000 – 0.0000i |
| 866 | −1 | 0.0000 + 1.0000i | 1 | 0.0000 + 1.0000i |
| 867 | 1 | −1.0000 + 0.0000i | 1 | −1.0000 – 0.0000i |
| 868 | 1 | −0.0000 – 1.0000i | −1 | −0.0000 + 1.0000i |
| 869 | 1 | 1.0000 – 0.0000i | 1 | 1.0000 + 0.0000i |
| 870 | 1 | −0.0000 + 1.0000i | −1 | −0.0000 – 1.0000i |
| 871 | 1 | −1.0000 + 0.0000i | 1 | −1.0000 – 0.0000i |
| 872 | 1 | −0.0000 – 1.0000i | −1 | −0.0000 + 1.0000i |
| 873 | 1 | 1.0000 – 0.0000i | 1 | 1.0000 + 0.0000i |
| 874 | −1 | 0.0000 – 1.0000i | 1 | 0.0000 + 1.0000i |
| 875 | 1 | −1.0000 + 0.0000i | 1 | −1.0000 – 0.0000i |
| 876 | −1 | 0.0000 + 1.0000i | 1 | 0.0000 – 1.0000i |
| 877 | −1 | −1.0000 – 0.0000i | −1 | −1.0000 + 0.0000i |
| 878 | 1 | 0.0000 + 1.0000i | −1 | 0.0000 – 1.0000i |
| 879 | 1 | −1.0000 + 0.0000i | 1 | −1.0000 – 0.0000i |
| 880 | −1 | 0.0000 + 1.0000i | 1 | 0.0000 – 1.0000i |
| 881 | 1 | 1.0000 + 0.0000i | 1 | 1.0000 – 0.0000i |
| 882 | 1 | 0.0000 + 1.0000i | −1 | 0.0000 – 1.0000i |
| 883 | −1 | 1.0000 – 0.0000i | −1 | 1.0000 + 0.0000i |
| 884 | −1 | 0.0000 + 1.0000i | 1 | 0.0000 – 1.0000i |
| 885 | 1 | 1.0000 + 0.0000i | 1 | 1.0000 – 0.0000i |
| 886 | 1 | 0.0000 + 1.0000i | −1 | 0.0000 – 1.0000i |
| 887 | 1 | −1.0000 + 0.0000i | 1 | −1.0000 – 0.0000i |
| 888 | 1 | 0.0000 – 1.0000i | −1 | 0.0000 + 1.0000i |
| 889 | −1 | −1.0000 + 0.0000i | −1 | −1.0000 – 0.0000i |
| 890 | 1 | 0.0000 + 1.0000i | −1 | 0.0000 – 1.0000i |
| 891 | −1 | 1.0000 – 0.0000i | −1 | 1.0000 + 0.0000i |
| 892 | 1 | 0.0000 – 1.0000i | −1 | 0.0000 + 1.0000i |
| 893 | −1 | −1.0000 + 0.0000i | −1 | −1.0000 – 0.0000i |
| 894 | 1 | 0.0000 + 1.0000i | −1 | 0.0000 – 1.0000i |
| 895 | 1 | −1.0000 + 0.0000i | 1 | −1.0000 – 0.0000i |
| 896 | −1 | −0.0000 + 1.0000i | 1 | −0.0000 – 1.0000i |
| 897 | −1 | −1.0000 + 0.0000i | −1 | −1.0000 – 0.0000i |
| 898 | −1 | −0.0000 – 1.0000i | 1 | −0.0000 + 1.0000i |
| 899 | 1 | −1.0000 – 0.0000i | 1 | −1.0000 + 0.0000i |
| 900 | 1 | −0.0000 – 1.0000i | −1 | −0.0000 + 1.0000i |
| 901 | 1 | 1.0000 – 0.0000i | 1 | 1.0000 + 0.0000i |
| 902 | 1 | 0.0000 + 1.0000i | −1 | 0.0000 – 1.0000i |
| 903 | 1 | −1.0000 – 0.0000i | 1 | −1.0000 + 0.0000i |
| 904 | 1 | −0.0000 – 1.0000i | −1 | −0.0000 + 1.0000i |
| 905 | 1 | 1.0000 – 0.0000i | 1 | 1.0000 + 0.0000i |
| 906 | −1 | −0.0000 – 1.0000i | 1 | −0.0000 + 1.0000i |
| 907 | 1 | −1.0000 – 0.0000i | 1 | −1.0000 + 0.0000i |
| 908 | −1 | 0.0000 + 1.0000i | 1 | 0.0000 – 1.0000i |
| 909 | −1 | −1.0000 + 0.0000i | −1 | −1.0000 – 0.0000i |
| 910 | 1 | −0.0000 + 1.0000i | −1 | −0.0000 – 1.0000i |
| 911 | 1 | −1.0000 + 0.0000i | 1 | −1.0000 – 0.0000i |
| 912 | −1 | 0.0000 + 1.0000i | 1 | 0.0000 – 1.0000i |
| 913 | −1 | −1.0000 + 0.0000i | −1 | −1.0000 – 0.0000i |
| 914 | −1 | 0.0000 – 1.0000i | 1 | 0.0000 + 1.0000i |
| 915 | 1 | −1.0000 + 0.0000i | 1 | −1.0000 – 0.0000i |
| 916 | 1 | −0.0000 – 1.0000i | −1 | −0.0000 + 1.0000i |
| 917 | −1 | −1.0000 + 0.0000i | −1 | −1.0000 – 0.0000i |
| 918 | −1 | 0.0000 – 1.0000i | 1 | 0.0000 + 1.0000i |
| 919 | −1 | 1.0000 – 0.0000i | −1 | 1.0000 + 0.0000i |
| 920 | −1 | 0.0000 + 1.0000i | 1 | 0.0000 – 1.0000i |
| 921 | 1 | 1.0000 + 0.0000i | 1 | 1.0000 – 0.0000i |
| 922 | −1 | −0.0000 – 1.0000i | 1 | −0.0000 + 1.0000i |
| 923 | 1 | −1.0000 + 0.0000i | 1 | −1.0000 – 0.0000i |
| 924 | −1 | 0.0000 + 1.0000i | 1 | 0.0000 – 1.0000i |
| 925 | 1 | 1.0000 + 0.0000i | 1 | 1.0000 – 0.0000i |
| 926 | −1 | −0.0000 – 1.0000i | 1 | −0.0000 + 1.0000i |
| 927 | −1 | 1.0000 – 0.0000i | −1 | 1.0000 + 0.0000i |
| 928 | 1 | −0.0000 – 1.0000i | −1 | −0.0000 + 1.0000i |
| 929 | 1 | 1.0000 + 0.0000i | 1 | 1.0000 – 0.0000i |

TABLE A-continued

| Symbol No. | CEF for a first stream (without pi/2 BPSK Modulation) | Modulated CEF for a first stream (with pi/2 BPSK Modulation) [mGu512, mGv512 – mGb128] | CEF for a second stream (without pi/2 BPSK Modulation) | Modulated CEF for a second stream, that is Conjugated CEF [mGu512*, mGv512* – mGb128*]. |
|---|---|---|---|---|
| 930 | 1 | 0.0000 + 1.0000i | −1 | 0.0000 − 1.0000i |
| 931 | −1 | 1.0000 − 0.0000i | −1 | 1.0000 + 0.0000i |
| 932 | −1 | −0.0000 + 1.0000i | 1 | −0.0000 − 1.0000i |
| 933 | −1 | −1.0000 + 0.0000i | −1 | −1.0000 − 0.0000i |
| 934 | −1 | −0.0000 − 1.0000i | 1 | −0.0000 + 1.0000i |
| 935 | −1 | 1.0000 − 0.0000i | −1 | 1.0000 + 0.0000i |
| 936 | −1 | −0.0000 + 1.0000i | 1 | −0.0000 − 1.0000i |
| 937 | −1 | −1.0000 + 0.0000i | −1 | −1.0000 − 0.0000i |
| 938 | 1 | 0.0000 + 1.0000i | −1 | 0.0000 − 1.0000i |
| 939 | −1 | 1.0000 − 0.0000i | −1 | 1.0000 + 0.0000i |
| 940 | 1 | −0.0000 − 1.0000i | −1 | −0.0000 + 1.0000i |
| 941 | 1 | 1.0000 − 0.0000i | 1 | 1.0000 + 0.0000i |
| 942 | −1 | −0.0000 − 1.0000i | 1 | −0.0000 + 1.0000i |
| 943 | −1 | 1.0000 + 0.0000i | −1 | 1.0000 − 0.0000i |
| 944 | 1 | −0.0000 − 1.0000i | −1 | −0.0000 + 1.0000i |
| 945 | −1 | −1.0000 + 0.0000i | −1 | −1.0000 − 0.0000i |
| 946 | −1 | −0.0000 − 1.0000i | 1 | −0.0000 + 1.0000i |
| 947 | 1 | −1.0000 − 0.0000i | 1 | −1.0000 + 0.0000i |
| 948 | 1 | −0.0000 − 1.0000i | −1 | −0.0000 + 1.0000i |
| 949 | −1 | −1.0000 + 0.0000i | −1 | −1.0000 − 0.0000i |
| 950 | −1 | −0.0000 − 1.0000i | 1 | −0.0000 + 1.0000i |
| 951 | −1 | 1.0000 − 0.0000i | −1 | 1.0000 + 0.0000i |
| 952 | −1 | 0.0000 + 1.0000i | 1 | 0.0000 − 1.0000i |
| 953 | 1 | 1.0000 − 0.0000i | 1 | 1.0000 + 0.0000i |
| 954 | −1 | 0.0000 − 1.0000i | 1 | 0.0000 + 1.0000i |
| 955 | 1 | −1.0000 + 0.0000i | 1 | −1.0000 − 0.0000i |
| 956 | −1 | 0.0000 + 1.0000i | 1 | 0.0000 − 1.0000i |
| 957 | 1 | 1.0000 − 0.0000i | 1 | 1.0000 + 0.0000i |
| 958 | −1 | 0.0000 − 1.0000i | 1 | 0.0000 + 1.0000i |
| 959 | −1 | 1.0000 − 0.0000i | −1 | 1.0000 + 0.0000i |
| 960 | 1 | −0.0000 − 1.0000i | −1 | −0.0000 + 1.0000i |
| 961 | −1 | −1.0000 + 0.0000i | −1 | −1.0000 − 0.0000i |
| 962 | −1 | −0.0000 − 1.0000i | 1 | −0.0000 + 1.0000i |
| 963 | 1 | −1.0000 + 0.0000i | 1 | −1.0000 − 0.0000i |
| 964 | 1 | −0.0000 − 1.0000i | −1 | −0.0000 + 1.0000i |
| 965 | 1 | 1.0000 + 0.0000i | 1 | 1.0000 − 0.0000i |
| 966 | 1 | 0.0000 + 1.0000i | −1 | 0.0000 − 1.0000i |
| 967 | 1 | −1.0000 + 0.0000i | 1 | −1.0000 − 0.0000i |
| 968 | 1 | −0.0000 − 1.0000i | −1 | −0.0000 + 1.0000i |
| 969 | 1 | 1.0000 + 0.0000i | 1 | 1.0000 − 0.0000i |
| 970 | −1 | −0.0000 − 1.0000i | 1 | −0.0000 + 1.0000i |
| 971 | 1 | −1.0000 + 0.0000i | 1 | −1.0000 − 0.0000i |
| 972 | −1 | −0.0000 + 1.0000i | 1 | −0.0000 − 1.0000i |
| 973 | −1 | −1.0000 + 0.0000i | −1 | −1.0000 − 0.0000i |
| 974 | 1 | 0.0000 + 1.0000i | −1 | 0.0000 − 1.0000i |
| 975 | 1 | −1.0000 + 0.0000i | 1 | −1.0000 − 0.0000i |
| 976 | −1 | −0.0000 + 1.0000i | 1 | −0.0000 − 1.0000i |
| 977 | −1 | −1.0000 + 0.0000i | −1 | −1.0000 − 0.0000i |
| 978 | −1 | −0.0000 − 1.0000i | 1 | −0.0000 + 1.0000i |
| 979 | 1 | −1.0000 + 0.0000i | 1 | −1.0000 − 0.0000i |
| 980 | 1 | 0.0000 − 1.0000i | −1 | 0.0000 + 1.0000i |
| 981 | −1 | −1.0000 + 0.0000i | −1 | −1.0000 − 0.0000i |
| 982 | −1 | −0.0000 − 1.0000i | 1 | −0.0000 + 1.0000i |
| 983 | −1 | 1.0000 + 0.0000i | −1 | 1.0000 − 0.0000i |
| 984 | −1 | 0.0000 + 1.0000i | 1 | 0.0000 − 1.0000i |
| 985 | 1 | 1.0000 − 0.0000i | 1 | 1.0000 + 0.0000i |
| 986 | −1 | −0.0000 − 1.0000i | 1 | −0.0000 + 1.0000i |
| 987 | 1 | −1.0000 − 0.0000i | 1 | −1.0000 − 0.0000i |
| 988 | −1 | 0.0000 + 1.0000i | 1 | 0.0000 − 1.0000i |
| 989 | 1 | 1.0000 − 0.0000i | 1 | 1.0000 + 0.0000i |
| 990 | −1 | −0.0000 − 1.0000i | 1 | −0.0000 + 1.0000i |
| 991 | −1 | 1.0000 + 0.0000i | −1 | 1.0000 − 0.0000i |
| 992 | 1 | −0.0000 − 1.0000i | −1 | −0.0000 + 1.0000i |
| 993 | −1 | −1.0000 + 0.0000i | −1 | −1.0000 − 0.0000i |
| 994 | −1 | 0.0000 − 1.0000i | 1 | 0.0000 + 1.0000i |
| 995 | 1 | −1.0000 + 0.0000i | 1 | −1.0000 − 0.0000i |
| 996 | 1 | −0.0000 − 1.0000i | 1 | −0.0000 + 1.0000i |
| 997 | 1 | 1.0000 − 0.0000i | 1 | 1.0000 + 0.0000i |
| 998 | 1 | −0.0000 + 1.0000i | −1 | −0.0000 − 1.0000i |
| 999 | 1 | −1.0000 + 0.0000i | 1 | −1.0000 − 0.0000i |
| 1000 | 1 | −0.0000 − 1.0000i | −1 | −0.0000 + 1.0000i |
| 1001 | 1 | 1.0000 − 0.0000i | 1 | 1.0000 + 0.0000i |
| 1002 | −1 | 0.0000 − 1.0000i | 1 | 0.0000 + 1.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 1003 | 1 | −1.0000 + 0.0000i | 1 | −1.0000 − 0.0000i |
| 1004 | −1 | 0.0000 + 1.0000i | 1 | 0.0000 − 1.0000i |
| 1005 | −1 | −1.0000 − 0.0000i | −1 | −1.0000 + 0.0000i |
| 1006 | 1 | 0.0000 + 1.0000i | −1 | 0.0000 − 1.0000i |
| 1007 | 1 | −1.0000 + 0.0000i | 1 | −1.0000 − 0.0000i |
| 1008 | −1 | 0.0000 + 1.0000i | 1 | 0.0000 − 1.0000i |
| 1009 | 1 | 1.0000 + 0.0000i | 1 | 1.0000 − 0.0000i |
| 1010 | 1 | 0.0000 + 1.0000i | −1 | 0.0000 − 1.0000i |
| 1011 | −1 | 1.0000 − 0.0000i | −1 | 1.0000 + 0.0000i |
| 1012 | −1 | 0.0000 + 1.0000i | 1 | 0.0000 − 1.0000i |
| 1013 | 1 | 1.0000 + 0.0000i | 1 | 1.0000 − 0.0000i |
| 1014 | 1 | 0.0000 + 1.0000i | −1 | 0.0000 − 1.0000i |
| 1015 | 1 | −1.0000 + 0.0000i | 1 | −1.0000 − 0.0000i |
| 1016 | 1 | 0.0000 − 1.0000i | −1 | 0.0000 + 1.0000i |
| 1017 | −1 | −1.0000 + 0.0000i | −1 | −1.0000 − 0.0000i |
| 1018 | 1 | 0.0000 + 1.0000i | −1 | 0.0000 − 1.0000i |
| 1019 | −1 | 1.0000 − 0.0000i | −1 | 1.0000 + 0.0000i |
| 1020 | 1 | 0.0000 − 1.0000i | −1 | 0.0000 + 1.0000i |
| 1021 | −1 | −1.0000 + 0.0000i | −1 | −1.0000 − 0.0000i |
| 1022 | 1 | 0.0000 + 1.0000i | −1 | 0.0000 − 1.0000i |
| 1023 | 1 | −1.0000 + 0.0000i | 1 | −1.0000 − 0.0000i |
| 1024 | −1 | 0.0000 + 1.0000i | 1 | 0.0000 − 1.0000i |
| 1025 | 1 | 1.0000 − 0.0000i | 1 | 1.0000 + 0.0000i |
| 1026 | 1 | 0.0000 + 1.0000i | −1 | 0.0000 − 1.0000i |
| 1027 | −1 | 1.0000 + 0.0000i | −1 | 1.0000 − 0.0000i |
| 1028 | −1 | 0.0000 + 1.0000i | 1 | 0.0000 − 1.0000i |
| 1029 | −1 | −1.0000 + 0.0000i | −1 | −1.0000 − 0.0000i |
| 1030 | −1 | −0.0000 − 1.0000i | 1 | −0.0000 + 1.0000i |
| 1031 | −1 | 1.0000 + 0.0000i | −1 | 1.0000 − 0.0000i |
| 1032 | −1 | 0.0000 + 1.0000i | 1 | 0.0000 − 1.0000i |
| 1033 | −1 | −1.0000 + 0.0000i | −1 | −1.0000 − 0.0000i |
| 1034 | 1 | 0.0000 + 1.0000i | −1 | 0.0000 − 1.0000i |
| 1035 | −1 | 1.0000 − 0.0000i | −1 | 1.0000 + 0.0000i |
| 1036 | 1 | −0.0000 − 1.0000i | −1 | −0.0000 + 1.0000i |
| 1037 | 1 | 1.0000 − 0.0000i | 1 | 1.0000 + 0.0000i |
| 1038 | −1 | 0.0000 − 1.0000i | 1 | 0.0000 + 1.0000i |
| 1039 | −1 | 1.0000 − 0.0000i | −1 | 1.0000 + 0.0000i |
| 1040 | 1 | −0.0000 − 1.0000i | −1 | −0.0000 + 1.0000i |
| 1041 | 1 | 1.0000 − 0.0000i | 1 | 1.0000 + 0.0000i |
| 1042 | 1 | −0.0000 + 1.0000i | −1 | −0.0000 − 1.0000i |
| 1043 | −1 | 1.0000 − 0.0000i | −1 | 1.0000 + 0.0000i |
| 1044 | −1 | 0.0000 + 1.0000i | 1 | 0.0000 − 1.0000i |
| 1045 | 1 | 1.0000 − 0.0000i | 1 | 1.0000 + 0.0000i |
| 1046 | 1 | 0.0000 + 1.0000i | −1 | 0.0000 − 1.0000i |
| 1047 | 1 | −1.0000 + 0.0000i | 1 | −1.0000 − 0.0000i |
| 1048 | 1 | −0.0000 − 1.0000i | −1 | −0.0000 + 1.0000i |
| 1049 | −1 | −1.0000 − 0.0000i | −1 | −1.0000 + 0.0000i |
| 1050 | 1 | 0.0000 + 1.0000i | −1 | 0.0000 − 1.0000i |
| 1051 | −1 | 1.0000 − 0.0000i | −1 | 1.0000 + 0.0000i |
| 1052 | 1 | −0.0000 − 1.0000i | −1 | −0.0000 + 1.0000i |
| 1053 | −1 | −1.0000 − 0.0000i | −1 | −1.0000 + 0.0000i |
| 1054 | 1 | 0.0000 + 1.0000i | −1 | 0.0000 − 1.0000i |
| 1055 | 1 | −1.0000 + 0.0000i | 1 | −1.0000 − 0.0000i |
| 1056 | −1 | 0.0000 + 1.0000i | 1 | 0.0000 − 1.0000i |
| 1057 | −1 | −1.0000 + 0.0000i | −1 | −1.0000 − 0.0000i |
| 1058 | −1 | −0.0000 − 1.0000i | 1 | −0.0000 + 1.0000i |
| 1059 | 1 | −1.0000 + 0.0000i | 1 | −1.0000 − 0.0000i |
| 1060 | 1 | 0.0000 − 1.0000i | −1 | 0.0000 + 1.0000i |
| 1061 | 1 | 1.0000 − 0.0000i | 1 | 1.0000 + 0.0000i |
| 1062 | 1 | 0.0000 + 1.0000i | −1 | 0.0000 − 1.0000i |
| 1063 | 1 | −1.0000 + 0.0000i | 1 | −1.0000 − 0.0000i |
| 1064 | 1 | 0.0000 − 1.0000i | −1 | 0.0000 + 1.0000i |
| 1065 | 1 | 1.0000 − 0.0000i | 1 | 1.0000 + 0.0000i |
| 1066 | −1 | −0.0000 − 1.0000i | 1 | −0.0000 + 1.0000i |
| 1067 | 1 | −1.0000 + 0.0000i | 1 | −1.0000 − 0.0000i |
| 1068 | −1 | 0.0000 + 1.0000i | 1 | 0.0000 − 1.0000i |
| 1069 | −1 | −1.0000 + 0.0000i | −1 | −1.0000 − 0.0000i |
| 1070 | 1 | 0.0000 + 1.0000i | −1 | 0.0000 − 1.0000i |
| 1071 | 1 | −1.0000 − 0.0000i | 1 | −1.0000 + 0.0000i |
| 1072 | −1 | 0.0000 + 1.0000i | 1 | 0.0000 − 1.0000i |
| 1073 | 1 | 1.0000 − 0.0000i | 1 | 1.0000 + 0.0000i |
| 1074 | 1 | 0.0000 + 1.0000i | −1 | 0.0000 − 1.0000i |
| 1075 | −1 | 1.0000 + 0.0000i | −1 | 1.0000 − 0.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 1076 | −1 | 0.0000 + 1.0000i | 1 | 0.0000 − 1.0000i |
| 1077 | 1 | 1.0000 − 0.0000i | 1 | 1.0000 + 0.0000i |
| 1078 | 1 | 0.0000 + 1.0000i | −1 | 0.0000 − 1.0000i |
| 1079 | 1 | −1.0000 + 0.0000i | 1 | −1.0000 − 0.0000i |
| 1080 | 1 | −0.0000 − 1.0000i | −1 | −0.0000 + 1.0000i |
| 1081 | −1 | −1.0000 + 0.0000i | −1 | −1.0000 − 0.0000i |
| 1082 | 1 | −0.0000 + 1.0000i | −1 | −0.0000 − 1.0000i |
| 1083 | −1 | 1.0000 − 0.0000i | −1 | 1.0000 + 0.0000i |
| 1084 | 1 | −0.0000 − 1.0000i | −1 | −0.0000 + 1.0000i |
| 1085 | −1 | −1.0000 + 0.0000i | −1 | −1.0000 − 0.0000i |
| 1086 | 1 | −0.0000 + 1.0000i | −1 | −0.0000 − 1.0000i |
| 1087 | 1 | −1.0000 + 0.0000i | 1 | −1.0000 − 0.0000i |
| 1088 | −1 | 0.0000 + 1.0000i | 1 | 0.0000 − 1.0000i |
| 1089 | −1 | −1.0000 − 0.0000i | −1 | −1.0000 + 0.0000i |
| 1090 | −1 | −0.0000 − 1.0000i | 1 | −0.0000 + 1.0000i |
| 1091 | 1 | −1.0000 + 0.0000i | 1 | −1.0000 − 0.0000i |
| 1092 | 1 | −0.0000 − 1.0000i | −1 | −0.0000 + 1.0000i |
| 1093 | 1 | 1.0000 + 0.0000i | 1 | 1.0000 − 0.0000i |
| 1094 | 1 | 0.0000 + 1.0000i | −1 | 0.0000 − 1.0000i |
| 1095 | 1 | −1.0000 + 0.0000i | 1 | −1.0000 − 0.0000i |
| 1096 | 1 | −0.0000 − 1.0000i | −1 | −0.0000 + 1.0000i |
| 1097 | 1 | 1.0000 + 0.0000i | 1 | 1.0000 − 0.0000i |
| 1098 | −1 | −0.0000 − 1.0000i | 1 | −0.0000 + 1.0000i |
| 1099 | 1 | −1.0000 + 0.0000i | 1 | −1.0000 − 0.0000i |
| 1100 | −1 | −0.0000 + 1.0000i | 1 | −0.0000 − 1.0000i |
| 1101 | −1 | −1.0000 + 0.0000i | −1 | −1.0000 − 0.0000i |
| 1102 | 1 | 0.0000 + 1.0000i | −1 | 0.0000 − 1.0000i |
| 1103 | 1 | −1.0000 + 0.0000i | 1 | −1.0000 − 0.0000i |
| 1104 | −1 | −0.0000 + 1.0000i | 1 | −0.0000 − 1.0000i |
| 1105 | −1 | −1.0000 + 0.0000i | −1 | −1.0000 − 0.0000i |
| 1106 | −1 | −0.0000 − 1.0000i | 1 | −0.0000 + 1.0000i |
| 1107 | 1 | −1.0000 + 0.0000i | 1 | −1.0000 − 0.0000i |
| 1108 | 1 | 0.0000 − 1.0000i | −1 | 0.0000 + 1.0000i |
| 1109 | −1 | −1.0000 + 0.0000i | −1 | −1.0000 − 0.0000i |
| 1110 | −1 | −0.0000 − 1.0000i | 1 | −0.0000 + 1.0000i |
| 1111 | −1 | 1.0000 + 0.0000i | −1 | 1.0000 − 0.0000i |
| 1112 | −1 | 0.0000 + 1.0000i | 1 | 0.0000 − 1.0000i |
| 1113 | 1 | 1.0000 − 0.0000i | 1 | 1.0000 + 0.0000i |
| 1114 | −1 | −0.0000 − 1.0000i | 1 | −0.0000 + 1.0000i |
| 1115 | 1 | −1.0000 − 0.0000i | 1 | −1.0000 + 0.0000i |
| 1116 | −1 | 0.0000 + 1.0000i | 1 | 0.0000 − 1.0000i |
| 1117 | 1 | 1.0000 − 0.0000i | 1 | 1.0000 + 0.0000i |
| 1118 | −1 | −0.0000 − 1.0000i | 1 | −0.0000 + 1.0000i |
| 1119 | −1 | 1.0000 − 0.0000i | −1 | 1.0000 + 0.0000i |
| 1120 | 1 | −0.0000 − 1.0000i | −1 | −0.0000 + 1.0000i |
| 1121 | −1 | −1.0000 + 0.0000i | −1 | −1.0000 − 0.0000i |
| 1122 | −1 | 0.0000 − 1.0000i | 1 | 0.0000 + 1.0000i |
| 1123 | 1 | −1.0000 + 0.0000i | 1 | −1.0000 − 0.0000i |
| 1124 | 1 | −0.0000 − 1.0000i | −1 | −0.0000 + 1.0000i |
| 1125 | 1 | 1.0000 − 0.0000i | 1 | 1.0000 + 0.0000i |
| 1126 | 1 | −0.0000 + 1.0000i | −1 | −0.0000 − 1.0000i |
| 1127 | 1 | −1.0000 + 0.0000i | 1 | −1.0000 − 0.0000i |
| 1128 | 1 | −0.0000 − 1.0000i | −1 | −0.0000 + 1.0000i |
| 1129 | 1 | 1.0000 − 0.0000i | 1 | 1.0000 + 0.0000i |
| 1130 | −1 | −0.0000 − 1.0000i | 1 | −0.0000 + 1.0000i |
| 1131 | 1 | −1.0000 + 0.0000i | 1 | −1.0000 − 0.0000i |
| 1132 | −1 | 0.0000 + 1.0000i | 1 | 0.0000 − 1.0000i |
| 1133 | −1 | −1.0000 − 0.0000i | −1 | −1.0000 + 0.0000i |
| 1134 | 1 | 0.0000 + 1.0000i | −1 | 0.0000 − 1.0000i |
| 1135 | 1 | −1.0000 + 0.0000i | 1 | −1.0000 − 0.0000i |
| 1136 | −1 | 0.0000 + 1.0000i | 1 | 0.0000 − 1.0000i |
| 1137 | 1 | 1.0000 + 0.0000i | 1 | 1.0000 − 0.0000i |
| 1138 | 1 | 0.0000 + 1.0000i | −1 | 0.0000 − 1.0000i |
| 1139 | −1 | 1.0000 + 0.0000i | −1 | 1.0000 − 0.0000i |
| 1140 | −1 | 0.0000 + 1.0000i | 1 | 0.0000 − 1.0000i |
| 1141 | 1 | 1.0000 − 0.0000i | 1 | 1.0000 + 0.0000i |
| 1142 | 1 | 0.0000 + 1.0000i | −1 | 0.0000 − 1.0000i |
| 1143 | 1 | −1.0000 + 0.0000i | 1 | −1.0000 − 0.0000i |
| 1144 | 1 | 0.0000 − 1.0000i | −1 | 0.0000 + 1.0000i |
| 1145 | −1 | −1.0000 + 0.0000i | −1 | −1.0000 − 0.0000i |
| 1146 | 1 | 0.0000 + 1.0000i | −1 | 0.0000 − 1.0000i |
| 1147 | −1 | 1.0000 − 0.0000i | −1 | 1.0000 + 0.0000i |
| 1148 | 1 | 0.0000 − 1.0000i | −1 | 0.0000 + 1.0000i |

TABLE A-continued

| Symbol No. | CEF for a first stream (without pi/2 BPSK Modulation) | Modulated CEF for a first stream (with pi/2 BPSK Modulation) [mGu512, mGv512 − mGb128] | CEF for a second stream (without pi/2 BPSK Modulation) | Modulated CEF for a second stream, that is Conjugated CEF [mGu512*, mGv512* − mGb128*]. |
|---|---|---|---|---|
| 1149 | −1 | −1.0000 + 0.0000i | −1 | −1.0000 − 0.0000i |
| 1150 | 1 | 0.0000 + 1.0000i | −1 | 0.0000 − 1.0000i |
| 1151 | 1 | −1.0000 + 0.0000i | 1 | −1.0000 − 0.0000i |
| 1152 | −1 | 0.0000 + 1.0000i | 1 | 0.0000 − 1.0000i |

What is claimed is:

1. A method performed by a wireless transmit/receive unit (WTRU), the method comprising:
   determining a number of space-time streams for a Multi-Input Multi-Output (MIMO) transmission;
   generating the MIMO transmission for the number of space-time streams,
   wherein the MIMO transmission comprises at least one channel estimation field (CEF) for each respective space-time stream,
   wherein the number of CEFs for each respective space-time stream in the MIMO transmission is based on a matrix associated with the number of space-time-streams, and
   wherein the number of CEFs for each said space-time stream in the MIMO transmission is less than the total number of space-time streams in the MIMO transmission;
   wherein a first space-time stream is orthogonal to at least one second space-time stream, and wherein each CEF of the first space-time stream has a corresponding CEF of the at least one second space-time stream that is based on a same value in the matrix; and
   transmitting the MIMO transmission comprising the number of CEFs for each space-time stream.

2. The method of claim 1, wherein the first space-time stream includes information associated with a first set of complex numbers, and the second space-time stream includes information associated with a second set of complex numbers.

3. The method of claim 2, wherein the second set of complex numbers are complex conjugates of the first set of complex numbers.

4. The method of claim 3, wherein the MIMO transmission comprises a physical layer (PHY) frame that includes simultaneous transmission of the first space-time stream including the first set of complex numbers and the second space-time stream including the second set of complex numbers.

5. The method of claim 1, wherein the orthogonality between the first space-stream and the second space stream is maintained by the matrix.

6. The method of claim 1, wherein the number of CEFs for each space-time stream in the MIMO transmission is half the number of space-time streams.

7. The method of claim 1, wherein each space-time stream is transmitted on a respective antenna.

8. A wireless transmit/receive unit (WTRU) comprising:
   a processor configured to:
   determine a number of space-time streams for a Multi-Input Multi-Output (MIMO) transmission;
   generate the MIMO transmission for the number of space-time streams,
   wherein the MIMO transmission comprises at least one channel estimation field (CEF) for each respective space-time stream,
   wherein the number of CEFs for each respective space-time stream in the MIMO transmission is based on a matrix associated with the number of space-time streams, and
   wherein the number of CEFs for each respective space-time stream in the MIMO transmission is less than the total number of space-time streams in the MIMO transmission;
   wherein a first space-time stream is orthogonal to at least one second space-time stream, and wherein each CEF of the first space-time stream has a corresponding CEF of the at least one second space-time stream that is based on a same value in the matrix; and
   transmit the MIMO transmission comprising the number of CEFs for each space-time stream.

9. The WTRU of claim 8, wherein the first space-time stream includes information associated with a first set of complex numbers, and the second space-time stream includes information associated with a second set of complex numbers.

10. The WTRU of claim 9, wherein the second set of complex numbers are complex conjugates of the first set of complex numbers.

11. The WTRU of claim 10, wherein the MIMO transmission comprises a physical layer (PHY) frame that includes simultaneous transmission of the first space-time stream including the first set of complex numbers and the second space-time stream including the second set of complex numbers.

12. The WTRU of claim 8, wherein the orthogonality between the first space-stream and the second space stream is maintained by the matrix.

13. The WTRU of claim 8, wherein the number of CEFs for each space-time stream in the MIMO transmission is half the number of space-time streams.

14. The WTRU of claim 8, wherein each space-time stream is transmitted on a respective antenna.

* * * * *